United States Patent
Yoshida

(10) Patent No.: US 7,619,779 B2
(45) Date of Patent: Nov. 17, 2009

(54) METHOD FOR JUDGING ACHIEVABILITY OF DENSITY CORRECTION OF IMAGE AND PRINTING APPARATUS

(75) Inventor: Masahiko Yoshida, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 580 days.

(21) Appl. No.: 11/582,969

(22) Filed: Oct. 19, 2006

(65) Prior Publication Data

US 2007/0086025 A1   Apr. 19, 2007

(30) Foreign Application Priority Data

Oct. 19, 2005   (JP) .............................. 2005-304549

(51) Int. Cl.
*G06K 15/00* (2006.01)
*H04N 1/405* (2006.01)
*G06F 15/00* (2006.01)
*G06K 1/00* (2006.01)

(52) U.S. Cl. .......................................... 358/3.1; 358/1.8
(58) Field of Classification Search ................ 358/3.1, 358/1.8, 1.9, 1.1
See application file for complete search history.

(56) References Cited

U.S. PATENT DOCUMENTS 5,276,459 A * 1/1994 Danzuka et al. ........... 346/33 A
7,298,525 B2 * 11/2007 Hagai et al. .................. 358/1.9

FOREIGN PATENT DOCUMENTS

JP   2005-224977 A   8/2005

* cited by examiner

*Primary Examiner*—Douglas Q Tran
(74) *Attorney, Agent, or Firm*—Sughrue Mion, PLLC

(57) ABSTRACT

A method for judging achievability of density correction of an image, the density correction being performed by a printing apparatus during printing of the image, the printing apparatus including a plurality of nozzle groups each consisting of a plurality of nozzles that are lined up in a predetermined direction, the method, includes: printing on a medium a comparison pattern whose density is not corrected and a comparison pattern whose density is corrected, by causing at least two nozzle groups among a plurality of the nozzle groups to eject ink and forming dots in a mixed manner with the ink ejected from the at least two nozzle groups, reading the density of each of the comparison patterns, and judging, based on the read density, achievability of density correction of an image.

14 Claims, 42 Drawing Sheets

| row region No. | measured value (cyan) | | | | |
|---|---|---|---|---|---|
| | 76 (30%) | 102 (40%) | 128 (50%) | 153 (60%) | 179 (70%) |
| 1 | 78 | 100 | 125 | 155 | 182 |
| 2 | 75 | 99 | 128 | 151 | 179 |
| 3 | 76 | 103 | 130 | 152 | 176 |
| ⋮ | ⋮ | | ⋮ | | ⋮ |
| 115 | 77 | 101 | 127 | 154 | 183 |
| 116 | 72 | 99 | 128 | 156 | 184 | table of correction values for front-end print region

| row region No. | cyan | | |
|---|---|---|---|
| | Sb | Sc | Sd |
| 1 | Hb_1 | Hc_1 | Hd_1 |
| 2 | Hb_2 | Hc_2 | Hd_2 |
| 3 | Hb_3 | Hc_3 | Hd_3 |
| ⋮ | ⋮ | | |
| 29 | Hb_29 | Hc_29 | Hd_29 |
| 30 | Hb_30 | Hc_30 | Hd_30 | table of correction values for regular print region

| row region No. | cyan | | |
|---|---|---|---|
| | Sb | Sc | Sd |
| 1 | Hb_1 | Hc_1 | Hd_1 |
| 2 | Hb_2 | Hc_2 | Hd_2 |
| 3 | Hb_3 | Hc_3 | Hd_3 |
| 4 | Hb_4 | Hc_4 | Hd_4 |
| 5 | Hb_5 | Hc_5 | Hd_5 |
| 6 | Hb_6 | Hc_6 | Hd_6 |
| 7 | Hb_7 | Hc_7 | Hd_7 | table of correction values for rear-end print region

| row region No. | cyan | | |
|---|---|---|---|
| | Sb | Sc | Sd |
| 1 | Hb_1 | Hc_1 | Hd_1 |
| 2 | Hb_2 | Hc_2 | Hd_2 |
| 3 | Hb_3 | Hc_3 | Hd_3 |
| ⋮ | ⋮ | | |
| 29 | Hb_29 | Hc_29 | Hd_29 |
| 30 | Hb_30 | Hc_30 | Hd_30 |

Fig.21A table of correction values for regular print region

| row region No. | cyan | | |
|---|---|---|---|
| | Sb | Sc | Sd |
| 1 | Hb_1 | Hc_1 | Hd_1 |
| 2 | Hb_2 | Hc_2 | Hd_2 |
| 3 | Hb_3 | Hc_3 | Hd_3 |
| 4 | Hb_4 | Hc_4 | Hd_4 |
| 5 | Hb_5 | Hc_5 | Hd_5 |
| 6 | Hb_6 | Hc_6 | Hd_6 |
| 7 | Hb_7 | Hc_7 | Hd_7 |
| 8 | Hb_8 | Hc_8 | Hd_8 |
| 9 | Hb_9 | Hc_9 | Hd_9 |
| 10 | Hb_10 | Hc_10 | Hd_10 |
| 11 | Hb_11 | Hc_11 | Hd_11 |
| 12 | Hb_12 | Hc_12 | Hd_12 |
| 13 | Hb_13 | Hc_13 | Hd_13 |
| 14 | Hb_14 | Hc_14 | Hd_14 |
| 15 | Hb_15 | Hc_15 | Hd_15 |
| 16 | Hb_16 | Hc_16 | Hd_16 |
| ⋮ | ⋮ | ⋮ | ⋮ |
| 21 | Hb_21 | Hc_21 | Hd_21 |
| 22 | Hb_22 | Hc_22 | Hd_22 |
| 23 | Hb_23 | Hc_23 | Hd_23 |
| ⋮ | ⋮ | ⋮ | ⋮ |
| 28 | Hb_28 | Hc_28 | Hd_28 |
| 29 | Hb_29 | Hc_29 | Hd_29 |
| 30 | Hb_30 | Hc_30 | Hd_30 |
| ⋮ | ⋮ | ⋮ | ⋮ |
| 35 | Hb_35 | Hc_35 | Hd_35 |
| 36 | Hb_36 | Hc_36 | Hd_36 |
| 37 | Hb_37 | Hc_37 | Hd_37 |
| ⋮ | ⋮ | ⋮ | ⋮ |
| 42 | Hb_42 | Hc_42 | Hd_42 |
| 43 | Hb_43 | Hc_43 | Hd_43 |
| 44 | Hb_44 | Hc_44 | Hd_44 |
| ⋮ | ⋮ | ⋮ | ⋮ |
| 49 | Hb_49 | Hc_49 | Hd_49 |
| 50 | Hb_50 | Hc_50 | Hd_50 |
| 51 | Hb_51 | Hc_51 | Hd_51 |
| 52 | Hb_52 | Hc_52 | Hd_52 |
| 53 | Hb_53 | Hc_53 | Hd_53 |
| 54 | Hb_54 | Hc_54 | Hd_54 |
| 55 | Hb_55 | Hc_55 | Hd_55 |
| 56 | Hb_56 | Hc_56 | Hd_56 | first cycle: 1–7
second cycle: 8–14
third cycle: 15–21
fourth cycle: 22–28
fifth cycle: 29–35
sixth cycle: 36–42
seventh cycle: 43–49
eighth cycle: 50–56 table of correction values for regular print region

| row region No. | cyan | | |
|---|---|---|---|
| | Sb | Sc | Sd |
| 1 | Hb_1 | Hc_1 | Hd_1 |
| 2 | Hb_2 | Hc_2 | Hd_2 |
| 3 | Hb_3 | Hc_3 | Hd_3 |
| 4 | Hb_4 | Hc_4 | Hd_4 |
| 5 | Hb_5 | Hc_5 | Hd_5 |
| 6 | Hb_6 | Hc_6 | Hd_6 |
| 7 | Hb_7 | Hc_7 | Hd_7 |

$$Hb\_1 = \frac{Hb\_1 + Hb\_8 + Hb\_15 + Hb\_22 + Hb\_29 + Hb\_36 + Hb\_43 + Hb\_50}{8}$$

$$Hc\_1 = \frac{Hc\_1 + Hc\_8 + Hc\_15 + Hc\_22 + Hc\_29 + Hc\_36 + Hc\_43 + Hc\_50}{8}$$

$$Hd\_1 = \frac{Hd\_1 + Hd\_8 + Hd\_15 + Hd\_22 + Hd\_29 + Hd\_36 + Hd\_43 + Hd\_50}{8}$$

Fig.21B rotating

METHOD FOR JUDGING ACHIEVABILITY OF DENSITY CORRECTION OF IMAGE AND PRINTING APPARATUS

CROSS-REFERENCE TO RELATED APPLICATIONS

The present application claims priority from Japanese Patent Application No. 2005-304549 filed on Oct. 19, 2005, which is herein incorporated by reference.

BACKGROUND

1. Technical Field

The present invention relates to a method for judging achievability of density correction of an image and a printing apparatus.

2. Related Art

As a printing apparatus which prints an image, there is known an inkjet printer which forms dots by ejecting ink on a medium such as paper.

The inkjet printer repeats alternately the following operations: a dot formation operation in which dots are formed on a medium by ejecting ink from nozzles while a plurality of nozzle groups each consisting of a plurality of the nozzles lined up in a predetermined direction (hereinafter also referred to as a carrying direction) move in a direction intersecting the predetermined direction (hereinafter also referred to as a movement direction), and a carrying operation in which the medium is carried in the predetermined direction. Thus, an image is printed by forming dot rows consisting of dots which are lined up in the movement direction, the dot rows being formed in respective row regions which are lined up in the carrying direction.

Note that "row region" herein means a region consisting of a plurality of "unit regions" which are lined up in the movement direction. A "unit region" means a virtual rectangular region defined on a medium, and an ink droplet lands on this unit region to form the dot therein.

In such an image consisting of many row regions, there are cases in which unevenness in density occurs in a direction parallel with the movement direction. More specifically, when observing the image macroscopically, some of the row regions look darker and some of the row regions look lighter. Accordingly, this deteriorates image quality.

In order to suppress such unevenness in density, printers are proposed which stores correction values of density corresponding to the row regions and which performs density correction for each of the row regions based on the correction values during printing of an image (see JP-A-2005-224977).

The correction values are set onto the printer before shipping of the printer. It is desirable to verify whether or not density correction based on the set correction values has improved the unevenness in density at the time when the values are set.

As a method for performing such verification, there is a method of comparing degrees of unevenness in density between a comparison pattern whose density is not corrected and a comparison pattern whose density is corrected, these comparison patterns being printed by the printer to be verified. Further, it is considered to print these comparison patterns for each of the nozzle groups.

However, even in a case of a printer for which improvement effects against unevenness in density have been verified by the comparison patterns which are printed for each of the above-mentioned nozzle groups, unevenness in density may occur in an actual color image printed by the printer. In other words, there are cases in which unevenness in density which becomes conspicuous in an actual image is overlooked even through verification based on the above-mentioned comparison patterns formed with the nozzle groups. Accordingly, such a troubled printer may be shipped as a printer with which density correction is achievable.

SUMMARY

An advantage of some aspects of the invention is to achieve a method for judging achievability of density correction of an image and a printing apparatus, the method and the printing apparatus enabling to judge achievability of density correction of an image more precisely.

A primary aspect of the invention for solving the above-mentioned problems is a method for judging achievability of density correction of an image, the density correction being performed by a printing apparatus during printing of the image, the printing apparatus including a plurality of nozzle groups each consisting of a plurality of nozzles that are lined up in a predetermined direction, the method including:

printing on a medium a comparison pattern whose density is not corrected and a comparison pattern whose density is corrected, by causing at least two nozzle groups among a plurality of the nozzle groups to eject ink and forming dots in a mixed manner with the ink ejected from the at least two nozzle groups;

reading the density of each of the comparison patterns; and judging, based on the read density, achievability of density correction of an image.

Other features of the invention are described in the specification and the drawings.

BRIEF DESCRIPTION OF THE DRAWINGS

FIG. 21A is an explanatory diagram showing a table of correction values of cyan.

FIG. 21B is an explanatory diagram showing a table of correction values of cyan for a regular print region.

DESCRIPTION OF EXEMPLARY EMBODIMENTS

Figure 1:
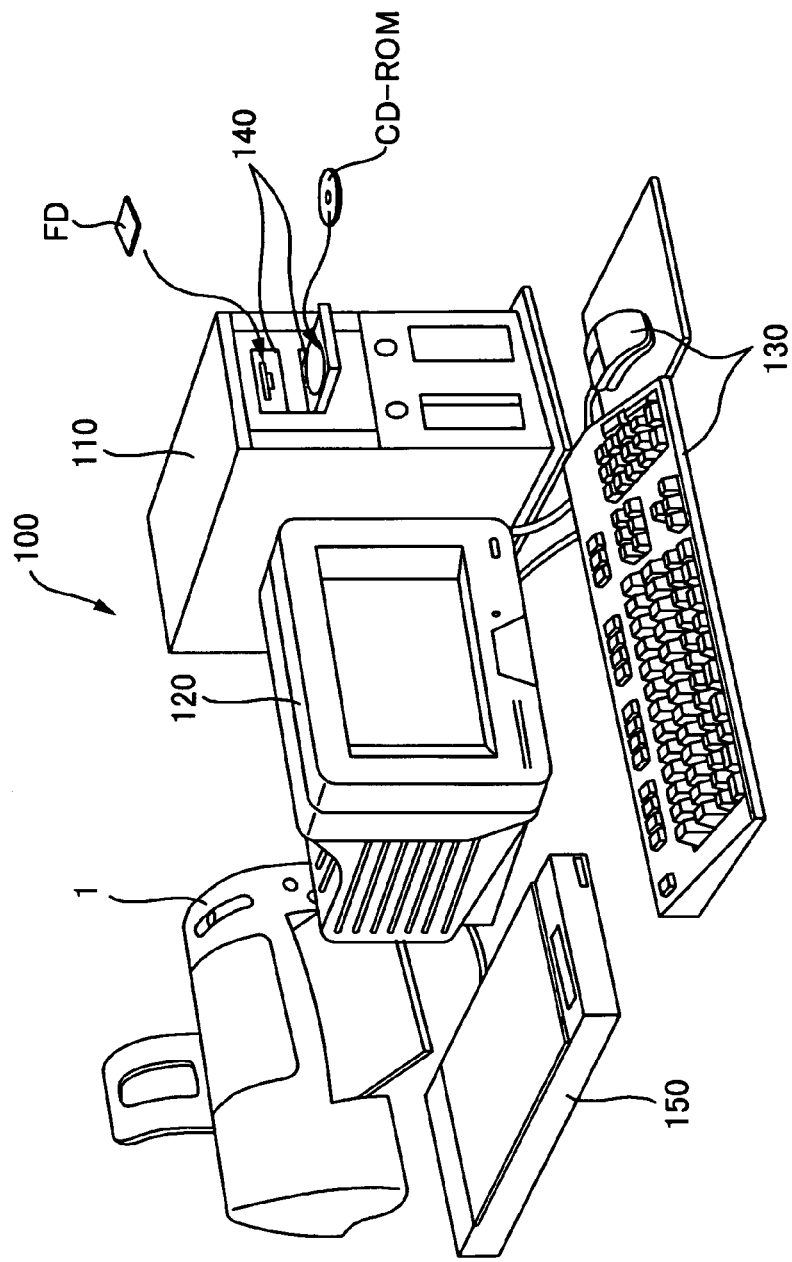
FIG. 1 is an explanatory diagram showing the configuration of a printing system 100.

At least the following matters will be made clear by the description in the present specification and the accompanying drawings.

A method for judging achievability of density correction of an image, the density correction being performed by a printing apparatus during printing of the image, the printing apparatus including a plurality of nozzle groups each consisting of a plurality of nozzles that are lined up in a predetermined direction, the method including:

printing on a medium a comparison pattern whose density is not corrected and a comparison pattern whose density is corrected, by causing at least two nozzle groups among a plurality of the nozzle groups to eject ink and forming dots in a mixed manner with the ink ejected from the at least two nozzle groups;

reading the density of each of the comparison patterns; and judging, based on the read density, achievability of density correction of an image.

With such a method for judging achievability of density correction of an image, the comparison patterns are printed by ejecting inks from two or more nozzle groups and mixing dots of the inks ejected from the nozzle groups. Accordingly, it becomes possible to give such comparison patterns greater capability to detect unevenness in density which is caused for reasons common to a plurality of the nozzle groups than that of comparison patterns printed for each of the nozzle groups. This enables to judge achievability of density correction of an image more precisely.

The reason thereof is that, if unevenness in density is caused for reasons common to a plurality of nozzle groups, such unevenness should occur under a tendency common to all of the nozzle groups. In such case, when the comparison patterns are formed by mixing dots of inks ejected from two or more nozzle groups, instead of forming the patterns with dots of ink from each of the nozzle groups, density fluctuation caused by such unevenness in density is amplified and becomes more conspicuous. Such comparison patterns enable to detect surely unevenness in density which is overlooked in a case of comparison patterns printed for each of the nozzle groups. It therefore becomes possible to increase precision of verifying improvement effects of density correction against unevenness in density, that is, to judge achievability of density correction of an image more precisely.

In this method for judging achievability of density correction of an image, it is possible that the nozzle groups are provided for respective colors of inks which are ejected during printing of the image.

In this method for judging achievability of density correction of an image, it is desirable that a same type of ink is ejected from the nozzles of the at least two nozzle groups during printing of the comparison patterns.

Such a method for judging achievability of density correction of an image enables to judge with one type of ink achievability of density correction of an image. In short, it makes the judgment easier.

In this method for judging achievability of density correction of an image, it is desirable that the colors of inks ejected during printing of the image are cyan, magenta, yellow and black, and that the same type of ink is ink which has a same hue as any one of the cyan ink, the magenta ink, the yellow ink and the black ink and which is lighter in color tone than that ink.

Since such a method for judging achievability of density correction of an image enables to magnify difference in density unevenness, it becomes possible to detect more surely unevenness in density which has been overlooked. The reason thereof is that difference in density in a case of light-colored ink is greater than in a case of dark-colored ink.

In addition, since the comparison patterns are printed with ink which is lighter in color tone than and has a same hue as one of inks ejected during printing of the image, it becomes possible to lighten a task of washing nozzles, the task being performed after printing of these comparison patterns and before shipping.

In this method for judging achievability of density correction of an image, it is desirable that the colors of inks ejected during printing of the image are cyan, magenta, yellow and black, and that the at least two nozzle groups used for formation of the comparison patterns are a cyan ink nozzle group, a magenta ink nozzle group and a yellow ink nozzle group.

Such a method for judging achievability of density correction of an image enables to enhance capability to detect unevenness in density occurring in printing of a color image since the comparison patterns are printed by ejecting ink from nozzles of nozzle groups which are for cyan ink, magenta ink, and yellow ink respectively and are used in printing of a color image.

In this method for judging achievability of density correction of an image, it is desirable that each of the comparison patterns is printed by performing dot row formation of forming dot rows along a direction intersecting the predetermined direction in respective row regions which are lined up in the predetermined direction, the dot row formation being performed by repeating alternately a dot formation operation in which dots are formed on the medium by ejecting ink from a plurality of the nozzles moving in the intersecting direction and a carrying operation in which the medium is carried in the predetermined direction, and that the read density is generated for each of the row regions.

Since the read density is generated for each of the row regions with such a method for judging achievability of density correction of an image, it becomes possible to increase an amount of information to be used for verifying improvement effects against unevenness in density and to judge achievability of density correction of an image more precisely.

In this method for judging achievability of density correction of an image, it is desirable that each of the comparison patterns is printed based on image data, that the image data has tone value data of density, the tone value data being for forming the dot rows in respective row regions of each of the comparison patterns, and that the tone value data is uniform throughout all of the row regions included in each of the comparison patterns.

With such a method for judging achievability of density correction of an image, dot rows are formed based on tone values which are uniform throughout all row regions of the comparison patterns. This makes unevenness in density more conspicuous, the unevenness being caused by variation in spacing between contiguous dot rows. As a result thereof, it becomes possible to judge achievability of density correction of an image more precisely.

In this method for judging achievability of density correction of an image, it is desirable that variation in density is obtained for each of the comparison pattern whose density is not corrected and the comparison pattern whose density is corrected, based on the read density of the row regions, and that achievability of density correction of an image is judged based on the variation in density.

Such a method for judging achievability of density correction of an image makes the judgment more precise because achievability of density correction is judged based on variation in density of row regions.

In this method for judging achievability of density correction of an image, it is desirable that each of the comparison patterns is divided into divided regions which are larger than the row region, that the variation in density is obtained for each of the divided regions, and that achievability of density correction of an image is judged based on a result of comparison in which the variation in density of each of the divided regions in the comparison pattern whose density is not corrected is compared with the variation in density of each of the corresponding divided regions in the comparison pattern whose density is corrected.

Since variation in density is compared for each pair of divided regions corresponding to each other between the comparison patterns in such a method for judging achievability of density correction of an image, it becomes possible to prevent difference between divided regions from affecting the variation. This enables to judge achievability of density correction of an image more precisely.

In this method for judging achievability of density correction of an image, it is desirable that when printing each of the comparison patterns on the medium, in addition to printing of the comparison patterns with the ink ejected from the nozzles of the at least two nozzle groups using predetermined tone value data, printing of a pair of a comparison pattern whose density is not corrected and a comparison pattern whose density is corrected is performed for each nozzle group, the pair of comparison patterns for each nozzle group being formed with dots of ink ejected only from a single corresponding nozzle group using predetermined tone value data, and that when judging the achievability of density correction of an image, it is judged that the density correction of an image is achievable if the variation in density of all of the divided regions in all of the comparison patterns whose density is corrected is equal to or smaller than the variation in density of all of the corresponding divided regions in all of the corresponding comparison patterns whose density is not corrected.

With such a method for judging achievability of density correction of an image, it is judged that density correction of an image is achievable if, with respect to all divided regions included in all comparison patterns, the variation in density of the divided region in a case where density correction is performed is the same as or smaller than that in a case where density correction is not performed; the comparison patterns including not only the patterns printed with the two or more nozzle groups but also the patterns printed with dots of ink ejected from only one nozzle group. This enables to judge achievability of density correction of an image more precisely.

In this method for judging achievability of density correction of an image, it is desirable that, when judging the achievability of density correction of an image, if it is judged that the density correction is not achievable, either one of a warning prompting to re-print the comparison patterns and a warning prompting to re-generate a correction value of the density is given.

Such a method for judging achievability of density correction of an image enables to reduce the number of printers which, because of an inspector's misoperation in the judgment, are misjudged that density correction is not achievable.

In this method for judging achievability of density correction of an image, it is desirable that a correction pattern is printed by performing dot row formation of forming dot rows along a direction intersecting the predetermined direction in respective row regions that are lined up in the predetermined direction, the dot row formation being performed by repeating alternately a dot formation operation in which dots are formed on a medium by ejecting ink from a plurality of the nozzles moving in the intersecting direction and a carrying operation in which the medium is carried in the predetermined direction, that density of each of the row regions is read from the correction pattern, that a correction value is obtained for each of the row regions based on the read density, and that, if it is judged that the density correction is achievable, density correction is performed for each of the row regions based on the correction value during printing of an image.

Such a method for judging achievability of density correction of an image enables to judge more precisely achievability of density correction which is for suppressing unevenness in density of an image which is formed by repeating alternately a dot formation operation and a carrying operation.

A method for judging achievability of density correction of an image, the density correction being performed by a printing apparatus during printing of the image, the printing apparatus including a plurality of nozzle groups each consisting of a plurality of nozzles that are lined up in a predetermined direction, the method including:

printing on a medium a comparison pattern whose density is not corrected and a comparison pattern whose density is corrected, by causing at least two nozzle groups among a plurality of the nozzle groups to eject ink and forming dots in a mixed manner with the ink ejected from the at least two nozzle groups;

reading the density of each of the comparison patterns; and judging, based on the read density, achievability of density correction of an image; wherein:

the nozzle groups are provided for respective colors of inks that are ejected during printing of the image;

a same type of ink is ejected from the nozzles of the at least two nozzle groups during printing of the comparison patterns;

the colors of inks ejected during printing of the image are cyan, magenta, yellow and black, and the same type of ink is ink that has a same hue as any one of the cyan ink, the magenta ink, the yellow ink and the black ink and that is lighter in color tone than that ink;

the at least two nozzle groups used for formation of the comparison patterns are a cyan ink nozzle group, a magenta ink nozzle group and a yellow ink nozzle group;

each of the comparison patterns is printed by performing dot row formation of forming dot rows along a direction intersecting the predetermined direction in respective row regions that are lined up in the predetermined direction, the dot row formation being performed by repeating alternately a dot formation operation in which dots are formed on the medium by ejecting ink from a plurality of the nozzles moving in the intersecting direction and a carrying operation in which the medium is carried in the predetermined direction; the read density is generated for each of the row regions;

each of the comparison patterns is printed based on image data; the image data has tone value data of density, the tone value data being for forming the dot rows in respective row regions of each of the comparison patterns; the tone value data is uniform throughout all of the row regions included in each of the comparison patterns;

variation in density is obtained for each of the comparison pattern whose density is not corrected and the comparison pattern whose density is corrected, based on the read density of the row regions and achievability of density correction of an image is judged based on the variation in density;

each of the comparison patterns is divided into divided regions that are larger than the row region, the variation in density is obtained for each of the divided region, and achievability of density correction of an image is judged based on a result of comparison in which the variation in density of each of the divided regions in the comparison pattern whose density is not corrected is compared with the variation in density of each of the corresponding divided regions in the comparison pattern whose density is corrected;

when printing each of the comparison patterns on the medium, in addition to printing of the comparison patterns with the ink ejected from the nozzles of the at least two nozzle groups using predetermined tone value data, printing of a pair of a comparison pattern whose density is not corrected and a comparison pattern whose density is corrected is performed for each nozzle group, the pair of comparison patterns for each nozzle group being formed with dots of ink ejected only from a single corresponding nozzle group using predetermined tone value data;

when judging the achievability of density correction of an image, it is judged that the density correction of an image is achievable if the variation in density of all of the divided regions in all of the comparison patterns whose density is corrected is equal to or smaller than the variation in density of all of the corresponding divided regions in all of the corresponding comparison patterns whose density is not corrected;

when judging the achievability of density correction of an image, if it is judged that the density correction is not achievable, either one of a warning prompting to re-print the comparison patterns and a warning prompting to re-generate a correction value of the density is given; and a correction pattern is printed by performing dot row formation of forming dot rows along a direction intersecting the predetermined direction in respective row regions that are lined up in the predetermined direction, the dot row formation being performed by repeating alternately a dot formation operation in which dots are formed on a medium by ejecting ink from a plurality of the nozzles moving in the intersecting direction and a carrying operation in which the medium is carried in the predetermined direction, density of each of the row regions is read from the correction pattern, a correction value is obtained for each of the row regions based on the read density, and if it is judged that the density correction is achievable, density correction is performed for each of the row regions based on the correction value during printing of an image.

Such a method for judging achievability of density correction of an image enables to achieve an advantage of some aspects of the invention more effectively because all effects mentioned above are achieved.

It is also possible to achieve a printing apparatus including: a plurality of nozzle groups each consisting of a plurality of nozzles that are lined up in a predetermined direction; the printing apparatus performing density correction of an image during printing of the image; the printing apparatus printing on a medium a comparison pattern whose density is not corrected and a comparison pattern whose density is corrected, by causing at least two nozzle groups among a plurality of the nozzle groups to eject ink and forming dots in a mixed manner with the ink ejected from the at least two nozzle groups.

Configuration of Printing System 100

Printing System 100

FIG. 1 is an explanatory diagram showing the configuration of a printing system 100, which consists of at least a printing apparatus and a printing control apparatus that controls operations of the printing apparatus. The printing system 100 of the present embodiment is provided with a printer 1, a computer 110, a display device 120, input devices 130, record/play devices 140, and a scanner 150.

The printer 1 is for printing images on a medium such as paper, cloth, film, and OHP film. The computer 110 is communicably connected to the printer 1. In order to make the printer 1 print an image, the computer 110 outputs print data corresponding to that image to the printer 1. This computer 110 has computer programs, such as an application program and a printer driver, installed thereon. A scanner driver is installed on the computer 110 and is for controlling the scanner 150 and for receiving image data of a document 5 read by the scanner 150.

Printer 1

Figure 2:
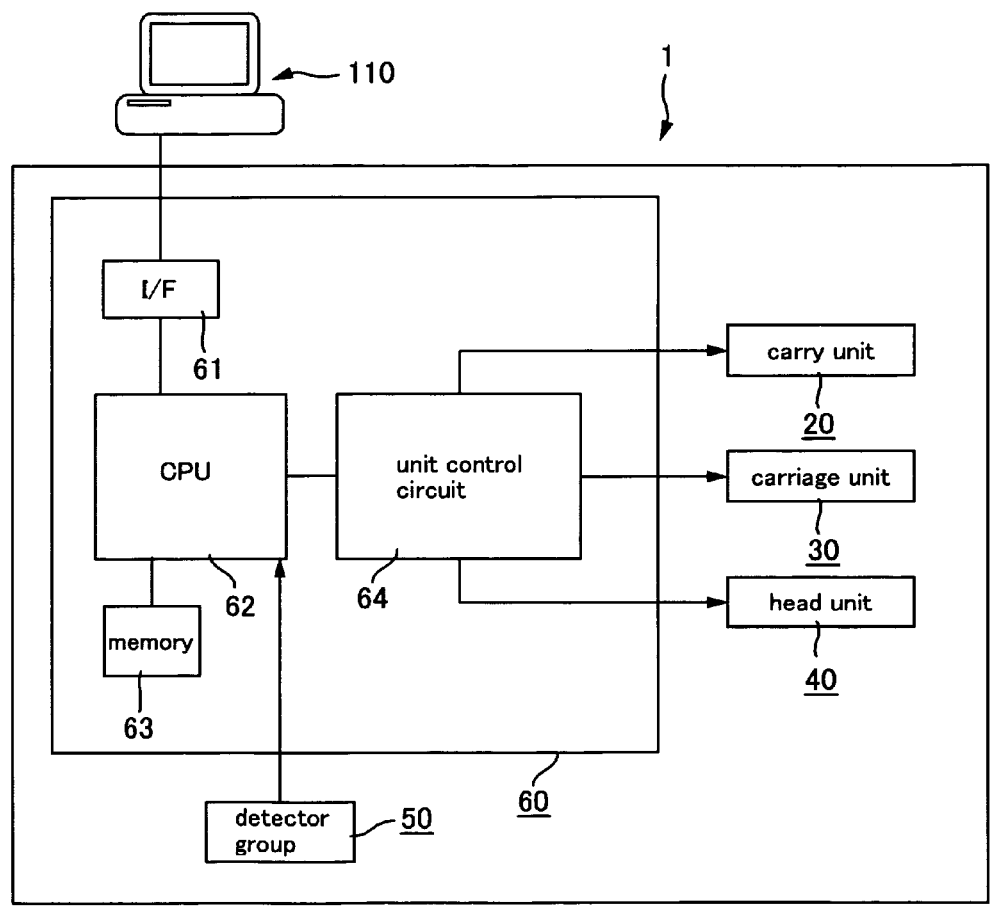
FIG. 2 is a block diagram showing the overall configuration of a printer 1.
Figure 3A:
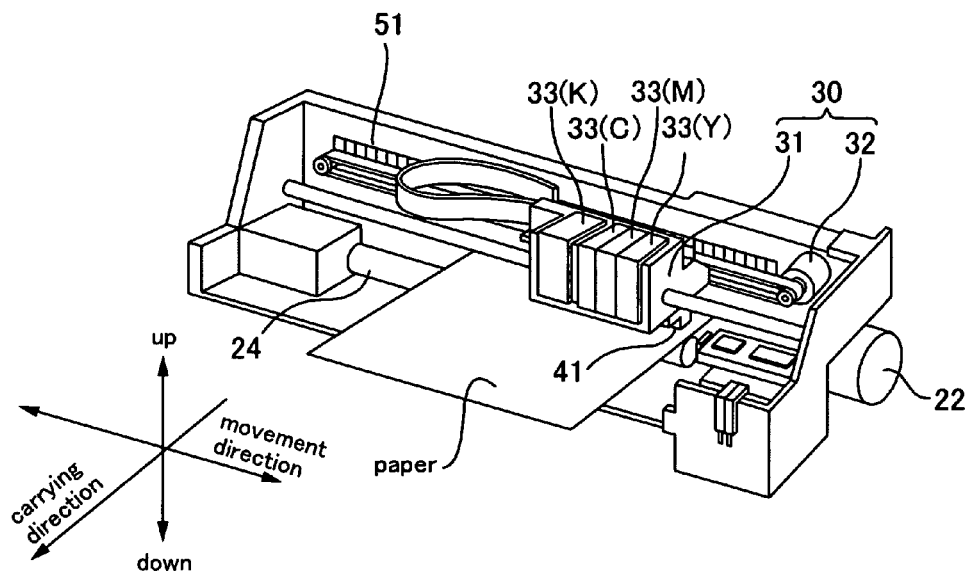
FIG. 3A is a schematic diagram showing the overall structure of the printer 1 and FIG. 3B is a cross-sectional view showing the overall structure of the printer 1.
Figure 3B:
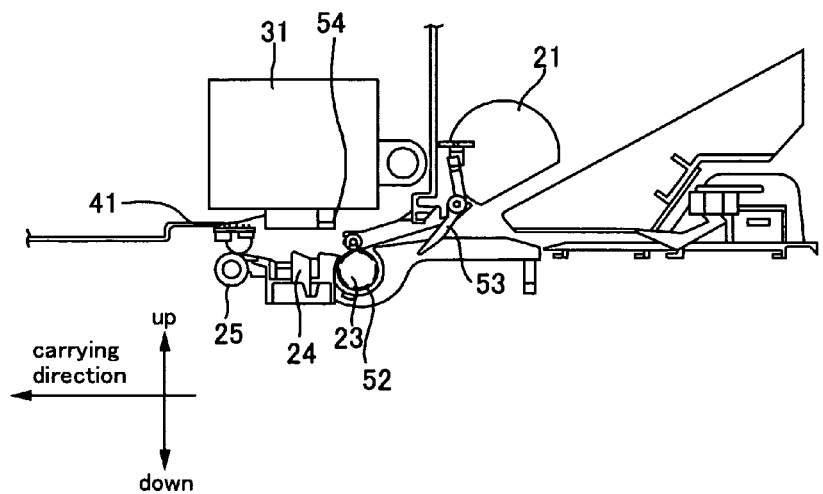

FIG. 2 is a block diagram showing the overall configuration of the printer 1. FIG. 3A is a schematic diagram showing the overall structure of the printer 1. FIG. 3B is a cross-sectional view of the overall structure of the printer 1. The basic structure of the printer 1 according to the present embodiment is described below.

The printer 1 has a carry unit 20, a carriage unit 30, a head unit 40, a detector group 50, and a controller 60. The printer 1 receives print data from the computer 110, which is an external device, and controls the various units (the carry unit 20, the carriage unit 30, and the head unit 40) through the controller 60. The controller 60 controls these units based on the print data received from the computer 110 to print an image on the paper. The detector group 50 monitors the conditions within the printer 1, and outputs the result of this detection to the controller 60. The controller 60 controls these units based on this detection result received from the detector group 50.

The carry unit 20 is for carrying a medium such as paper in a predetermined direction (hereinafter referred to as the carrying direction). The carry unit 20 has a paper supply roller 21, a carry motor 22 (also referred to as "PF motor"), a carry roller 23, a platen 24, and a paper discharge roller 25. The paper supply roller 21 is a roller for supplying, into the printer 1, paper that has been inserted into a paper insert opening. The carry roller 23 is a roller for carrying a paper that has been supplied by the paper supply roller 21 up to a printable region, and is driven by the carry motor 22. The platen 24 supports the paper being printed. The paper discharge roller 25 is a roller for discharging the paper outside the printer 1, and is provided on the downstream side in the carrying direction with respect to the printable region. The paper discharge roller 25 is rotated in synchronization with the carry roller 23.

The carriage unit 30 is for making a head 41 (to be described later) move in a predetermined direction (hereinafter referred to as the movement direction). The carriage unit 30 has a carriage 31 and a carriage motor 32 (also referred to as "CR motor"). The carriage 31 can be moved back and forth in the movement direction. The carriage 31 detachably holds ink cartridges 33 which contain ink. The carriage motor 32 is a motor for moving the carriage 31 in the movement direction.

The head unit 40 is for ejecting ink onto the paper. The head unit 40 has a head 41. The head 41 has a plurality of nozzles and intermittently ejects ink from those nozzles. The head 41 is provided in the carriage 31. Thus, when the carriage 31 moves in the movement direction, the head 41 also moves in the movement direction. Dot rows are formed on the paper in the movement direction due to the head 41, the head 41 intermittently ejecting ink while moving in the movement direction.

Figure 4:
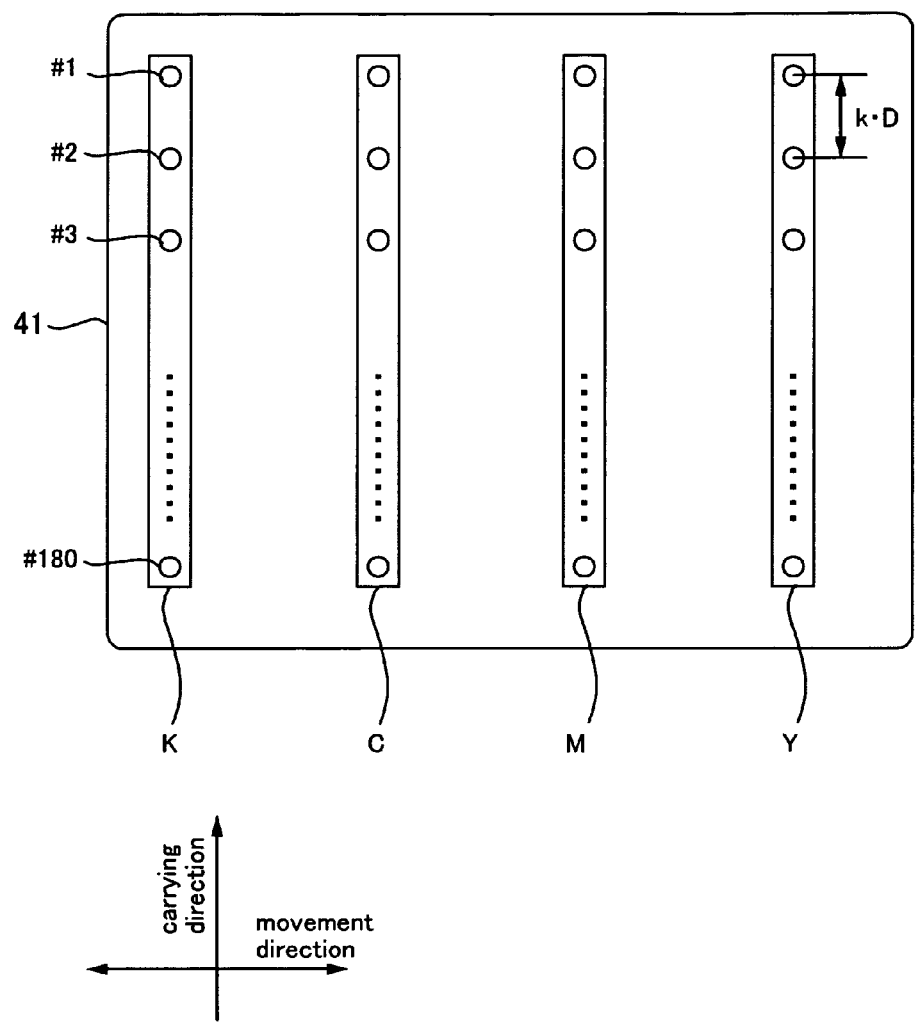
FIG. 4 is an explanatory diagram showing the arrangement of nozzles in the lower surface of a head 41.

FIG. 4 is an explanatory diagram showing the arrangement of the nozzles in the lower surface of the head 41. A black ink nozzle group K, a cyan ink nozzle group C, a magenta ink nozzle group M, and a yellow ink nozzle group Y are formed in the lower surface of the head 41. Each nozzle group is provided with a plurality of nozzles, which are ejection openings for ejecting ink of the respective colors. A plurality of the nozzles of each of the nozzle groups are arranged in rows at a constant spacing (nozzle pitch: k·D) in the carrying direction. Here, D is the minimum dot pitch in the carrying direction (that is, the spacing between dots formed on the paper S at maximum resolution). Further, k is an integer of 1 or more. For example, if the nozzle pitch is 180 dpi (1/180 inch), and the dot pitch in the carrying direction is 720 dpi (1/720 inch), then k=4. Each nozzle of each of the nozzle groups is assigned a number (#1 to #180) that becomes smaller as the nozzle is arranged more downstream. Each nozzle is provided with an ink chamber (not shown) and a piezo element. Driving the piezo element causes the ink chamber to expand and contract, thereby ejecting an ink droplet from the nozzle.

Note that ink is supplied to each of the nozzle groups by ink cartridges 33 (C), 33 (M), 33 (Y), and 33 (K) attached to the carriage 31 (see FIG. 3) for respective colors of ink. More specifically, the carriage 31 is furnished with ink cartridge attachment sections for respective colors of ink (not shown) to which these ink cartridges 33 (C), 33 (M), 33 (Y), and 33 (K) are attached. Ink supply openings of each ink cartridge 33 (C), 33 (M), 33 (Y), and 33 (K) containing respective colors of ink are secured on their corresponding ink cartridge attachment sections, and ink is supplied to the nozzles of each of the nozzle groups corresponding to the color of the ink.

The detector group 50 includes a linear encoder 51, a rotary encoder 52, a paper detection sensor 53, an optical sensor 54, and the like. The linear encoder 51 is for detecting the position of the carriage 31 in the movement direction. The rotary encoder 52 is for detecting the amount of rotation of the carry roller 23. The paper detection sensor 53 is for detecting the position of the front end of the paper to be printed. The optical sensor 54 is attached to the carriage 31. The optical sensor 54 detects whether or not the paper is present, through its light-receiving section detecting the reflected light of the light that has been irradiated onto the paper from its light-emitting section.

The controller 60 is a control section for carrying out control of the printer 1. The controller 60 includes an interface section 61, a CPU 62, a memory 63, and a unit control circuit 64. The interface section 61 is for exchanging data between the computer 110, which is an external device, and the printer 1. The CPU 62 is a processing unit for carrying out overall control of the printer 1. The memory 63 is for ensuring a working area and a storage area for the programs for the CPU 62, for instance, and includes storage devices such as a RAM or an EEPROM. The CPU 62 controls the various units through the unit control circuit 64 in accordance with programs stored in the memory 63.

Scanner 150

Figure 5A:
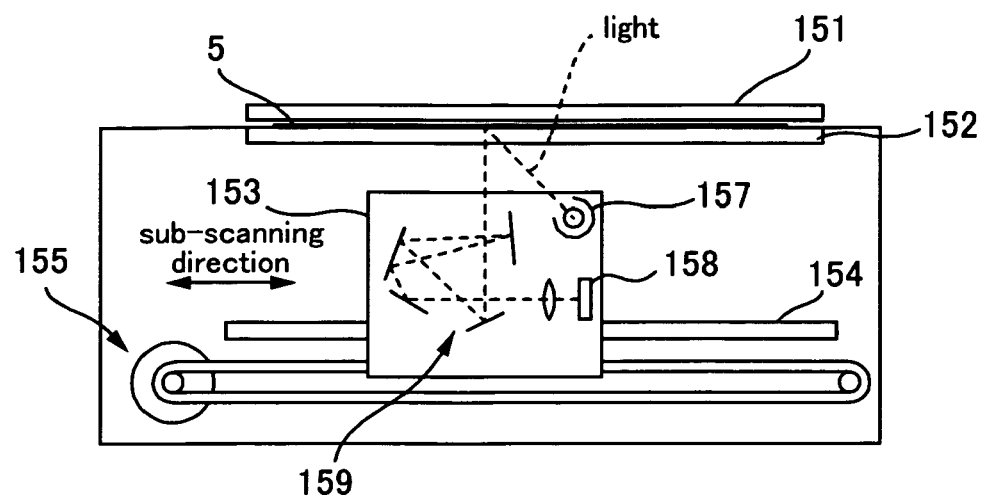
FIG. 5A is a vertical sectional view of a scanner 150 and FIG. 5B is a plan view of the scanner 150 with a lid 151 detached.
Figure 5B:
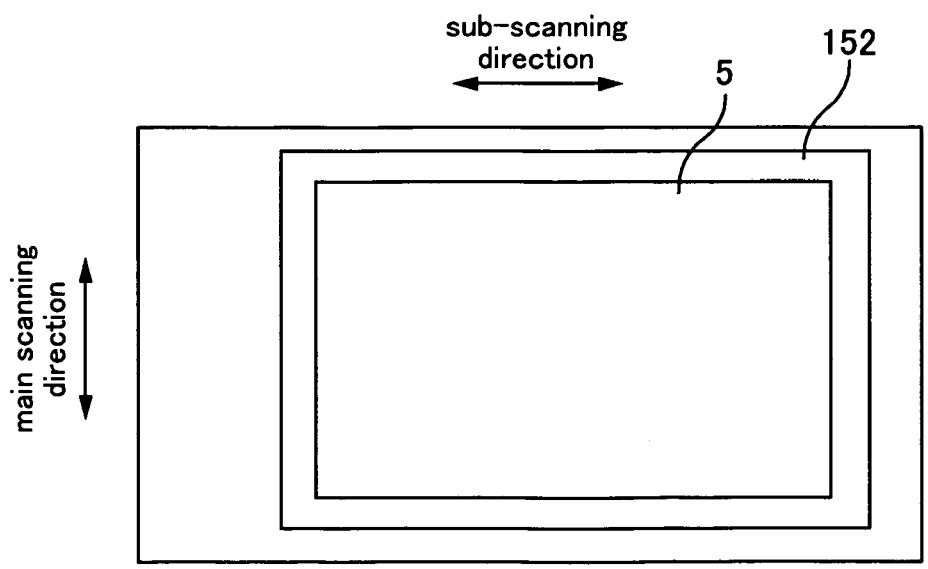

FIG. 5A is a vertical sectional view of the scanner 150. FIG. 5B is a plan view of the scanner 150 with a lid 151 detached.

The scanner 150 is provided with the lid 151, a document platen glass 152 on which a document 5 is placed, a reading carriage 153 that faces the document 5 through the document platen glass 152 and that moves in a sub-scanning direction, a guiding member 154 for guiding the reading carriage 153 in the sub-scanning direction, a moving mechanism 155 for moving the reading carriage 153, and a scanner controller (not shown) that controls the various units of the scanner 150. The reading carriage 153 has an exposure lamp 157 that shines light on the document 5, a line sensor 158 that detects a line image in a main scanning direction (in FIG. 5A, the direction normal to the surface of the paper on which the figure is described), and optical devices 159 that lead the reflected light from the document 5 to the line sensor 158. Dotted lines in the reading carriage 153 shown in FIG. 5A show the path of light.

In order to read an image of the document 5, an operator raises the lid 151, places the document 5 on the document platen glass 152, and lowers the lid 151. The scanner controller moves the reading carriage 153 in the sub-scanning direction with the exposure lamp 157 emitting light, and the line sensor 158 reads the image on a surface of the document 5. The scanner controller transmits the read image data to the scanner driver installed on the computer 110, and thereby, the computer 110 obtains the image data of the document 5.

Printing Process

Regarding Printing Process

Figure 6:
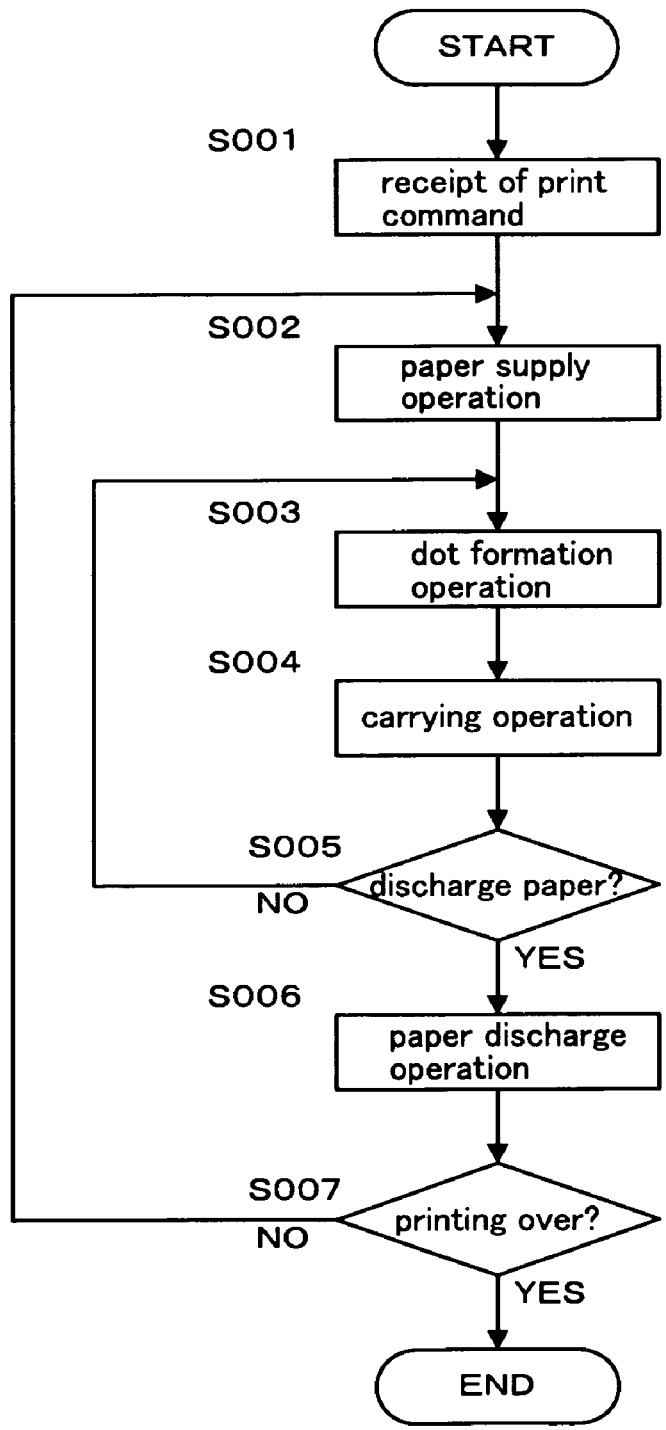
FIG. 6 is a flowchart of operations during printing.

FIG. 6 is a flowchart of the operations during printing. The operations described below are executed by the controller 60 controlling the various units in accordance with a program stored in the memory 63. This program includes codes for executing the various operations.

Receipt of Print Command (S001): The controller 60 receives a print command via the interface section 61 from the computer 110. This print command is included in a header of print data transmitted from the computer 110. The controller 60 then analyzes the content of the various commands included in the print data received, and performs the following processes such as paper supply operation, carrying operation, and dot formation operation by using the various units.

Paper Supply Operation (S002): The paper supply operation is an operation for supplying paper to be printed into the printer 1 and positioning the paper at a predetermined printable position (also referred to as "indexed position"). The controller 60 positions the paper at the indexed position by rotating the paper supply roller 21 and the carry roller 23.

Dot Formation Operation (S003): The dot formation operation is an operation for forming dots on the paper by ejecting ink intermittently from the head 41 that moves in the movement direction. The controller 60 moves the carriage 31 in the movement direction by driving the carriage motor 32, and then, while the carriage 31 is moving, causes the head 41 to eject ink in accordance with pixel data contained in the print data. Dots are formed on the paper when ink droplets ejected from the head 41 land on the paper. Since ink is intermittently ejected from the head 41 that is moving, dot rows consisting of a plurality of dots in the movement direction are formed on the paper.

Carrying Operation (S004): The carrying operation is an operation for moving the paper relative to the head 41 in the carrying direction. The controller 60 carries the paper in the carrying direction perpendicular to the movement direction by rotating the carry roller 23. Due to this carrying operation, the head 41 can form dots at positions that are different from the positions of the dots formed in the preceding dot formation operation, in the next dot formation operation.

Paper Discharge Determination (S005): The controller 60 determines whether or not to discharge the paper being printed. The paper is not discharged if there remains data to be printed on the paper being printed. The controller 60 gradually prints an image consisting of dots on the paper by repeating alternately the dot formation operation and the carrying operation until there is no more data to be printed.

Paper Discharge Operation (S006): When there is no more data to be printed on the paper being printed, the controller 60 discharges the paper by rotating the paper discharge roller 25. Note that whether or not to discharge the paper can also be determined based on a paper discharge command included in the print data.

Print Ending Determination (S007): Next, the controller 60 determines whether or not to continue printing. If a next sheet of paper is to be printed, then printing is continued and the paper supply operation for the next paper starts. If the next sheet of paper is not to be printed, then the printing operation is terminated.

Regarding Formation of Dot Rows

First, regular printing is described. The regular printing of the present embodiment is carried out using a printing method referred to as interlaced printing. Here, "interlaced printing" means a printing scheme in which dot rows that are not drawn are sandwiched between dot rows that are drawn in one pass. A "pass" refers to one dot formation operation, and "pass n" refers to the nth dot formation operation. A "dot row" refers to a row of dots lined up in the movement direction.

Figure 7A:
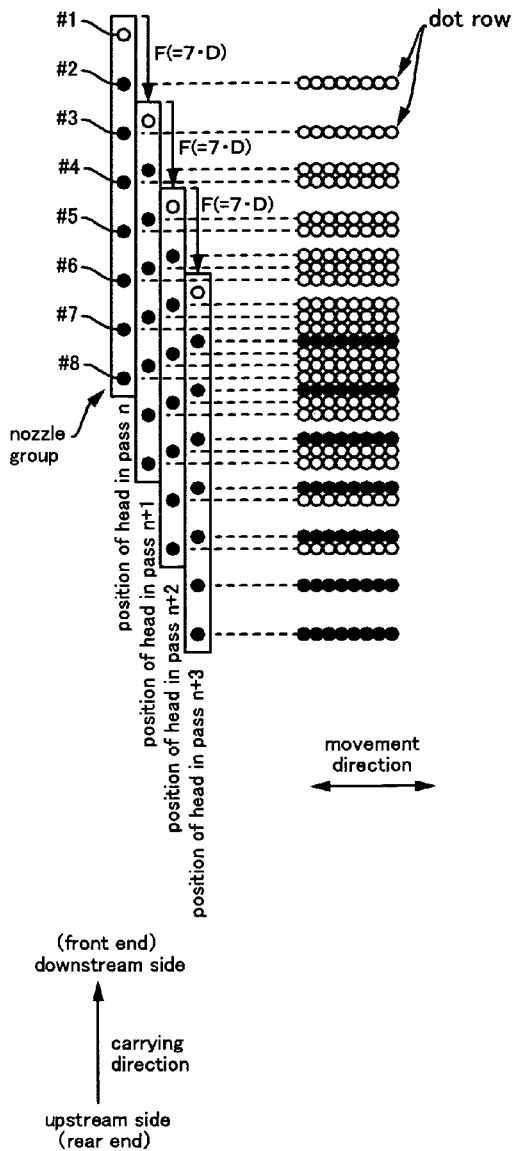
FIGS. 7A and 7B are explanatory diagrams of regular printing.
Figure 7B:
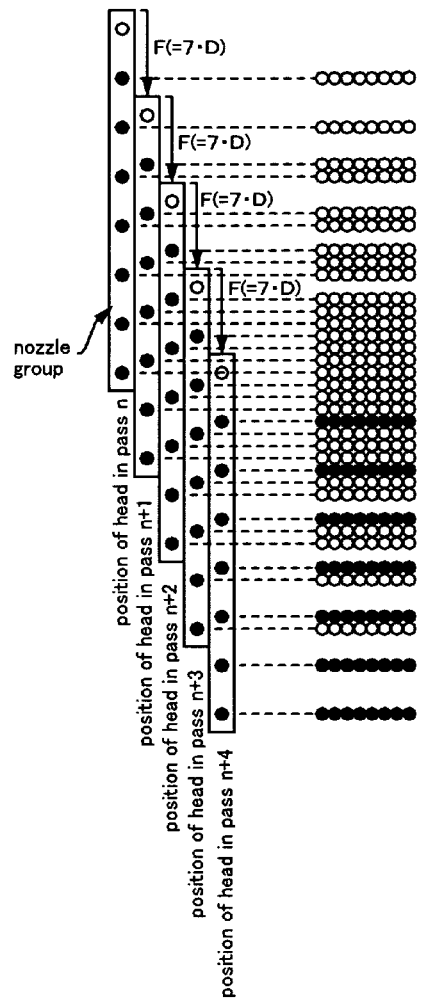

FIGS. 7A and 7B are explanatory diagrams of regular printing. FIG. 7A shows positions of the head 41 and how dots are formed in each of the pass n through pass n+3, and FIG. 7B shows positions of the head 41 and how dots are formed in each of the pass n through pass n+4.

It should be noted that, for convenience's sake, only one of a plurality of the nozzle groups is shown instead of the head 41 and the number of nozzles of each nozzle group is reduced in FIGS. 7A and 7B. In addition, the nozzle group is illustrated as if it is moving with respect to the paper, but the figures merely show the relative positional relationship between the nozzle groups (the head 41) and the paper, and in reality, the paper moves in the carrying direction. Furthermore, for convenience of explanation, each nozzle is illustrated as if it forms only a few dots (circles in the figure), but in reality, dot rows are formed by numerous dots lined up in the movement direction because ink droplets are intermittently ejected from the nozzles that move in the movement direction. As a matter of course, depending on the pixel data, there are cases in which a dot is not formed.

In the figure, a nozzle shown with a filled circle is a nozzle that is allowed to eject ink and a nozzle shown with a white circle is a nozzle that is not allowed to eject ink. Furthermore, in the figure, a dot shown with a filled circle is a dot that is formed in the last pass and a dot shown with a white circle is a dot that is formed in any other pass therebefore.

In this interlaced printing, every time the paper is carried in the carrying direction by a constant carry amount F, each nozzle draws a dot row immediately above another dot row that was drawn in the immediately prior pass. In order to carry out drawing with a constant carry amount in this way, it is required (1) that the number N (integer) of nozzles that are allowed to eject ink is coprime to k and (2) that the carry amount F is set to N·D. Here, N=7, k=4, and F=7·D (D=1/720 inch).

However, there is a region in which dot rows can not be formed continuously in the carrying direction in a case of using only this regular printing. Therefore, printing methods which are respectively referred to as front-end printing and rear-end printing are carried out respectively before or after the regular printing.

Figure 8:
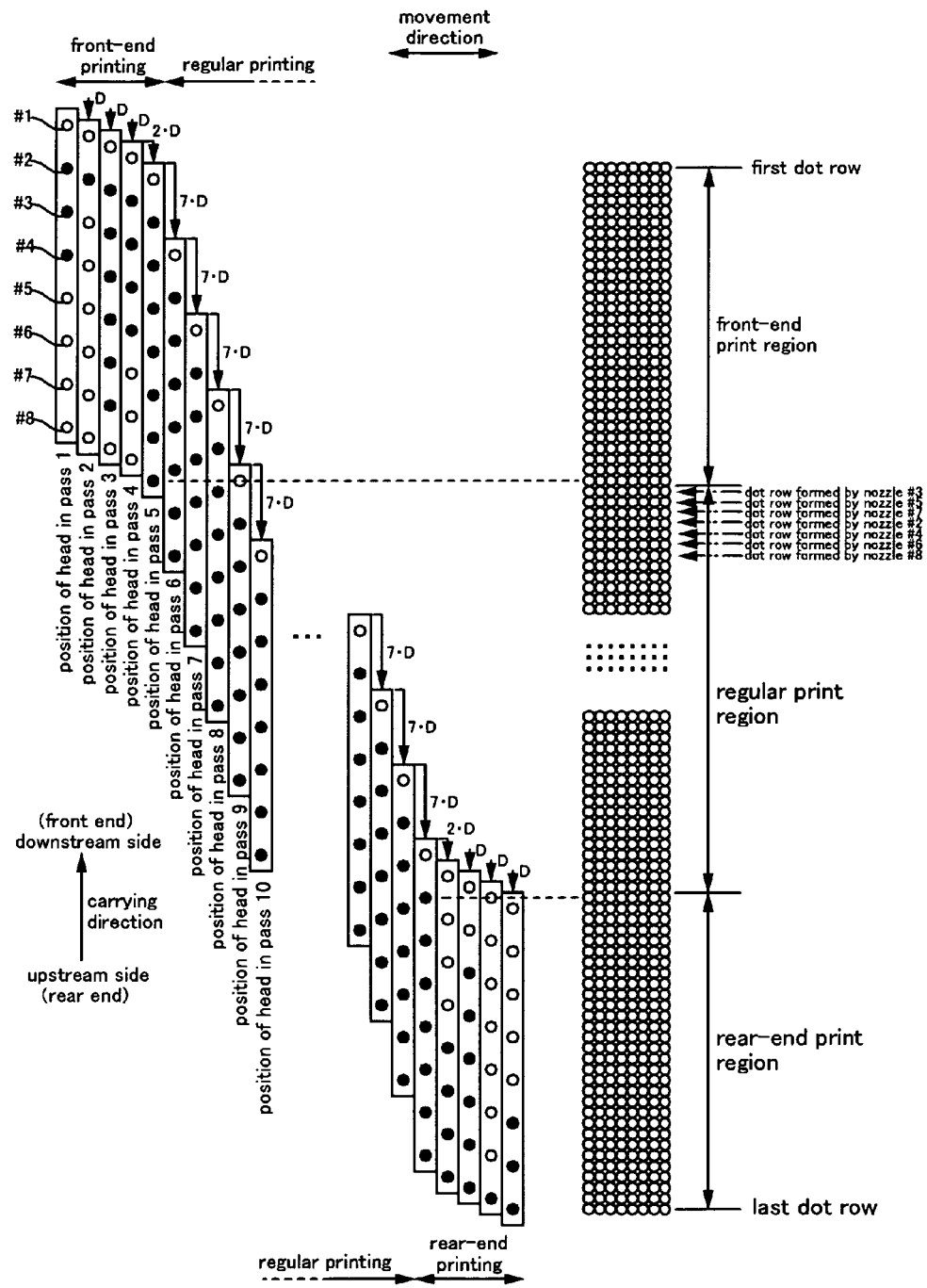
FIG. 8 is an explanatory diagram of front-end printing and rear-end printing.

FIG. 8 is an explanatory diagram of the front-end printing and rear-end printing. The first five passes correspond to the front-end printing, and the last five passes correspond to the rear-end printing.

In the front-end printing, at the time when a part near the front end of the print image is printed, the paper is carried by a smaller carry amount (1·D or 2·D) than the carry amount in the regular printing (7·D). Also, in the front-end printing, the nozzles that eject ink are not fixed. In the rear-end printing, in the same way as the front-end printing, at the time when a part near the rear end of the print image is printed, the paper is carried by a smaller carry amount (1·D or 2·D) than the carry amount in the regular printing (7·D). Also, in the rear-end printing, in the same way as the front-end printing, the nozzles that eject ink are not fixed. In this way, a plurality of dot rows lined up continuously in the carrying direction can be formed between the first dot row and the last dot row.

A region in which dot rows are formed solely by the regular printing (a central region) is referred to as a "regular print region". A region which is located on the front-end side of the paper (the downstream side in the carrying direction) with respect to the regular print region (an end region on the downstream side) is referred to as a "front-end print region". A region which is located on the rear-end side of the paper (the upstream side in the carrying direction) with respect to the regular print region (an end region on the upstream side) is referred to as a "rear-end print region". In the front-end print region, thirty dot rows are formed. Also, in the rear-end print region, thirty dot rows are formed. In the regular print region, thousands of dot rows are formed, depending on the size of the paper.

The order of nozzles corresponding to respective row regions (a region in which a dot row is to be formed; as will be described in greater detail later) in the regular print region has regularity for each set of row regions of a predetermined number P corresponding to the carry amount (seven in this example). In other words, the nozzle corresponding to each of the row regions changes in order with a cycle of seven row regions.

For example, in the row regions from the first one through the seventh one located in the regular print region shown in FIG. 8, dot rows are formed respectively by nozzle #3, nozzle #5, nozzle #7, nozzle #2, nozzle #4, nozzle #6, and nozzle #8, and in the seven row regions following the seventh row region, dot rows are formed respectively by the nozzles in the same order as mentioned above.

On the other hand, in the front-end print region and the rear-end print region, there is no simple regularity in order of nozzles corresponding to respective row regions in comparison with the dot rows in the regular print region. However, the nozzle corresponding to each of the row regions in the front-end print region and the rear-end print region is also determined in advance. For example, as shown in FIG. 8, at every time when performing the front-end printing, dot rows are formed by nozzle #2 in the first through fourth row regions in the front-end print region. And, dot rows in the fifth row region and the sixth row region are formed by nozzle #3 and nozzle #2 respectively, dot rows in the seventh row region and the eighth row region are formed by nozzle #3, and a dot row in the ninth row region is formed by nozzle #4 (hereafter omitted). This order of the nozzles does not change even if another front-end printing is performed.

Outline of Correction for Unevenness in Density

Regarding Unevenness in Density (Banding)

In this section, for convenience of explanation, a cause of unevenness in density that occurs in an image printed with monochrome printing is described. In case of multi-color printing, the cause of unevenness in density described below occurs for each color.

Figure 9A:
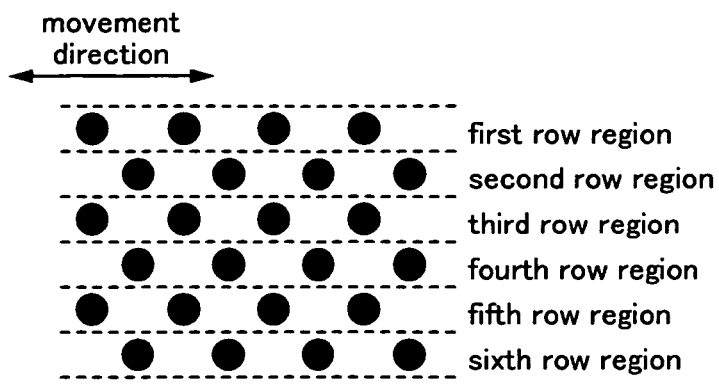
FIG. 9A is an explanatory diagram showing a state in which dots are formed ideally.

FIG. 9A is an explanatory diagram showing a state in which dots are formed ideally. While the carriage 31 moves in the movement direction, a dot is formed by ejecting ink from each nozzle and an ink droplet landing on paper. Since each nozzle ejects ink intermittently while moving, a row of dots (a dot row) is formed along the movement direction. Each dot row forms an elongated piece of image along the movement direction, and a print image consists of plenty of the pieces of image lined up in the carrying direction. Here, for convenience of explanation, an image which has a constant density in order to fix the dot-generation rate at 50% is printed.

Since dots are formed ideally in FIG. 9A, each of the dots is formed precisely in a unit region virtually defined on paper and a dot row is formed precisely in a row region.

Here, a "unit region" means a virtual rectangular region defined on a medium such as paper and corresponds to a pixel which is a minimum unit of a print image. The size and shape of a unit region are defined depending on print resolution. For example, in a case that the print resolution is specified as 720 dpi (in the movement direction)×720 dpi (in the carrying direction), a unit region is a square region approximately 35.28 μm long and 35.28 μm wide ($\approx$1/720 inch×1/720 inch). In a case that the print resolution is specified as 360 dpi×720 dpi, a unit region is a rectangular region approximately 70.56 μm long and 35.28 μm wide ($\approx$1/360 inch×1/720 inch). If an ink droplet is ideally ejected, the ink droplet lands in the center of this unit region, then the ink droplet spreads on the medium, and a dot is formed in the unit region.

Further, a "row region" means a region consisting of a plurality of unit regions lined up in the movement direction and is illustrated in the figure as a region sandwiched by dotted lines. For example, in a case that the print resolution is specified as 720 dpi×720 dpi, a row region is a belt-like region having a width of 35.28 μm ($\approx$1/720 inch) in the carrying direction. If ink droplets are ideally ejected intermittently from a nozzle moving in the movement direction, a dot row is formed in this row region. Accordingly, a piece of image consisting of a plurality of pixels with density corresponding to the color of each row region is formed in the row region.

Figure 9B:
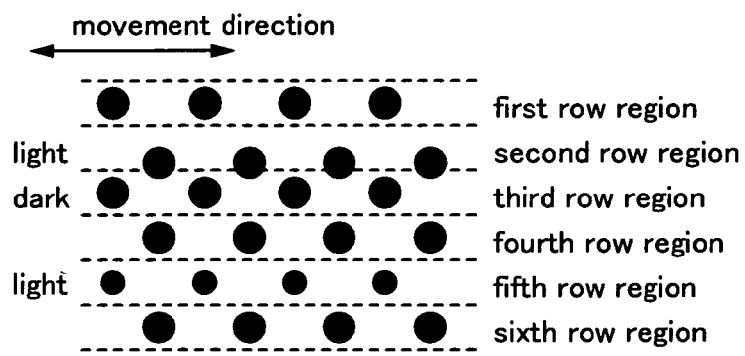
FIG. 9B is an explanatory diagram showing how the variation in precision of manufacturing among nozzles affects dot formation.

FIG. 9B is an explanatory diagram showing how the variation in precision of manufacturing among nozzles affects dot formation. Here, the dot row formed in the second row region is formed closer to the side of the third row region (the upstream side in the carrying direction) because of variations in the flying direction of ink droplets ejected from nozzles.

Also, since ink of ink droplets ejected to the fifth row region is less in amount, dots formed in the fifth row region are smaller in size.

Despite that, by definition, pieces of image having the same density should be formed in each row region, a variation in density occurs among pieces of image depending on row regions in which they are formed because of the variation in precision of manufacturing. For example, the piece of image in the second row region is formed relatively light in color, and the piece of image in the third row region relatively dark in color. The piece of image in the fifth row region is formed relatively light in color.

Accordingly, in a case of observing macroscopically a print image consisting of such dot rows, a streaky unevenness in density in the movement direction of the carriage 31 is visually noticeable. This unevenness in density makes print image quality deteriorate.

Figure 9C:
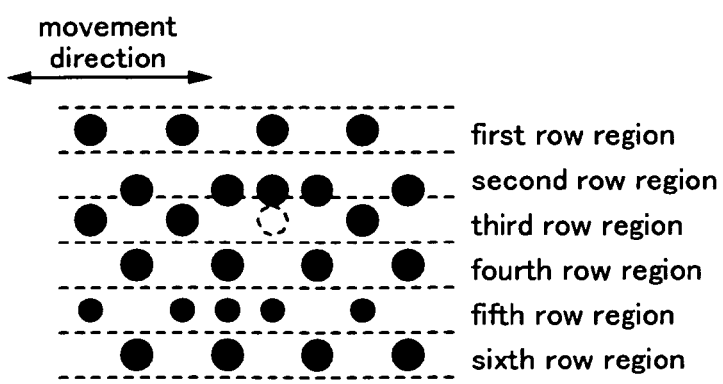
FIG. 9C is an explanatory diagram showing how dots are formed by a printing method of the present embodiment.

FIG. 9C is an explanatory diagram showing how dots are formed by the printing method of the present embodiment. In the present embodiment, for row regions which tend to be visually perceived darker in color, tone values of pixel data (CMYK pixel data) of pixels corresponding to these row regions are corrected in order to form pieces of image lighter in color. Also, for row regions which tend to be visually perceived lighter in color, tone values of pixel data of pixels corresponding to these row regions are corrected in order to form pieces of image darker in color. For example, in the figure, tone values of pixel data of the pixels corresponding to each row region are corrected in order to increase the dot-generation rate in the second row region, to decrease the dot-generation rate in the third row region, and to increase the dot-generation rate in the fifth row region. Thereby, the dot-generation rate of the dot row corresponding to each row region is changed, the density of the piece of image in the row region is corrected, and thus unevenness in density in the entire print image is suppressed.

Furthermore, in FIG. 9B, the piece of image formed in the third row region is darker in color, not because of effects of the nozzle that forms the dot row in the third row region, but because of effects of the nozzle that forms the dot row in the second row region contiguous thereto. Accordingly, if the nozzle that forms the dot row in the third row region forms a dot row in another row region, a piece of image formed in the another row region is not always darker in color. In short, there are cases in which there is difference in density of color even among pieces of image formed by the same nozzle if pieces of image contiguous to each of the above-mentioned pieces are formed respectively by different nozzles. In this case, correction values corresponding only to each nozzle cannot suppress unevenness in density. Thus, in the present embodiment, tone values of pixel data are corrected based on the correction values set for each row region.

Therefore, on an inspection process at a printer manufacturing plant in the present embodiment, a printer 1 prints a correction pattern, the correction pattern is read with a scanner 150, and a correction value corresponding to each row region is stored in a memory of the printer 1; the correction value being based on density of each row region in the correction pattern. The correction values stored in the printer 1 reflect characteristics of unevenness in density of each individual printer 1.

Then, under instructions by a user who has purchased the printer 1, the printer driver reads the correction values from the printer 1, tone values of pixel data are corrected based on the correction values, print data is generated based on the corrected tone values, and the printer 1 performs printing based on the print data.

Regarding Process at Printer Manufacturing Plant

Figure 10A:
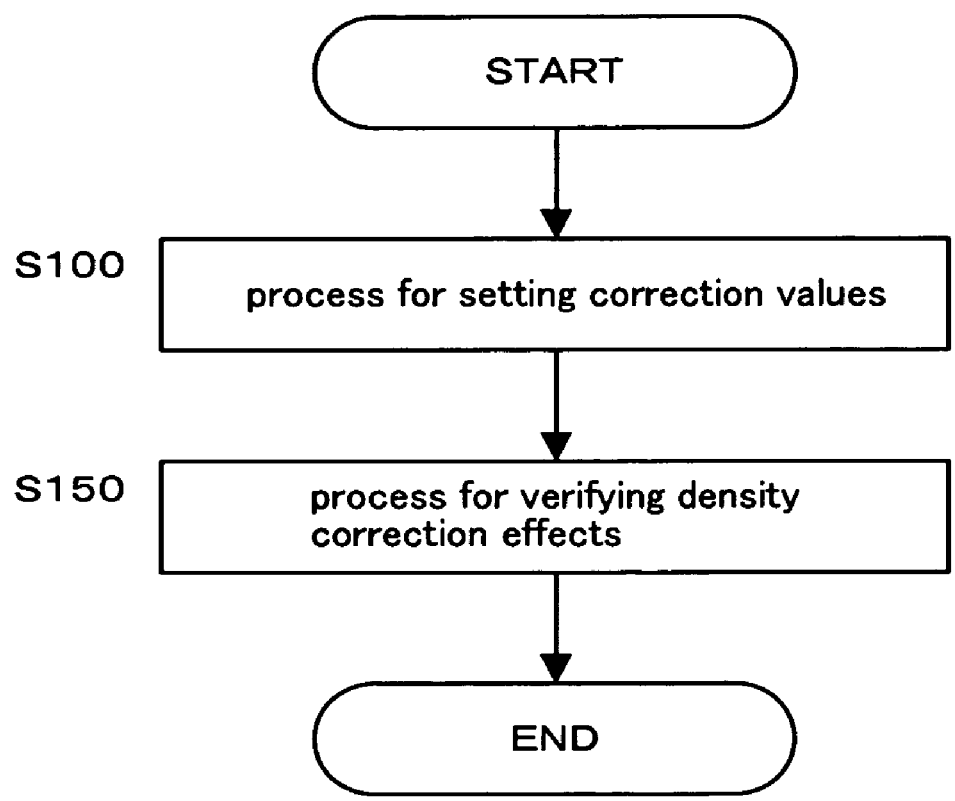
FIG. 10A is a flowchart showing processes which are performed on an inspection process after a printer 1 has been manufactured.

FIG. 10A is a flowchart showing processes which are performed on the inspection process after a printer 1 has been manufactured. In the inspection process, the following two processes are performed: a "process for setting correction values (S100)" which is for setting correction values on the printer 1 and a "process for verifying density correction effects (S150)" which is for verifying improvement effects against unevenness in density by the set correction values. This section describes the process for setting correction values (S100) in detail, and the process for verifying density correction effects (S150) will be described later.

Figure 10B:
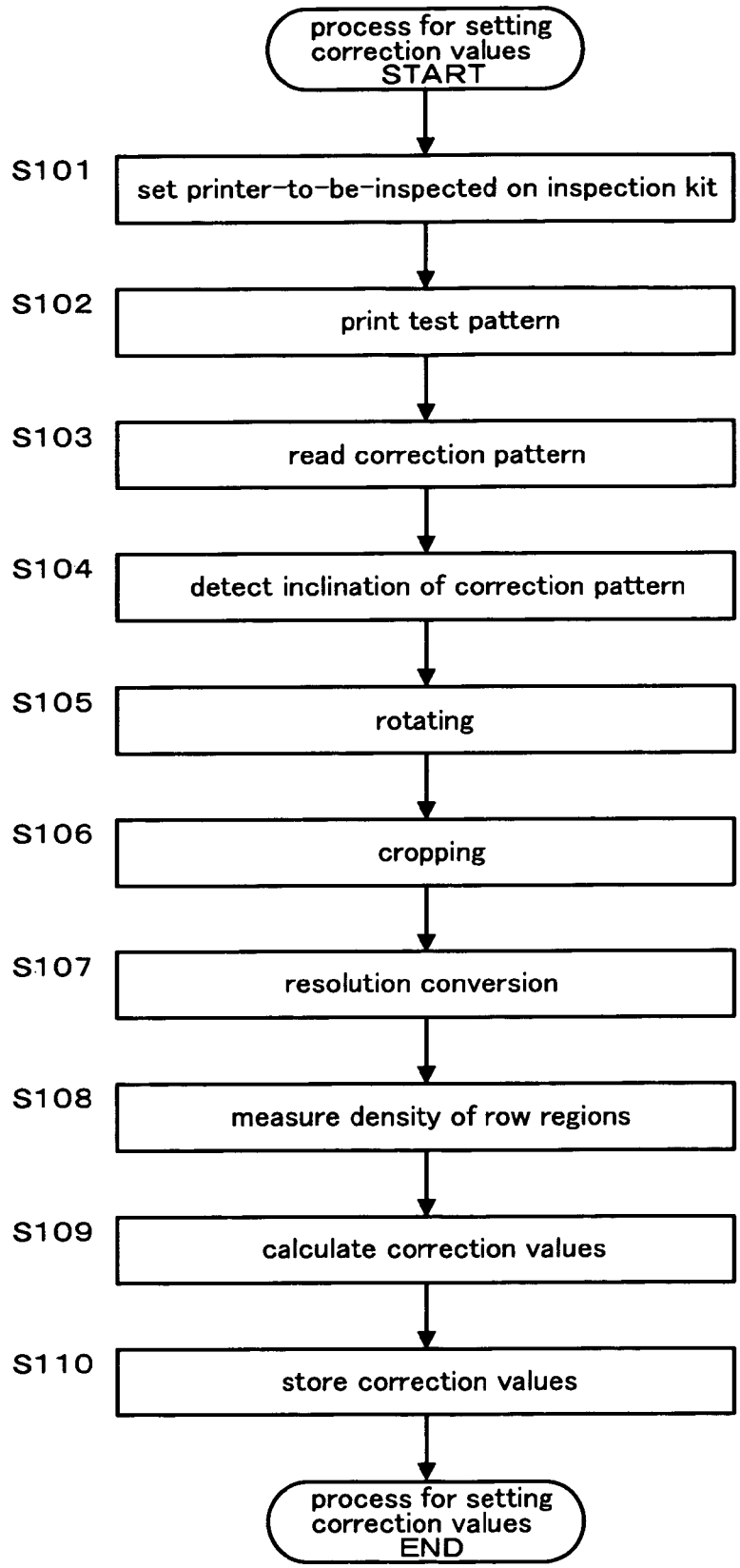
FIG. 10B is a flowchart showing a process for setting correction values illustrated in FIG. 10A.
Figure 10C:
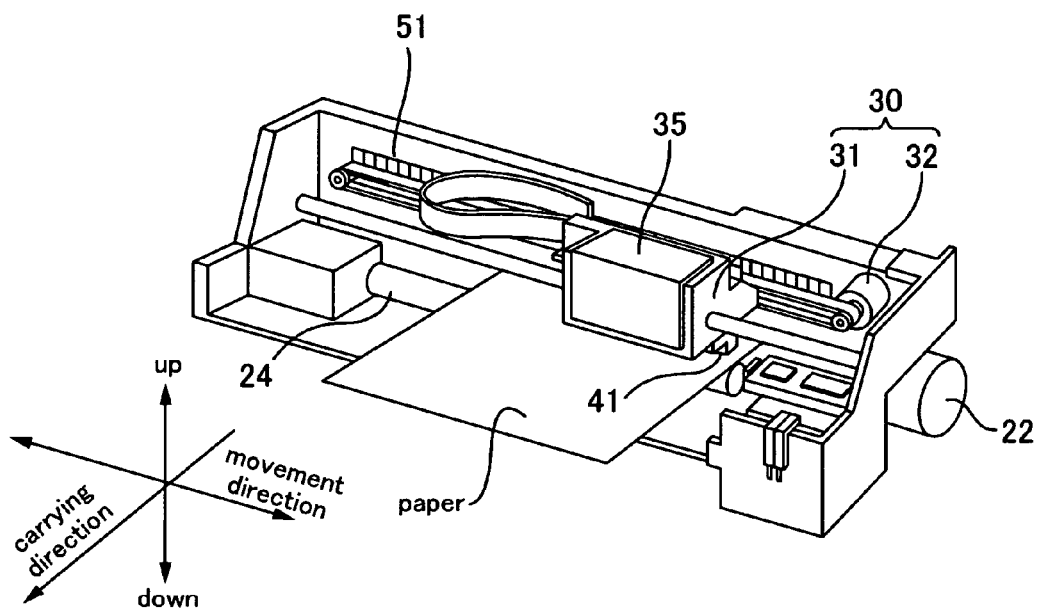
FIG. 10C is an explanatory diagram showing an inspection ink cartridge 35 included in an inspection kit.

FIG. 10B is a flowchart showing the process for setting correction values. FIG. 10C is an explanatory diagram showing an inspection ink cartridge 35 provided on an inspection kit.

First, an inspector sets the printer 1 to be inspected onto the inspection kit which is ready for the inspection process in the plant. The inspection kit includes the inspection ink cartridge 35 and an inspection computer 110 which includes the scanner 150. The printer 1 is connected to the inspection computer 110 (S101), and the inspection ink cartridge 35 is attached to the ink cartridge attachment sections of the printer 1 as shown in FIG. 10C.

The inspection ink cartridge 35 contains inspection ink which is for printing the test pattern. When the inspection ink cartridge 35 is attached to the ink cartridge attachment sections of the carriage 31 of the printer 1, the inspection ink becomes ready to be supplied to the head 41 of the printer 1.

The inspection computer 110 has computer programs installed thereon, such as a printer driver for causing the printer 1 to print a test pattern, a scanner driver for controlling the scanner 150, and a program for setting correction values which is for carrying out image processing, analysis, or otherwise, of image data of correction patterns read by the scanner 150.

Figure 11:
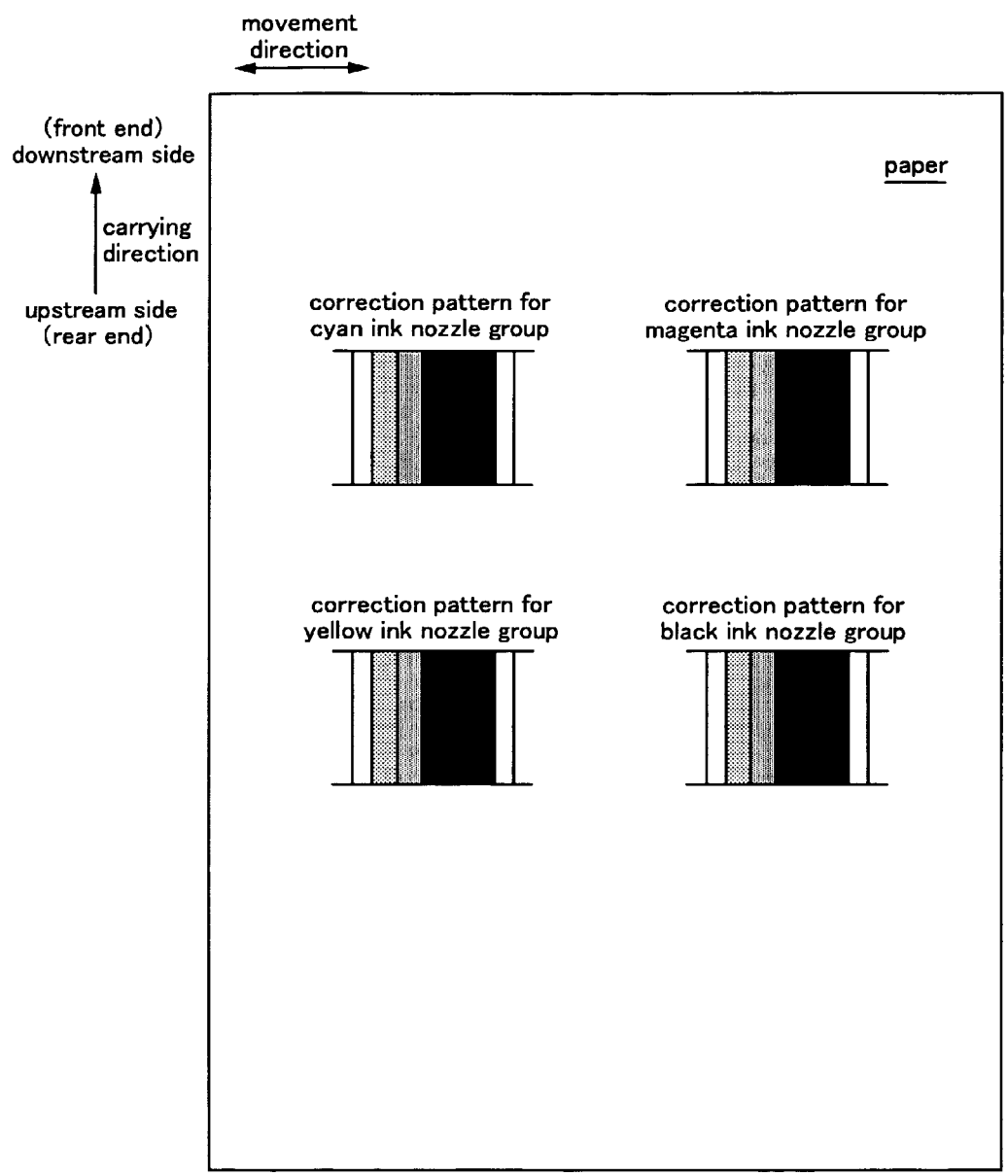
FIG. 11 is an explanatory diagram showing a test pattern for setting correction values.
Figure 12:
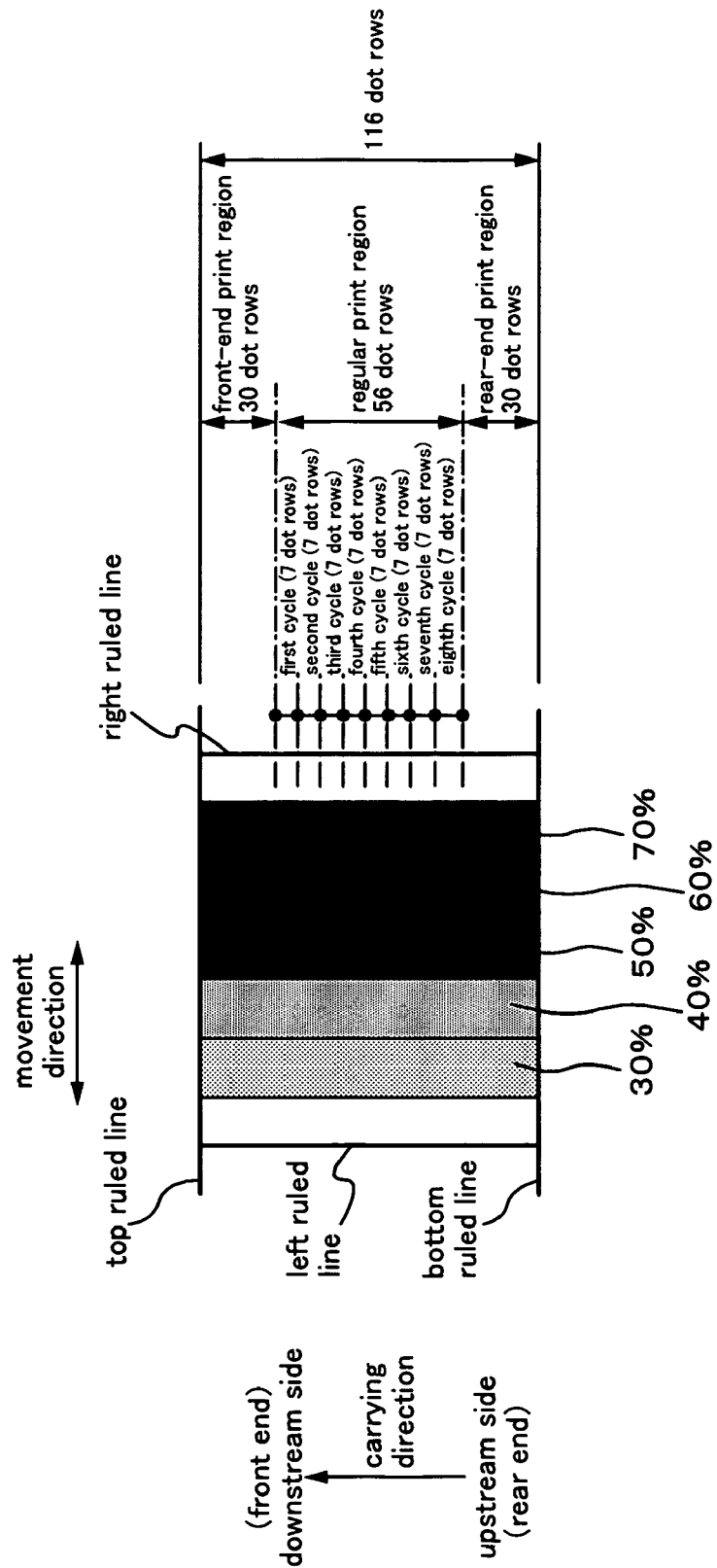
FIG. 12 is an explanatory diagram showing a correction pattern.

Second, the printer driver installed on the inspection computer 110 causes the printer 1 to print the test pattern for setting correction values (S102). FIG. 11 is an explanatory diagram showing the test pattern for setting correction values and FIG. 12 is an explanatory diagram showing the correction pattern contained in the test pattern. The test pattern is printed with print resolution of 720×720 dpi, for example, and contains the correction patterns for the respective nozzle groups. Each correction pattern consists of five belt-like patterns different in color density (CD), one top ruled line, one bottom ruled line, one left ruled line, and one right ruled line.

However, in this embodiment, all of four correction patterns are printed in the same color. The reason thereof is that only one type of the inspection ink is provided for the purpose of simplifying tasks in the inspection process and the like. In other words, a correction pattern for the black ink nozzle group (K), a correction pattern for the cyan ink nozzle group (C), a correction pattern for the magenta ink nozzle group (M) and a correction pattern for the yellow ink nozzle group (Y) all are printed with the same type of ink, but the same type of ink being ejected from respective nozzle groups. More specifically, the inspection ink cartridge 35 has four ink supply openings in total which correspond respectively to all ink cartridge attachment sections, the ink cartridge attachment sections being provided respectively for the nozzle groups in the carriage 31 of the printer 1. Since these ink supply openings are attached respectively to the ink cartridge attachment sections for the nozzle groups, the inspection ink (one type only) is supplied to all of the four nozzle groups. For the purpose of making unevenness in density more conspicuous, it is desirable that the inspection ink has the same hue as and is lighter in color tone (brightness) than any one of the types of ink which the printer 1 can eject. Ink of light magenta (the same hue as magenta, but lighter in color tone than magenta) is used herein.

The belt-like patterns are generated from image data having their respective tone values which are respectively 76 (30% CD), 102 (40% CD), 128 (50% CD), 153 (60% CD) and 179 (70% CD) in the order shown from left to right and become darker as the belt-like pattern is located toward the right, these tone values being uniform throughout the carrying direction. These five tone values (color densities: CD) are referred to as the "designated tone values (the designated color-densities)" and are represented with the respective symbols: Sa (=76), Sb (=102), Sc (=128), Sd (=153), and Se (=179).

Each belt-like pattern is formed by the front-end printing, regular printing and rear-end printing, and consists of dot rows in a front-end print region, dot rows in a regular print region, and dot rows in a rear-end print region. On printing of the correction pattern, dot rows the number of which is equivalent to eight cycles are formed in the regular print region though thousands of dot rows are formed in the regular print region in usual printing. Here, for convenience of explanation, the correction patterns are printed by the printing described in FIG. 8, and each belt-like pattern consists of 116 dot rows in total: thirty dot rows in the front-end print region, fifty-six dot rows (seven dot rows in each cycle×eight cycles) in the regular print region, and thirty dot rows in the rear-end print region. The top ruled line is formed with the first one of dot rows which the belt-like pattern consists of (the dot row on the most downstream side in the carrying direction). The bottom ruled line is formed with the last one of dot rows which the belt-like pattern consists of (the dot row on the most upstream side in the carrying direction).

As a matter of course, when printing the test pattern, density correction (see S213 in FIG. 23) based on correction values to be mentioned below is not performed.

Next, the inspector sets on the scanner 150 paper on which the test pattern is printed with the printer 1, by placing the test pattern on a document platen glass 152 of the scanner 150 and lowering a lid 151. Then, the scanner driver installed on the inspection computer 110 causes the scanner 150 to read the correction patterns in gray-scale (that is, tone value data which has no color information and consists of only brightness information), for example (S103). The section below describes how the correction pattern of the cyan ink nozzle group is read, and the correction patterns of nozzle groups relating to other color inks are read in the same way.

Figure 13:
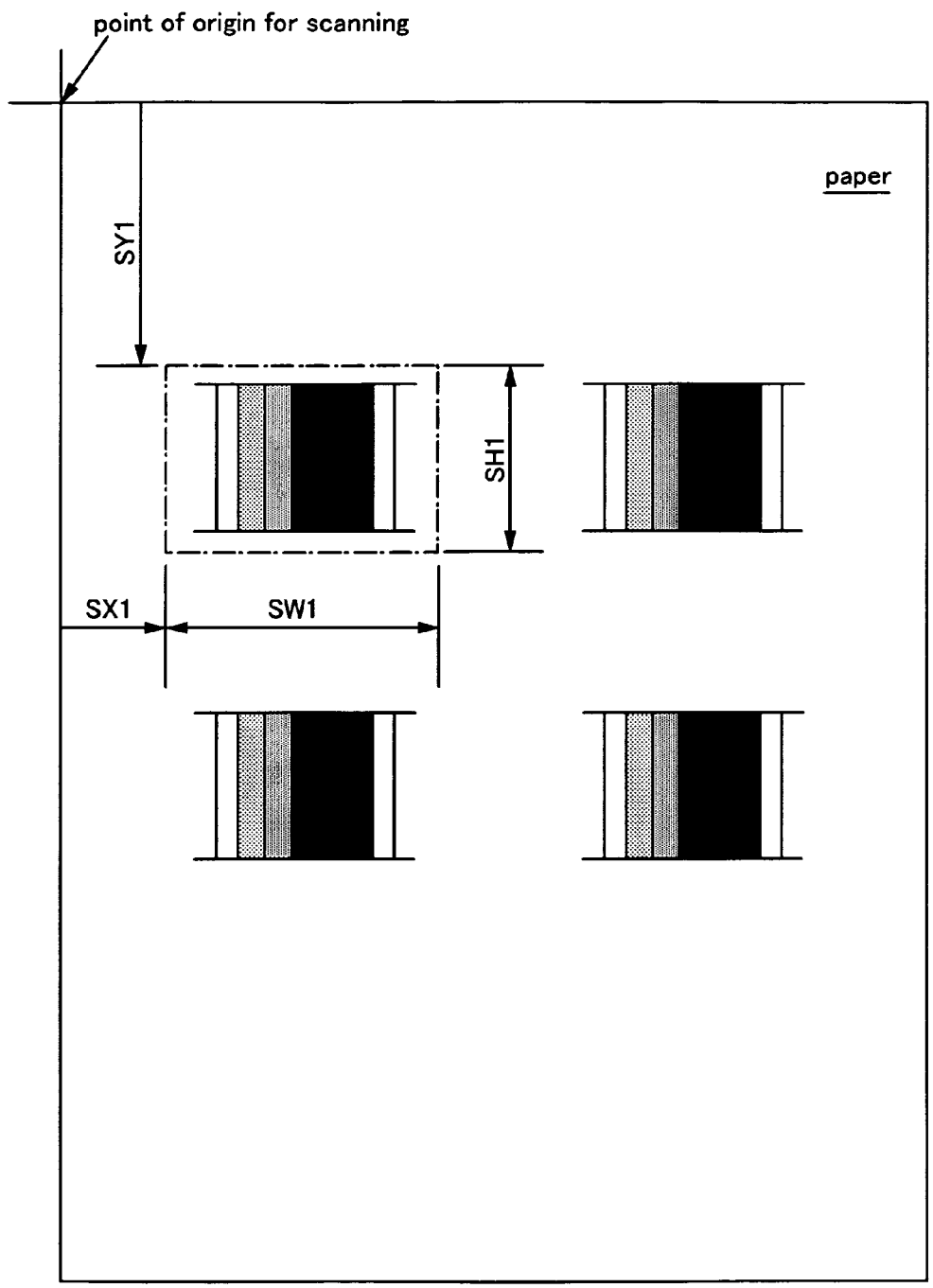
FIG. 13 is an explanatory diagram showing a reading range of a correction pattern of a cyan ink nozzle group.

FIG. 13 is an explanatory diagram showing a reading range of the correction pattern of the cyan ink nozzle group. The range surrounded by dot dash lines in the figure is a reading range when the correction pattern of the cyan ink nozzle group (hereinafter the cyan ink nozzle group may be referred to merely as cyan) is read. Parameters SX1, SY1, SW1 and SH1, which are for specifying this reading range, are preset on the scanner driver by the program for setting correction values. In a case that this reading range is read by the scanner 150, the entire correction pattern of cyan can be read even if the test pattern is placed slightly out of position on the scanner 150. By this process, an image in the reading range in the figure is read by the inspection computer 110 as rectangular image data with reading resolution of 2880×2880 dpi.

Next, the program for setting correction values installed on the inspection computer 110 detects an inclination θ of the correction pattern in the image data (S104), and rotates the image data depending on the inclination θ (S105).

Figure 14A:
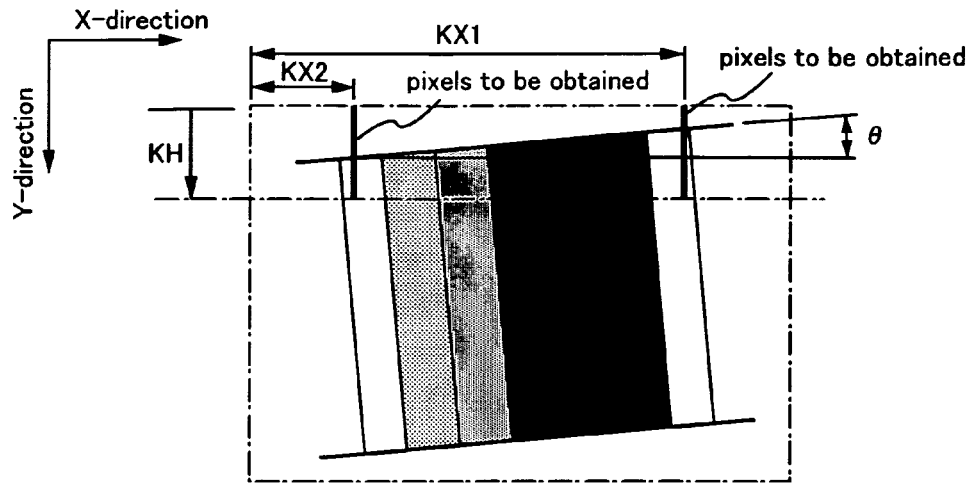
FIG. 14A is an explanatory diagram showing image data on detection of an inclination.
Figure 14B:
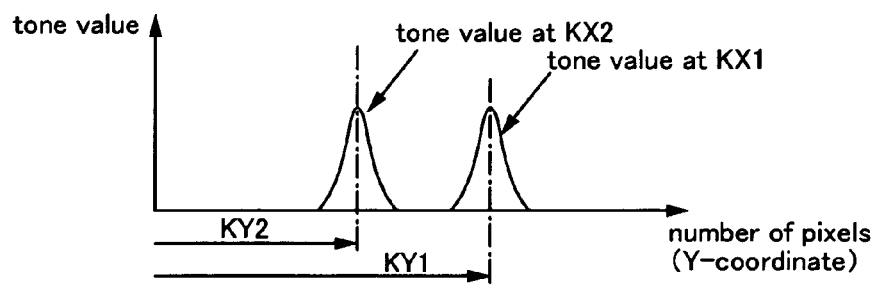
FIG. 14B is an explanatory diagram showing how the location of a top ruled line is detected.
Figure 14C:
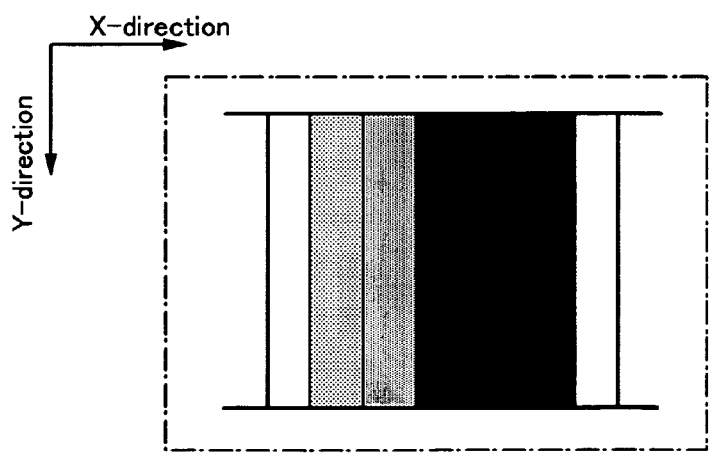
FIG. 14C is an explanatory diagram showing the rotated image data.

FIG. 14A is an explanatory diagram showing the image data on detection of the inclination. FIG. 14B is an explanatory diagram showing how the location of the top ruled line is detected. FIG. 14C is an explanatory diagram showing the rotated image data. The program for setting correction values obtains from the read image data pixel data of KH pieces of pixels from the top which are located KX1th from the left and pixel data of KH pieces of pixels from the top which are located KX2th from the left. The parameters KX1, KX2, and KH are preset in order for pixels obtained as mentioned above to include the top ruled line and to exclude the right ruled line and the left ruled line. In order to detect the location of the top ruled line, the program for setting correction values obtains respective barycentric positions of the tone values of the KH pieces of pixel data obtained: KY1 and KY2. The program for setting correction values calculates by the following formula the inclination θ of the correction pattern based on the parameters KX1 and KX2 and the barycentric positions KY1 and KY2, and rotates the image data based on the inclination θ calculated:

$$\theta = \tan^{-1}\{(KY2-KY1)/(KX2-KX1)\}$$

Next, the program for setting correction values installed on the inspection computer 110 crops the image data in order to eliminate unnecessary pixels (S106).

Figure 15A:
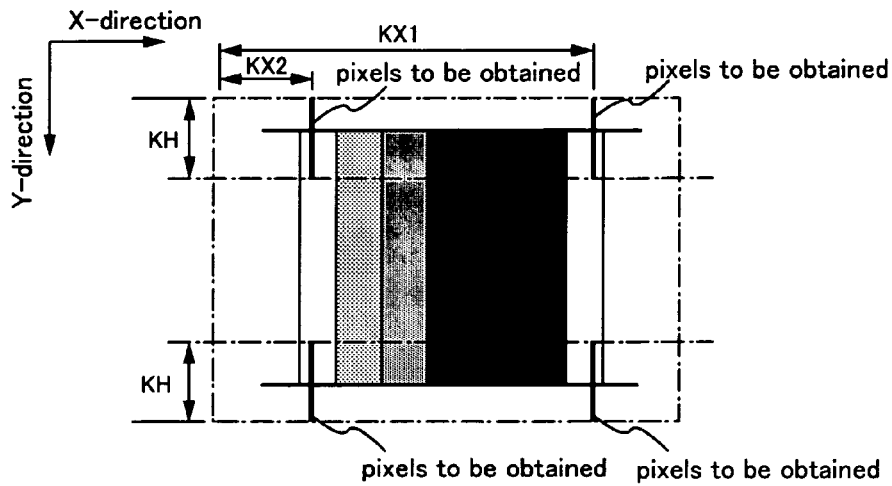
FIG. 15A is an explanatory diagram showing image data on cropping.
Figure 15B:
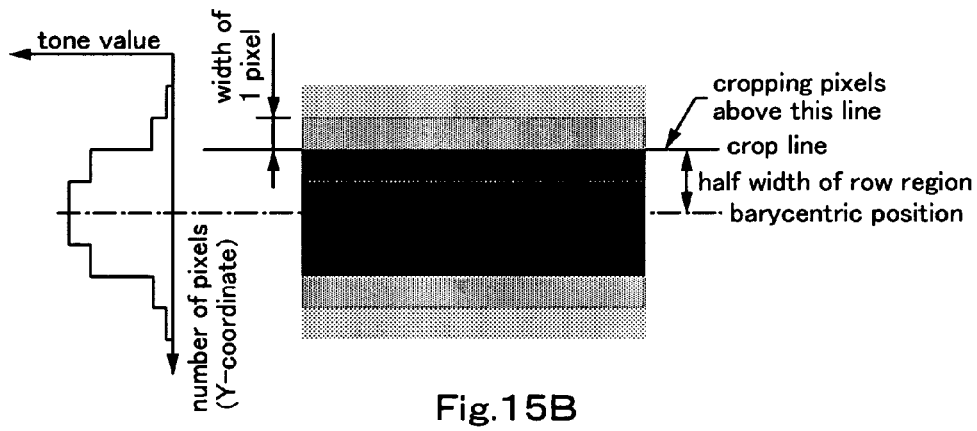
FIG. 15B is an explanatory diagram showing a crop line with respect to a top ruled line.

FIG. 15A is an explanatory diagram showing the image data on cropping. FIG. 15B is an explanatory diagram showing a crop line with respect to the top ruled line. In the same way as processed in S104, the program for setting correction values obtains from the rotated image data pixel data of KH pieces of pixels from the top which are located KX1th from the left and pixel data of KH pieces of pixels from the top which are located KX2th from the left. In order to detect the location of the top ruled line, the program for setting correction values obtains respective barycentric positions of the tone values of the KH pieces of pixel data obtained, KY1 and KY2, and calculates an average value of the two barycentric positions. A border of pixels nearest to the position half width of a row region above the barycentric position is determined as a crop line. In the present embodiment, since the resolution of the image data is 2880 dpi and the width of the row region is 1/720 inch, the half width of the row region is equivalent to two pixels. The program for setting correction values crops pixels above the determined crop line.

Figure 15C:
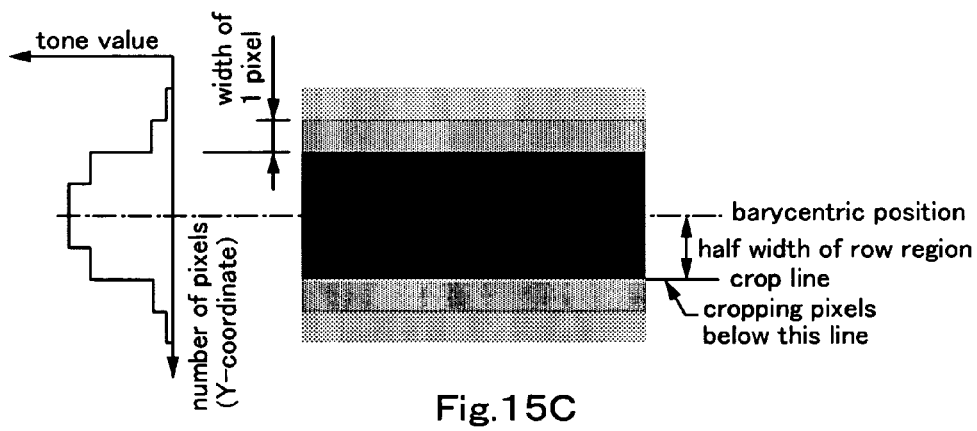
FIG. 15C is an explanatory diagram showing a crop line with respect to a bottom ruled line.

FIG. 15C is an explanatory diagram showing a crop line with respect to the bottom ruled line. In substantially the same way as the top ruled line, the program for setting correction values obtains from the rotated image data pixel data of KH pieces of pixels from the bottom which are located KX1th from the left and pixel data of KH pieces of pixels from the bottom which are located KX2th from the left, and calculates the barycentric position of the bottom ruled line. A border of pixels nearest to the position half width of a row region below the barycentric position is determined as a crop line. The program for setting correction values crops pixels below the crop line.

Next, the program for setting correction values installed on the inspection computer 110 converts the resolution of the cropped image data in order to make the number of pixels in Y-direction equal to 116 (same as the number of dot rows which the correction pattern consists of) (S107).

Figure 16:
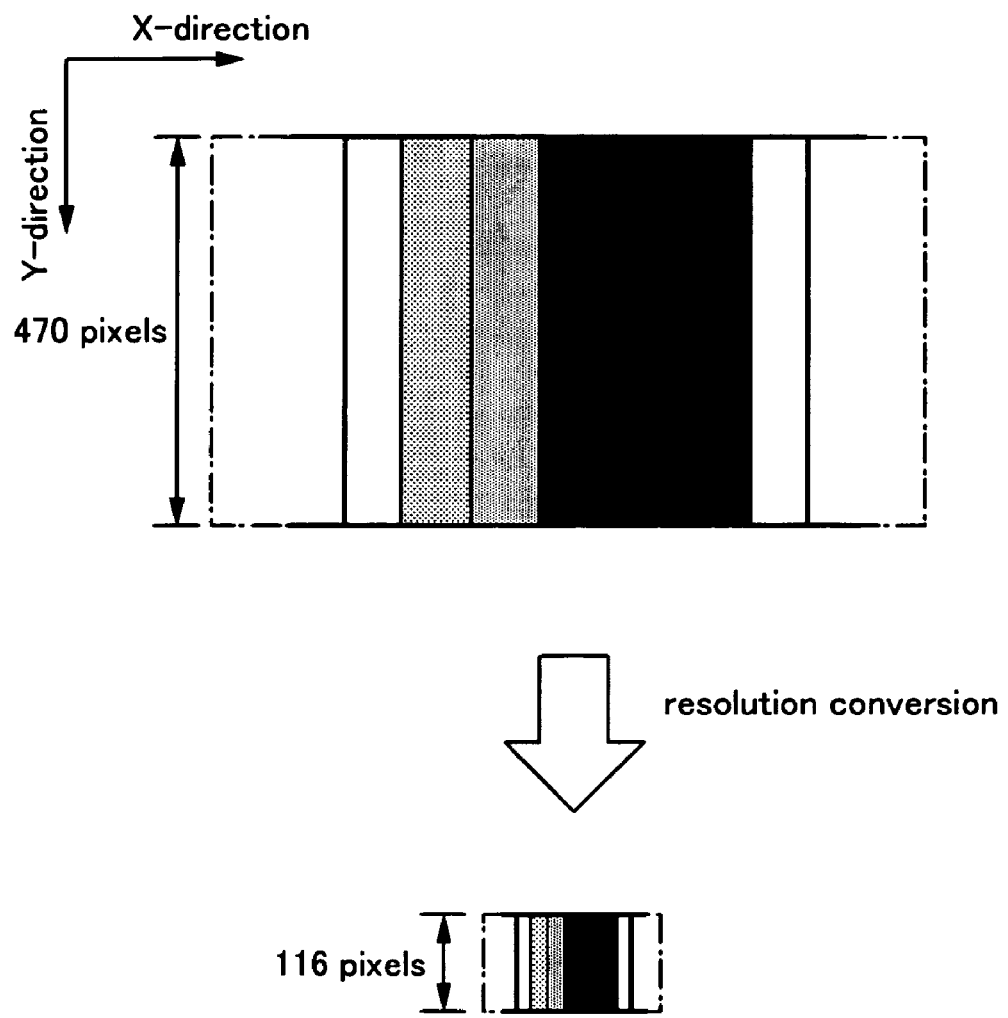
FIG. 16 is an explanatory diagram showing how to convert resolution.

FIG. 16 is an explanatory diagram showing how to convert resolution. In a case that the printer 1 forms ideally the correction pattern consisting of 116 dot rows with resolution of 720 dpi, if the scanner 150 reads the correction pattern ideally with resolution of 2880 dpi (with four times as high resolution as the correction pattern), the number of pixels in Y-direction of the cropped image data should be 464 (=116×4). However, actually, by effects of displacement caused when the image data is printed or read, there are cases in which the number of pixels in Y-direction of the image data is not 464. Here, the number of pixels in Y-direction of the cropped image data is 470. The program for setting correction values installed on the inspection computer 110 converts resolution of the image data (performs a shrinkage process), at the rate of 116/470 (= "the number of dot rows which the correction pattern consists of "/" the number of pixels in Y-direction of the cropped image data"). Here, resolution is converted using the bicubic interpolation method. As a result thereof, the number of pixels in Y-direction of the image data after resolution conversion is 116. In other words, the image data of the correction pattern with resolution of 2880 dpi is converted into the image data of the correction pattern with resolution of 720 dpi. This conversion makes the number of pixels lined up in Y-direction equal to the number of row regions, and one row of pixels in X-direction corresponds to one row region on a one-to-one basis. For example, the row of pixels in X-direction located in the top corresponds to the first row region, and the row of pixels located immediately below the above-mentioned row corresponds to the second row region. Since this resolution conversion aims to make the number of pixels in Y-direction equal to 116, resolution conversion in X-direction (shrinkage process) does not necessary have to be performed.

Next, the program for setting correction values installed on the inspection computer 110 measures densities of each of the five belt-like patterns in each row region (S108). The section below describes measurement of density of the leftmost belt-like pattern in the first row region, this belt-like pattern being formed with 76 (30% CD) in tone value. Measurement of density of the other row regions in this belt-like pattern is performed in the same way, and measurement in the other belt-like patterns is also performed in the same way.

Figure 17A:
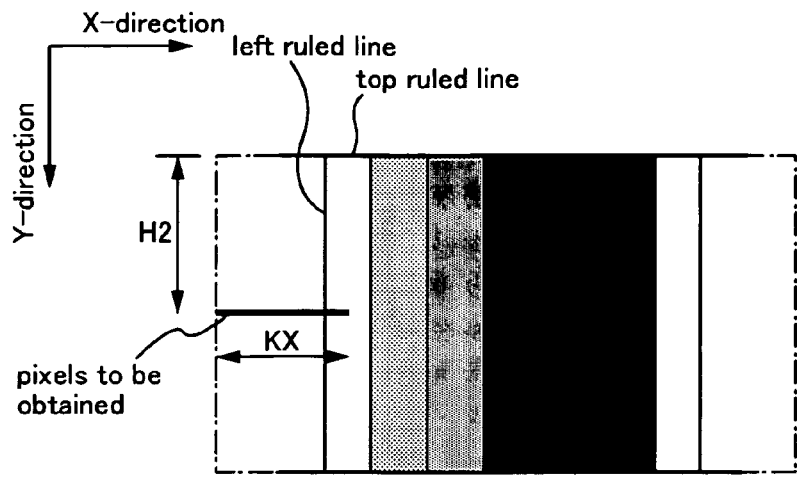
FIG. 17A is an explanatory diagram showing image data on detection of a left ruled line.
Figure 17B:
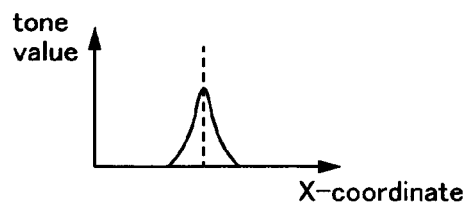
FIG. 17B is an explanatory diagram showing how the location of the left ruled line is detected.
Figure 17C:
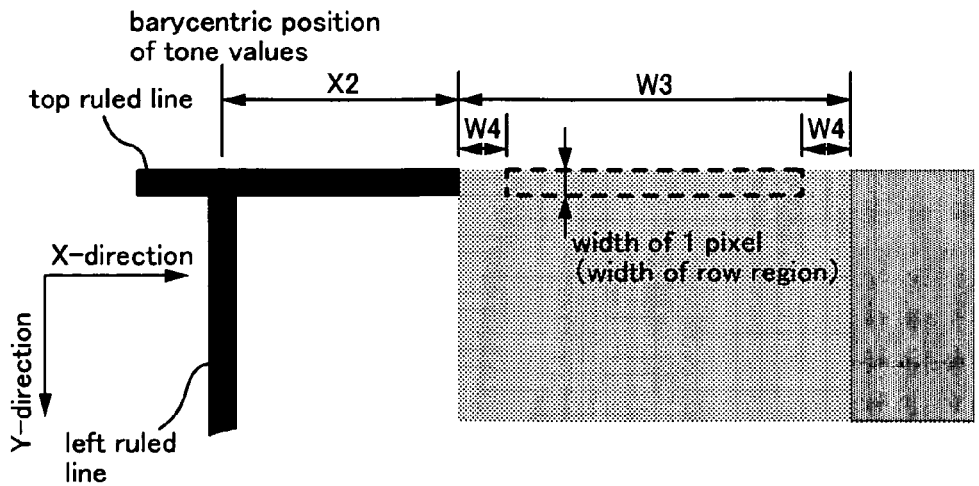
FIG. 17C is an explanatory diagram showing a density-measuring range of a belt-like pattern in a first row region, the belt-like pattern being formed with 30% of color density (CD).

FIG. 17A is an explanatory diagram showing the image data when the left ruled line is detected. FIG. 17B is an explanatory diagram showing how the location of the left ruled line is detected. FIG. 17C is an explanatory diagram showing a density-measuring range of the belt-like pattern formed with 30% CD in the first row region. The program for setting correction values obtains pixel data of KX pieces of pixels from the left which are located H2th from the top, from the image data whose resolution has been converted. The parameter KX is preset in order for pixels obtained as mentioned above to include the left ruled line. In order to detect the location of the left ruled line, the program for setting correction values obtains a barycentric position of tone values of pixel data of the KX pieces of pixels obtained. It is known from the shape of the correction pattern that a W3 wide belt-like pattern formed with 30% CD exists X2 to the right of this barycentric position (the location of the left ruled line). The program for setting correction values extracts, taking the barycentric position as a reference, pixel data within a range surrounded by dotted lines, which excludes two W4 wide ranges, the W4 wide ranges being located at respective horizontal ends of and within the belt-like pattern. An average value of tone values of the pixel data within the range surrounded by the dotted lines is used as a measured value of the first row region with 30% CD. In a case of measuring density of the belt-like pattern formed with 30% CD in the second row region, the program extracts pixel data within a range which is located one-pixel below the range surrounded by the dotted lines in the figure. In this way, the program for setting correction values measures densities of the five belt-like patterns in each row region.

Figures 18, 19:
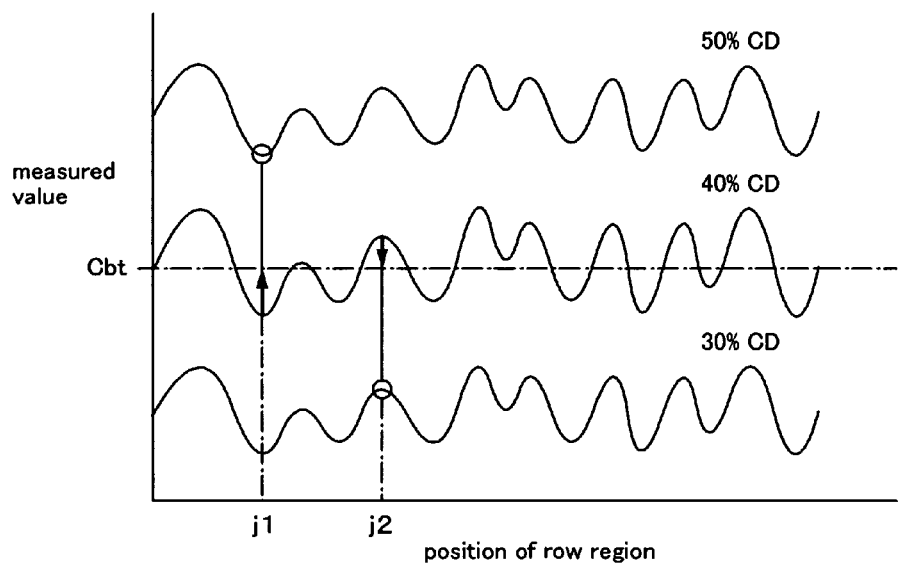
FIG. 18 is a table of values of measured densities of five belt-like patterns of cyan.
FIG. 19 is a graph showing measured values of belt-like patterns of cyan, the belt-like patterns being formed with 30%, 40% and 50% CD respectively.

FIG. 18 is a table of values of measured densities of the five belt-like patterns of cyan. In this way, the program for setting correction values installed on the inspection computer 110 creates the table of measured values, in which the measured values of densities of the five belt-like patterns are associated with each row region. For other colors, tables of measured values are also created. In the explanation below, for a certain row region, measured values in the belt-like patterns with the tone values Sa through Se are represented with respective symbols: Ca through Ce.

FIG. 19 is a graph showing the measured values of the belt-like patterns of cyan formed with 30%, 40% and 50% CD respectively. In each of belt-like patterns, difference in density occurs among row regions despite that the belt-like patterns are formed uniformly with their respective tone values: Sa (=76), Sb (=102), and Sc (=128). This difference in density among row regions causes unevenness in density of a print image.

In order to eliminate unevenness in density, it is desirable that the measured values are uniform in each belt-like pattern. Accordingly, this section discusses a process for making measured values in a belt-like pattern with tone value Sb (40% CD) uniform. Here, an average measured value Cbt across all row regions of the belt-like pattern with tone value Sb is determined as a target value for 40% CD. In the row region j1 in which a measured value is lighter in density than this target value Cbt, it is considered only necessary to correct the tone value so that it becomes darker in order for the measured value of density to become closer to the target value Cbt. On the other hand, in the row region j2 in which a measured value is darker in density than this target value Cbt, it is considered only necessary to correct the tone value so that it becomes lighter in order for the measured value of density to become closer to the target value Cbt.

Therefore, the program for setting correction values installed on the inspection computer 110 calculates correction values corresponding to row regions (S109). This section describes how a correction value for the designated tone value Sb of a certain row region is calculated. As described below, a correction value for the designated tone value Sb (40% CD) of the row region j1 in FIG. 19 is calculated based on measured values of the tone value Sb and tone value Sc (50% CD). On the other hand, a correction value for the designated tone value Sb (40% CD) of row region j2 is calculated based on measured values of tone value Sb and tone value Sa (30% CD).

Figure 20A:
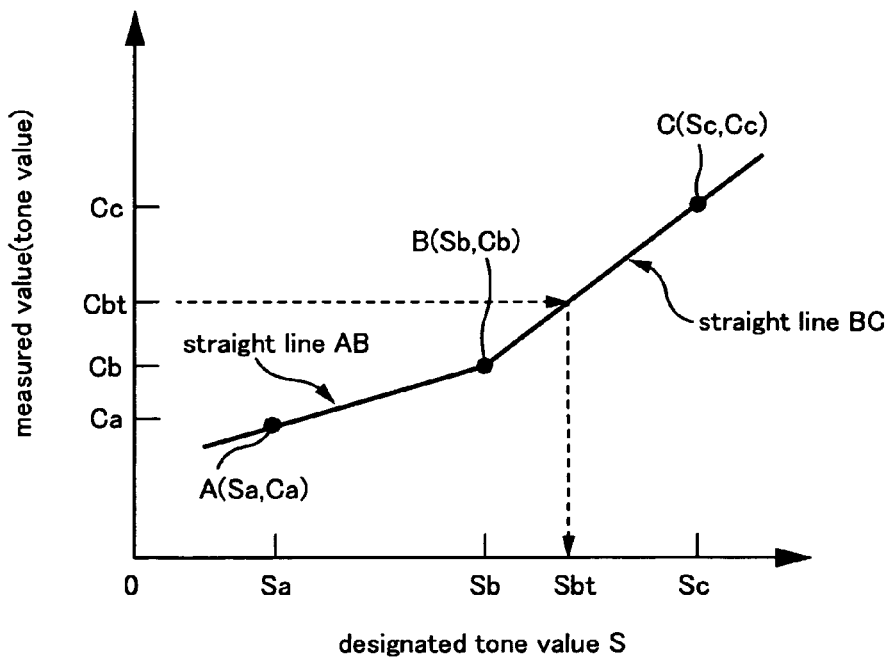
FIG. 20A is an explanatory diagram showing a target designated tone value Sbt of a row region A for a designated tone value Sb.

FIG. 20A is an explanatory diagram showing a target designated tone value Sbt of the row region j1 for the designated tone value Sb. In this row region, a measured value Cb of density of the belt-like pattern formed with the designated tone value Sb is smaller in tone value than the target value Cbt (in this row region, lighter in color than an average density of the 30% CD belt-like pattern). In case that the printer driver causes the printer 1 to form in this row region a pattern with density of the target value Cbt, it is only necessary to designate the tone value based on the target designated tone value Sbt calculated by the following formula (linear interpolation based on the straight line BC):

$$Sbt = Sb + (Sc - Sb) \times \{(Cbt - Cb)/(Cc - Cb)\}$$

Figure 20B:
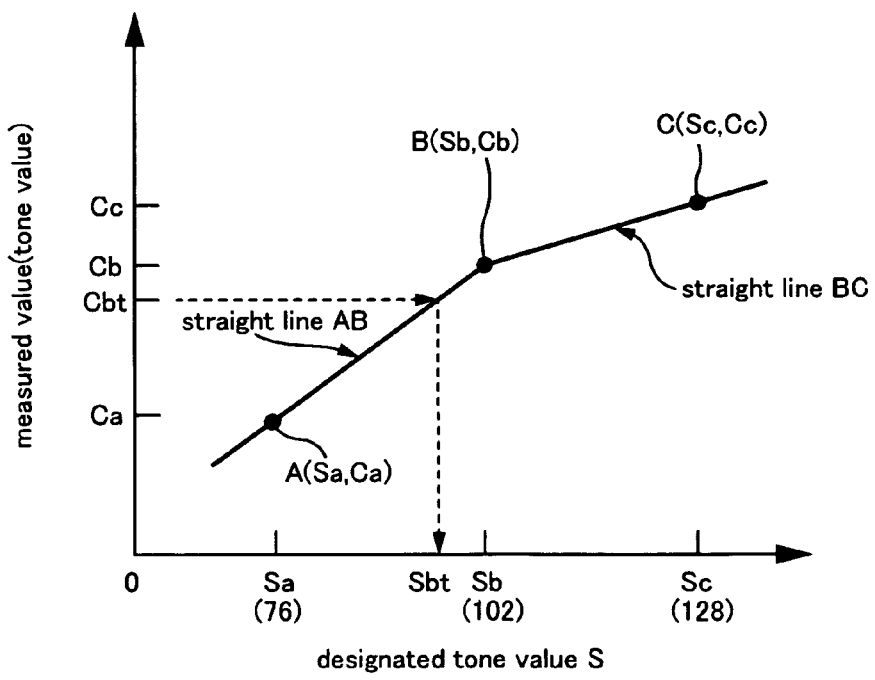
FIG. 20B is an explanatory diagram showing a target designated tone value Sbt of a row region B for a designated tone value Sb.

FIG. 20B is an explanatory diagram showing a target designated tone value Sbt of the row region j2 for the designated tone value Sb. In this row region, a measured value Cb of density of the belt-like pattern formed with the designated tone value Sb is larger in tone value than the target value Cbt (in this row region, lighter in color than an average density of the 30% CD belt-like pattern). In case that the printer driver causes the printer 1 to form in this row region a pattern with density of the target value Cbt, it is only necessary to designate the tone value based on the target designated tone value Sbt calculated by the following formula (linear interpolation based on the straight line AB):

$$Sbt = Sb - (Sb - Sa) \times \{(Cbt - Cb)/(Ca - Cb)\}$$

After calculating the target designated tone value Sbt in this way, the program for setting correction values calculates a correction value Hb of this row region for the designated tone value Sb by the following formula:

$$Hb = (Sbt - Sb)/Sb$$

The program for setting correction values installed on the inspection computer 110 calculates, for each of the row regions, the correction value Hb for the tone value Sb (40% CD). Also, based on the measured value Cc, the measured value Cb or Cd, and the designated tone value Sb or Sd of each of the row regions, the program for setting correction values calculates, for each of the row regions, a correction value Hc for the tone value Sc (50% CD). Also, based on the measured value Cd, the measured value Cc or Ce, and the designated tone value Sc or Se of the each of the row regions, the program for setting correction values calculates, for each of the row regions, a correction value Hd for the tone value Sd (60% CD). Also, for other colors, three correction values (Hb, Hc, and Hd) are calculated for each of the row regions.

There are fifty-six row regions in the regular print region as shown in FIG. 12. As mentioned above, nozzles corresponding to these respective row regions change in order with a cycle of seven row regions. More specifically, in the first through seventh row regions located in the regular print region, dot rows are formed respectively by nozzle #3, nozzle #5, nozzle #7, nozzle #2, nozzle #4, nozzle #6, and nozzle #8, as shown in FIG. 8. In seven row regions from the eighth one onward, dot rows are formed respectively by the nozzles in the same order as mentioned above. Accordingly, this regularity is taken into consideration on calculation of the correction values in the regular print region, shown in FIG. 12.

When the program for setting correction values calculates the correction values of the first row region in the regular print region (the thirty-first row region in the entire print region), the above-mentioned measured value Ca uses the average $Ca_{ave}$ of the measured values of the following eight row regions in the pattern formed by the nozzle #3 with 30% CD: the first, eighth, fifteenth, twenty-second, twenty-ninth, thirty-sixth, forty-third, and fiftieth ones in the regular print region. Also, when the correction values of the first row region in the regular print region (the thirty-first row region in the entire print region) are calculated, the above-mentioned measured value Cb through Ce uses the respective averages $Cb_{ave}$ through $Ce_{ave}$ of the measured values of the following eight row regions in the patterns formed with the respective densities: the first, eighth, fifteenth, twenty-second, twenty-ninth, thirty-sixth, forty-third, and fiftieth ones corresponding to nozzle #3 in the regular print region. Based on the averages $Cb_{ave}$ through $Ce_{ave}$ instead of the measured values Ca through Ce, the correction values (Hb, Hc, and Hd) of the first row region in the regular print region are calculated as mentioned above. In this way, a correction value of a row region in the regular print region is calculated based on an average of measured values of eight row regions, which appear at an interval of every seven regions, in the pattern formed with each density. As a result thereof, in the regular print region, correction values are calculated only for the first though seventh seven row regions, but the correction values are not calculated for the eighth through fifty-sixth row regions. In other words, the correction values for the first though seventh row regions in the regular print region also serve as the correction values for the eighth through fifty-sixth row regions.

Next, the program for setting correction values installed on the inspection computer 110 stores the correction values in the memory 63 of the printer 1 (S110).

FIG. 21A is an explanatory diagram showing a table of correction values of cyan. There are three types of tables of correction values: for the front-end print region, for the regular print region, and for the rear-end print region. In each of the tables of correction values, three correction values (Hb, Hc, and Hd) collectively correspond to each one of row regions. For example, three correction values (Hb_n, Hc_n, and Hd_n) correspond to the nth row region. The three correction values (Hb_n, Hc_n, and Hd_n) correspond to the respective designated tone values: Sb (=102), Sc (=128) and Sd (=153). Tables of correction values for the other colors are created in the same way.

Note that the above-mentioned method of calculating correction values in the regular print region is a method in which average values $Ca_{ave}$ through $Ce_{ave}$ are calculated in advance and three correction values (Hb, Hc, and Hd) are calculated for each of the row regions using the average values $Ca_{ave}$ through $Ce_{ave}$; the average values $Ca_{ave}$ through $Ce_{ave}$ being respective averages of the measured values Ca through Ce of density over eight row regions corresponding to the same nozzle. However, it is not necessary to calculate averages over those eight row regions when obtaining measured values Ca through Ce. It is also possible to calculate averages over those eight row regions after obtaining the correction values (Hb, Hc, and Hd).

In other words, in the example of the table of correction values of cyan, three correction values (Hb, Hc, and Hd) are calculated first for each of the fifty-six row regions contained in the regular print region (see the left table of FIG. 21B). Averages of the respective correction values (Hb, Hc, and Hd) are obtained for each group of row regions which are contained in the fifty-six row regions and which correspond to the same nozzle. Finally, the correction values (Hb, Hc, and Hd) corresponding to each of seven row regions from the first through seventh ones can be obtained, as shown in the right table of FIG. 21B.

For example, row regions corresponding to nozzle #3 are eight row regions shown surrounded by thick lines in the left table of FIG. 21B: the first, eighth, fifteenth, twenty-second, twenty-ninth, thirty-sixth, forty-third, and fiftieth ones. The correction values (Hb, Hc, and Hd) are calculated for each of those row regions. As shown in the middle formulas of FIG. 21B, a correction value Hb_1 is obtained as an average value of the calculated eight correction values Hb_1, Hb_8, Hb_15, Hb_22, Hb_29, Hb_36, Hb_43, and Hb_50. In the same way, a correction value Hc_1 is obtained as an average value of the calculated eight correction values Hc_1, Hc_8, Hc_15, Hc_22, Hc_29, Hc_36, Hc_43, and Hc_50, and a correction value Hd_1 is obtained as an average value of the calculated eight correction values Hd_1, Hd_8, Hd_15, Hd_22, Hd_29, Hd_36, Hd_43, and Hd_50. And then, these correction values (Hb_1, Hc_1, and Hd_1) are stored in the table of correction values as correction values of the first row region, as shown in the right table of FIG. 21B. Note that correction values of the remaining second through seventh row regions (Hb_2, Hc_2, and Hd_2) through (Hb_7, Hc_7, and Hd_7) are calculated and stored in the same way as mentioned above.

After the correction values are stored in the memory 63 of the printer 1 as mentioned above, the process for setting correction values (S100 of FIG. 10A) has been completed.

Then, the "process for verifying density correction effects" (S150 of FIG. 10A) is performed, to verify the presence/absence of improvement in unevenness in density, that is, the presence/absence of density correction effects based on the correction values. After completion of the process for verifying density correction effects, the printer 1 is disconnected from the inspection computer 110. If the printer 1 is judged as showing no improvement effect against unevenness in density, that is, density correction is not achievable, the printer 1 is sent to a certain investigation process in order to find its cause. On the other hand, if the printer 1 is judged as showing improvement effects, that is, density correction is achievable, the printer 1 is shipped from the plant after other inspections of the printer 1. A CD-ROM in which the printer driver is stored is packaged with the printer 1.

Regarding Processes Under Instructions by User

Figure 22:
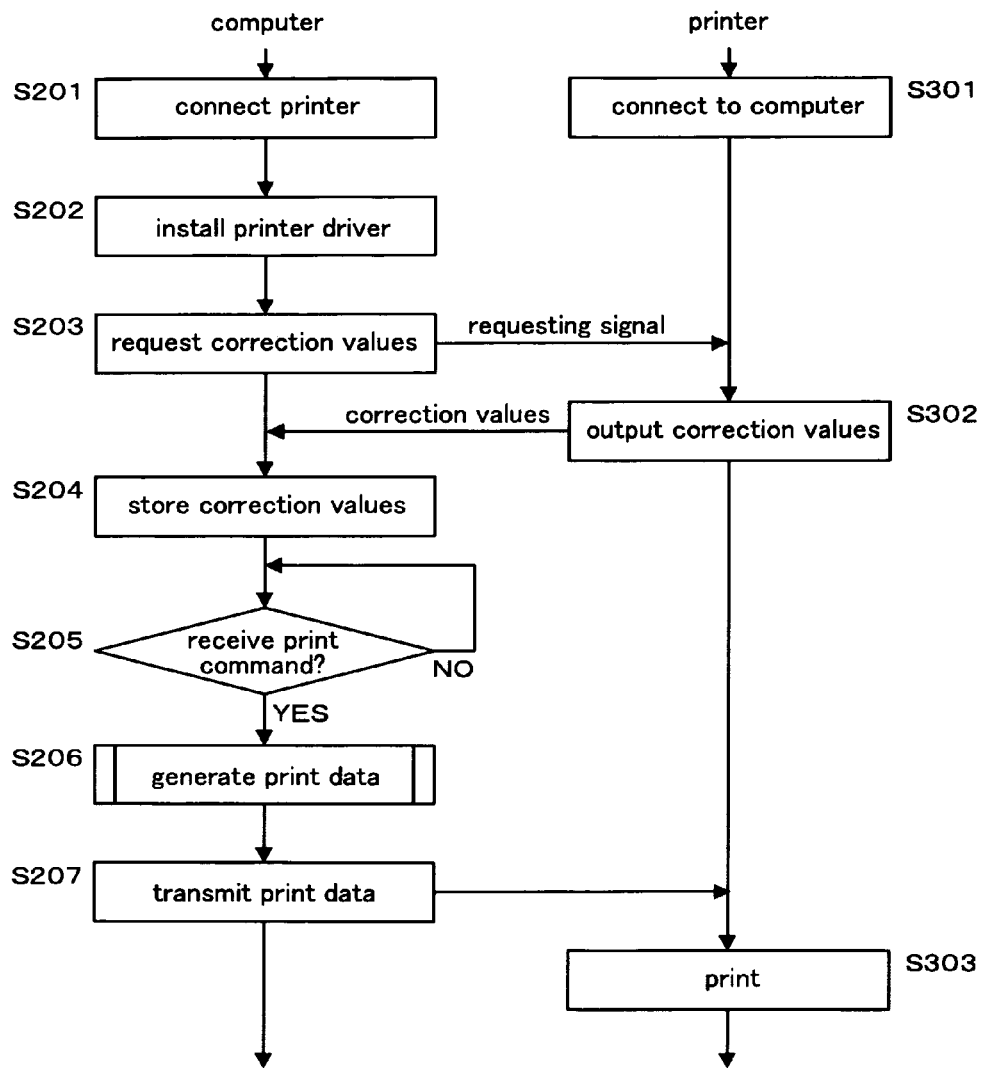
FIG. 22 is a flowchart showing processes under instructions by a user.

FIG. 22 is a flowchart showing processes under instructions by a user.

A user who has purchased a printer 1 connects the printer 1 to a computer 110 owned by the user (as a matter of course, a different computer from the inspection computer of the printer manufacturing plant) (S201, S301). The computer 110 of the user is not required to be connected to a scanner 150.

Next, the user sets a packaged CD-ROM on a record/play device 140, and installs a printer driver (S202). The printer driver installed on the computer 110 requests the printer 1 to transmit correction values to the computer 110 (S203). The printer 1 transmits, on request, to the computer 110 tables of correction values stored in its memory 63 (S302). The printer driver stores the correction values transmitted by the printer 1 in the memory (S204). As a result thereof, the tables of correction values are created in the computer. After completion of these processes, the printer driver is on standby until the printer driver receives a print command by the user (NO in S205).

When the printer driver receives a print command by the user (YES in S205), the printer driver generates print data based on the correction values (S206), and transmits the print data to the printer 1. The printer 1 prints according to the print data (S303).

Figure 23:
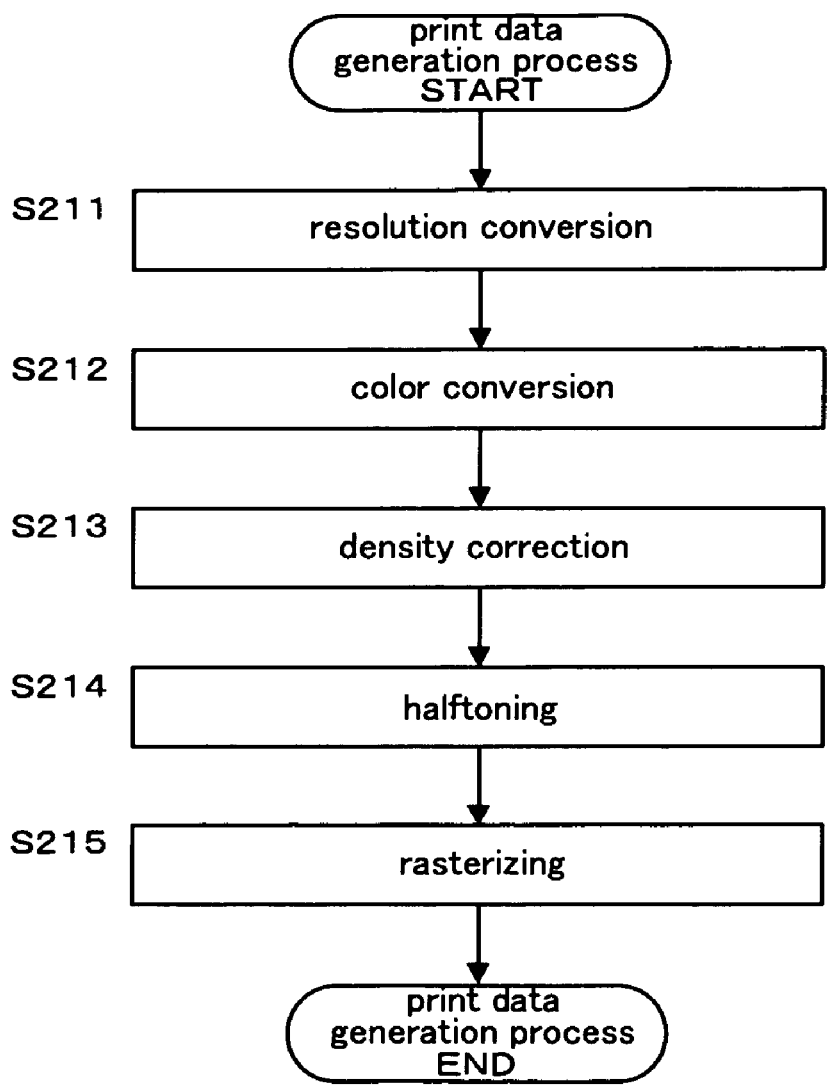
FIG. 23 is a flowchart showing processes in print data generation.

FIG. 23 is a flowchart showing processes in print data generation. These processes are performed by the printer driver.

First, the printer driver converts resolution (S211). The resolution conversion is a process for converting image data (text data, picture data, and the like) outputted by an application program into resolution with which the image is to be printed on paper. For example, if the resolution for printing the image on the paper is specified as 720×720 dpi, the image data received from the application program is converted into image data with resolution of 720×720 dpi. The image data after the resolution conversion is data with 256 tone levels represented by RGB color space (RGB data).

Next, the printer driver converts colors (S212). The color conversion is a process for converting RGB data into CMYK data, which is represented by CMYK color space. This color conversion is performed by the printer driver's referring to a table in which tone values of RGB data are associated with tone values of CMYK data (Color Conversion Lookup Table: LUT). In this color conversion, RGB data of each pixel is converted into CMYK data which corresponds to a color of ink. Data after the color conversion is CMYK data with 256 tone levels represented by CMYK color space.

Next, the printer driver performs density correction (S213). The density correction is a process for correcting a tone value of each pixel data based on the correction values corresponding to the row region which the pixel data belongs to.

Figure 24:
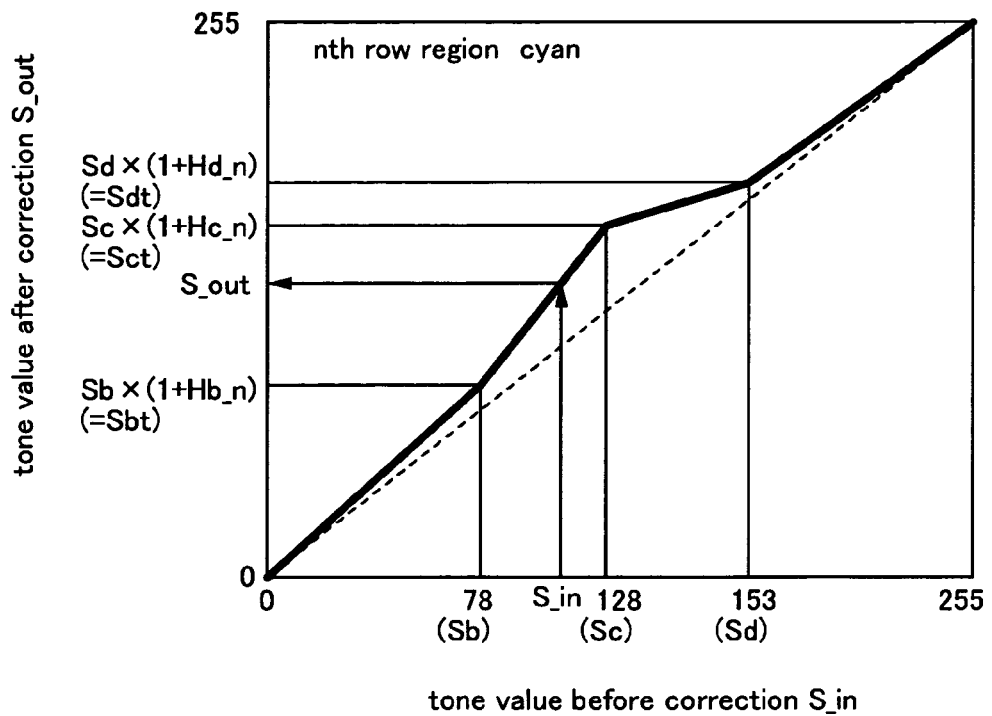
FIG. 24 is an explanatory diagram showing how to correct density of an nth row region of cyan.

FIG. 24 is an explanatory diagram showing how to correct a density of the nth row region of cyan. The figure shows how a tone value S_in of pixel data of pixels belonging to the nth row region of cyan is corrected. A corrected tone value is S_out.

In case that a uncorrected tone value S_in of pixel data equals to the designated tone value Sb, the printer driver can form an image with the target value Cbt in the unit region corresponding to the pixel data if the printer driver corrects the tone value S_in so that it becomes equal to the target designated tone value Sbt. In short, if the uncorrected tone value S_in of the pixel data equals to the designated tone value Sb, it is preferable that the tone value S_in (=Sb) is corrected to Sb×(1+Hb) using the correction value Hb corresponding to the designated tone value Sb. Also, if the tone value S of the pixel data before the correction equals to the designated tone value Sc, it is preferable that the tone value S_in (=Sc) is corrected to Sc×(1+Hc).

On the other hand, if the uncorrected tone value S_in is different from the designated tone value, the tone value S_out to be outputted is calculated with linear interpolation as shown in FIG. 24. In linear interpolation in the figure, sections between the corrected tone values S_out (Sbt, Sct, and Sdt) corresponding to the designated tone values (Sb, Sc, and Sd) are interpolated with linear interpolation. However, the invention is not limited thereto. For example, a correction value H corresponding to a tone value S_in can be calculated by linear interpolation between the correction values (Hb, Hc, and Hd) corresponding to the designated tone values, and a corrected tone value can be calculated with the formula S_in×(1+H) based on the correction value H calculated.

Regarding pixel data of each of the first through thirtieth row regions in the front-end print region, the printer driver performs density correction based on the correction values corresponding to each of the first through thirtieth row regions, which are stored in the table of correction values for the front-end print region. For example, regarding pixel data of the first row region in the front-end print region, the printer driver performs density correction based on the correction value (Hb_1, Hc_1, or Hd_1) corresponding to the first row region stored in the table of correction values for the front-end printing.

Also, regarding pixel data of each of the first through seventh row regions in the regular print region (each of the thirty-first through thirty-seventh row regions in the entire print region), the printer driver performs density correction based on the correction values corresponding to each of the first through seventh row regions, which are stored in the table of correction values for the regular print region. However, though there are thousands of row regions in the regular print region, the correction values corresponding to only seven row regions are stored in the table of correction values for the regular print region. Accordingly, regarding pixel data of each of the eighth through fourteenth row regions in the regular print region, the printer driver performs density correction based on the correction values corresponding to each of the first through seventh row regions, which are stored in the table of correction values for the regular print region. Thus, regarding row regions in the regular print region, the printer driver uses, repeatedly for every seven row regions, the correction values corresponding to each of the first through seventh row regions. Since there is regularity for every seven row regions in the regular print region, the characteristic of unevenness in density is also expected to appear in the same cycle. Therefore, using the correction values repeatedly in the same cycle reduces an amount of data of the correction values to be stored.

Though the number of the row regions in the regular print region of the correction pattern is fifty six, the number of row regions in the regular print region of a print image to be printed by the user is much more than the above-mentioned number and is in the order of thousands. The rear-end print region consisting of thirty row regions is formed on the upstream side of the regular print region in the carrying direction (the rear-end side of the paper).

In the rear-end print region, same as the front-end print region, regarding pixel data of each of the first through thirtieth row regions in the rear-end print region, the printer driver performs density correction based on the correction values corresponding to each of the first through thirtieth row regions, which are stored in the table of correction values for the rear-end print region.

By the above-mentioned density correction, in a row region which tends to be visually perceived darker in color, a tone value of pixel data (CMYK data) of pixels corresponding to that row region is corrected in order to be lower. On the contrary, in a row region which tends to be visually perceived lighter in color, a tone value of pixel data of pixels corresponding to that row region is corrected in order to be higher. In addition, for other row regions in other colors, the printer driver performs correction in the same way.

Next, the printer driver performs a halftoning process (S214). Halftoning is a process for converting data with a finer gradation of tone into data with a gradation of a tone that can be formed by the printer 1. For example, by halftoning, 8-bit data with 256 tone levels is converted into 1-bit data with 2 tone levels or 2-bit data with 4 tone levels. In halftoning, in order to enable the printer 1 to form dots in a scattered manner, pixel data is generated using dithering, gamma correction, error diffusion, and the like. When the printer driver performs halftoning process, the printer driver refers to a dither table in case of dithering, refers to a gamma table in case of gamma correction, and refers to an error memory for storing diffused errors in case of error diffusion. The halftoned data has the resolution equivalent to the above-mentioned RGB data (for example, 720×720 dpi).

In the present embodiment, the printer driver performs the halftoning process to pixel data with tone values corrected by density correction. As a result thereof, in a row region which tends to be visually perceived darker in color, the dot-generation rate of dots of which a dot row in that row region consists decreases because tone values of pixel data of that row region are corrected in order to be lower. On the contrary, in a row region which tends to be visually perceived lighter in color, the dot-generation rate increases.

Next, the printer driver rasterizes data (S215). Rasterizing is a process for rearrange the order of image data which is in a matrix form, into the order of transmission to the printer 1. Rasterized data is outputted to the printer 1 as pixel data contained in the print data.

When the printer prints based on the print data generated as mentioned above, the dot-generation rate of a dot row in each of row regions are changed and densities of pieces of image in the row regions is corrected, and thereby unevenness in density in the entire print image is suppressed as shown in FIG. 9C.

Though, in the explanation above, the number of nozzles and the number of row regions (the number of dot rows) are reduced for convenience of explanation, the actual number of the nozzles is 180, and, for example, the number of the row regions in the front-end print region is 360. However, processes performed by the program for setting correction values, the printer driver, and the like are almost the same.

Regarding Process for Verifying Density Correction Effects (S150)

The "process for verifying density correction effects" (S150 of FIG. 10A) is a process in which the printer 1 is caused to print a verification pattern actually and verification is made, based on this verification pattern, as to whether or not the correction values which have been set on the printer 1 achieve the expected improvement effects against unevenness in density. Accordingly, the printer 1 on which the correction values are set is to be verified. If it is judged based on the verification pattern that there is no correction effect, it is considered that density correction is not achievable in that printer 1. The fact is reported to an inspector working on the inspection process and the inspector stops shipping of that printer 1 and sends it to the certain investigation process.

Figure 25:
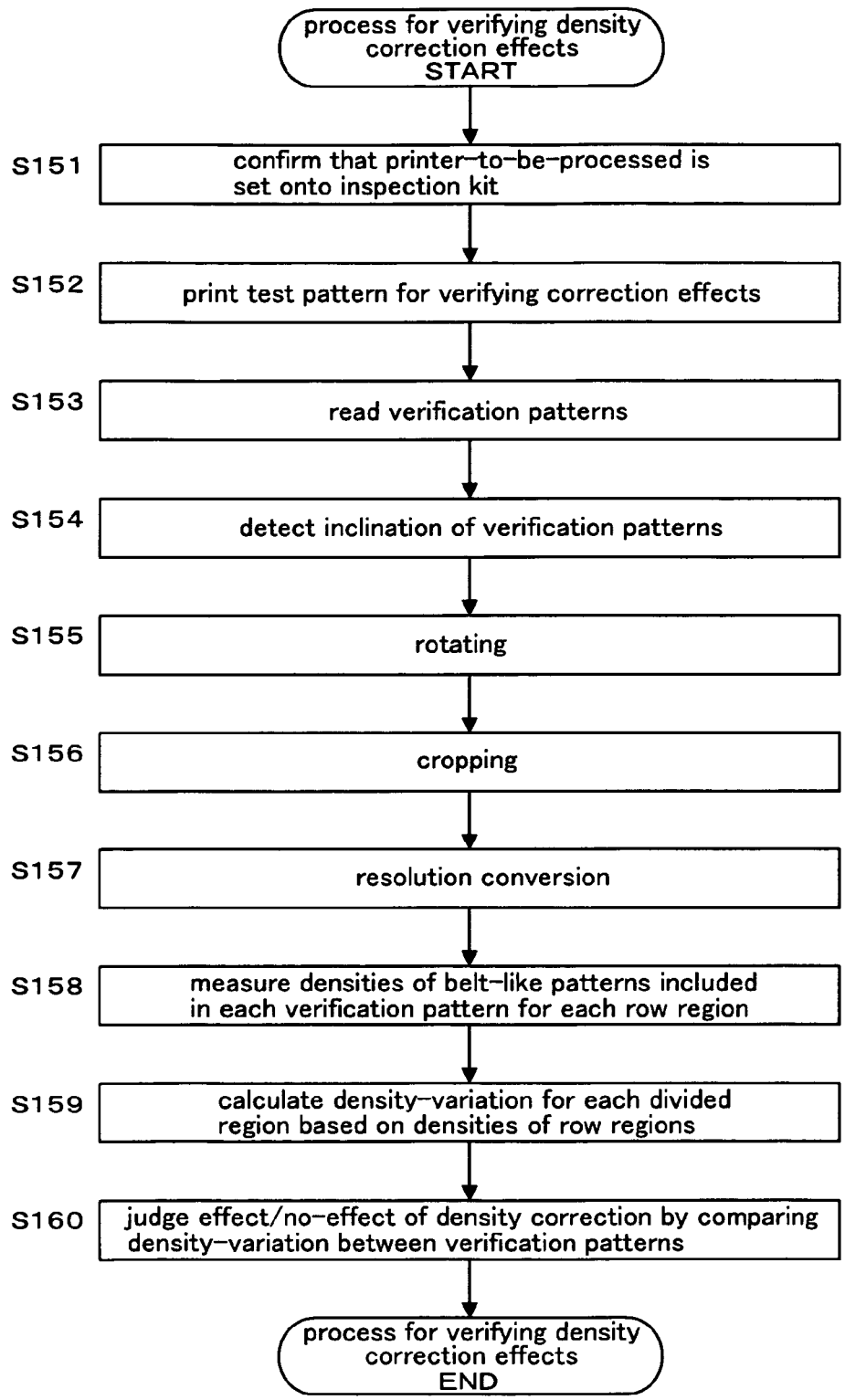
FIG. 25 is a flowchart of a process for verifying density correction effects shown in FIG. 10A.

FIG. 25 is a flowchart of the process for verifying density correction effects.

First, an inspector confirms that the printer 1 to be processed is set onto the inspection kit (S151). Note that, since this confirmation is made immediately after completion of the process for setting correction values shown in FIG. 10B, the printer 1 to be processed has been set onto the inspection kit unless in extraordinary circumstances. In other words, the printer 1 remains connected to the inspection computer 110 and the inspection ink cartridge 35 included in the inspection kit. In addition to the printer driver and the scanner driver, the inspection computer 110 of the inspection kit has a program for verifying correction effects which is installed thereon and is for judging quantitatively improvement effects against unevenness in density; the judgment being based on image data of the verification pattern read by the scanner 150.

Next, the printer driver of the inspection computer 110 causes the printer 1 to print a test pattern for verifying correction effects (S152).

Figure 26:
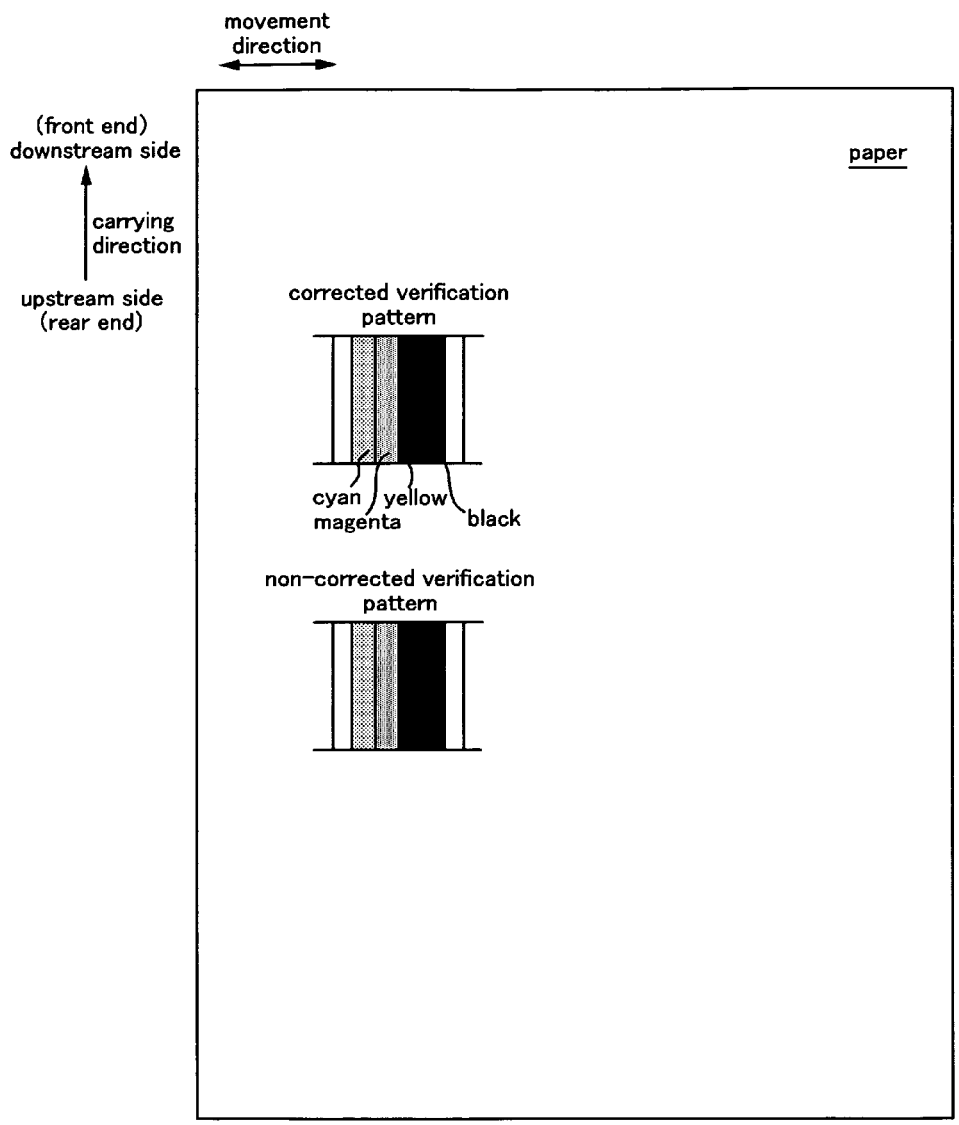
FIG. 26 is an explanatory diagram showing a test pattern for verifying correction effects.
Figure 27:
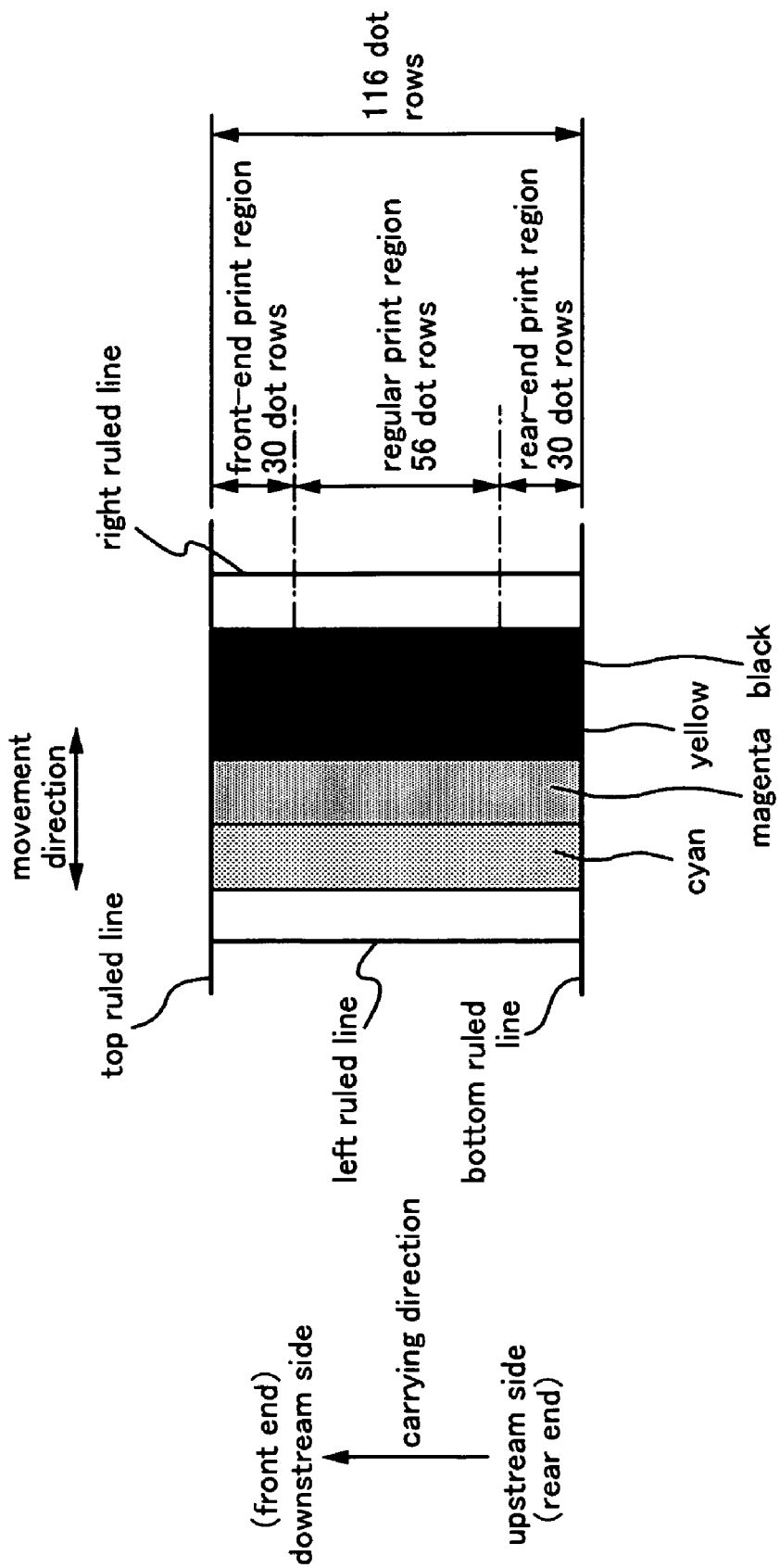
FIG. 27 is an explanatory diagram showing a verification pattern.

FIG. 26 is an explanatory diagram showing the test pattern for verifying correction effects, and FIG. 27 is an explanatory diagram showing a verification pattern contained in the test pattern. As shown in FIG. 26, two verification patterns are formed on one sheet of paper as the test pattern. One of the verification patterns is a pattern which is density-corrected based on the above-mentioned correction values (hereinafter referred to as a corrected verification pattern), and the other verification pattern which is formed therebelow is a pattern which is not density-corrected (hereinafter referred to as a non-corrected verification pattern). Both verification patterns are printed with print resolution of 720×720 dpi in the same manner as the above-mentioned correction pattern.

The same image data is used for printing of these two verification patterns. The only difference between these verification patterns is whether the density correction (S213) is performed or not in print data generation of FIG. 23 by the printer driver. More specifically, in printing of the corrected verification pattern, print data is generated by processing the image data according to the flow shown in FIG. 23, and in printing of the non-corrected verification pattern, print data is generated from the image data by skipping density correction (S213) of FIG. 23 and performing S211, S212, S214, and S215.

Therefore, these two verification patterns do not differ visually except unevenness in density. Both of the two verification patterns consist of four types of belt-like patterns (each of the belt-like patterns serving as a comparison pattern), a top ruled line, a bottom ruled line, a left ruled line, and a right ruled line, as shown in FIG. 27; the belt-like patterns being lined up in the movement direction.

The belt-like patterns are generated from image data having their respective tone values which are uniform throughout the carrying direction. The belt-like patterns are respectively formed with ink ejected from only nozzles of the cyan ink nozzle group (C), with ink ejected from only nozzles of the magenta ink nozzle group (M), with ink ejected from only nozzles of the yellow ink nozzle group (Y), and with ink ejected from only nozzles of the black ink nozzle group (K) in order shown from left to right.

Note that the above-mentioned inspection ink cartridge 35 is attached to the carriage 31 of the printer 1. All of the four nozzle groups eject light magenta ink as an inspection ink, and therefore all of the belt-like patterns are light magenta in color.

Further, since it is desirable to set the tone value to a tone value which tends to make unevenness in density conspicuous, the tone value of halftone (=102 (30% CD)) is set to all of the belt-like patterns in this example. Therefore, boundaries between the belt-like patterns are invisible on actual verification patterns. However, for convenience of explanation, the belt-like patterns are illustrated as having different density in this example, as shown in FIGS. 26, 27, and the like.

As shown in FIG. 27, each of the belt-like patterns of the nozzle groups is formed by front-end printing, regular printing, and rear-end printing, in the same manner as the above-mentioned belt-like patterns of the correction patterns. Thus, each belt-like pattern consists of thirty dot rows in the front-end print region, fifty six dot rows (=seven dot rows in each cycle×eight cycles) in the regular print region, and thirty dot rows in the rear-end print region. The top ruled line is formed with the first one of dot rows which the belt-like pattern consists of (the dot row on the most downstream side in the carrying direction), and the bottom ruled line is formed with the last one of dot rows which the belt-like pattern consists of (the dot row on the most upstream side in the carrying direction); this is the same as the above-mentioned correction patterns.

Next, an inspector places the paper on which the test pattern is printed with the printer 1 on the document platen glass 152 of the scanner 150, and sets the paper on the scanner 150. The scanner driver installed on the inspection computer 110 causes the scanner 150 to read each verification pattern (S153). Note that, though the section below describes reading of mainly one of the verification patterns, the other one of the verification patterns is read in the same manner.

Figure 28:
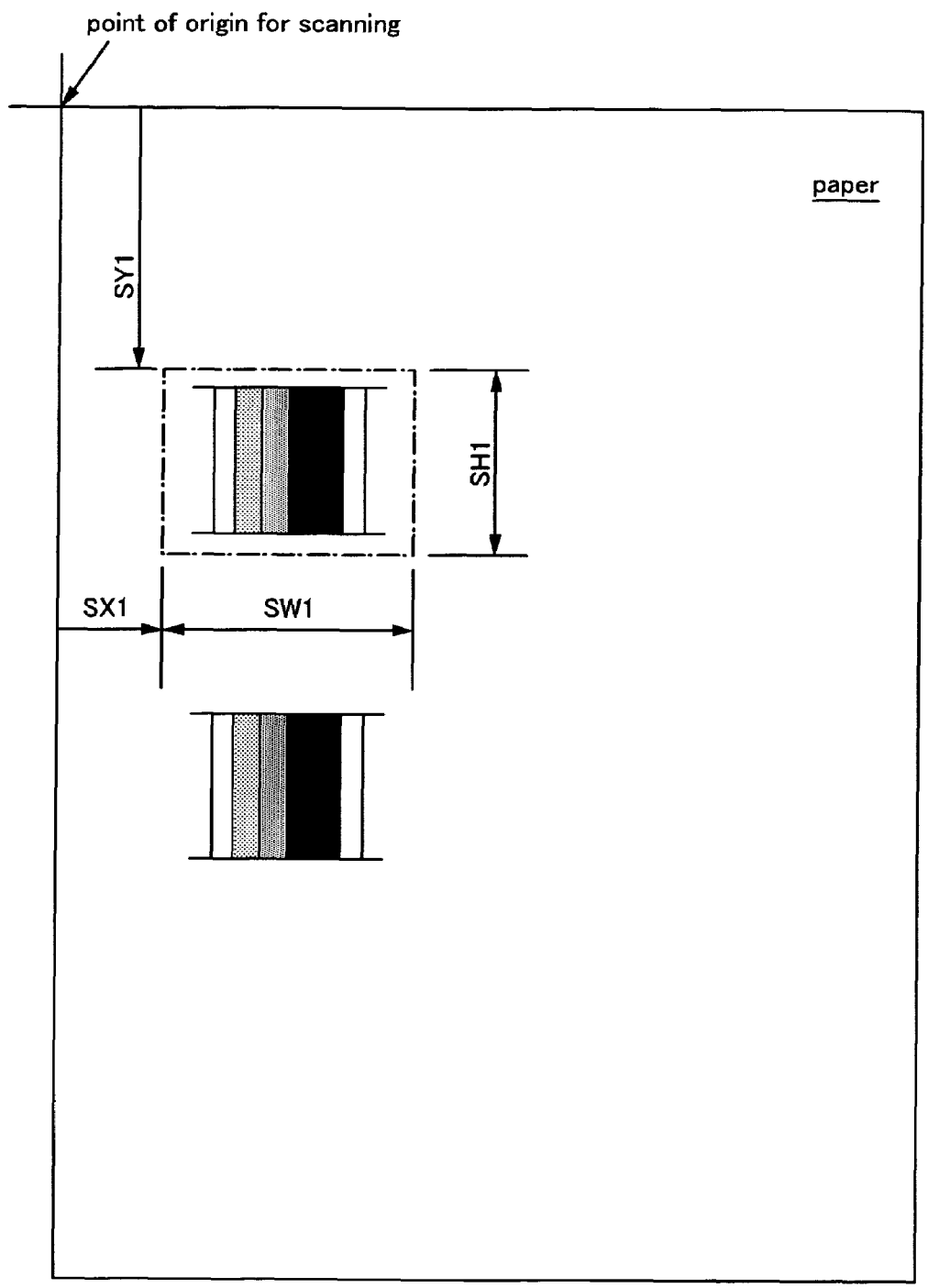
FIG. 28 is an explanatory diagram showing a reading range of the verification patterns.

FIG. 28 is an explanatory diagram showing the reading range of the verification patterns. A range within dot dash lines surrounding that verification pattern is a reading range of that verification pattern. Note that the reading is performed in the same manner as the above-mentioned S103 (reading of correction patterns) and that, as a result thereof, the image within the reading range in the figure is read by the inspection computer 110 as image data of a rectangle with reading resolution of 2880×2880 dpi.

Figure 29A:
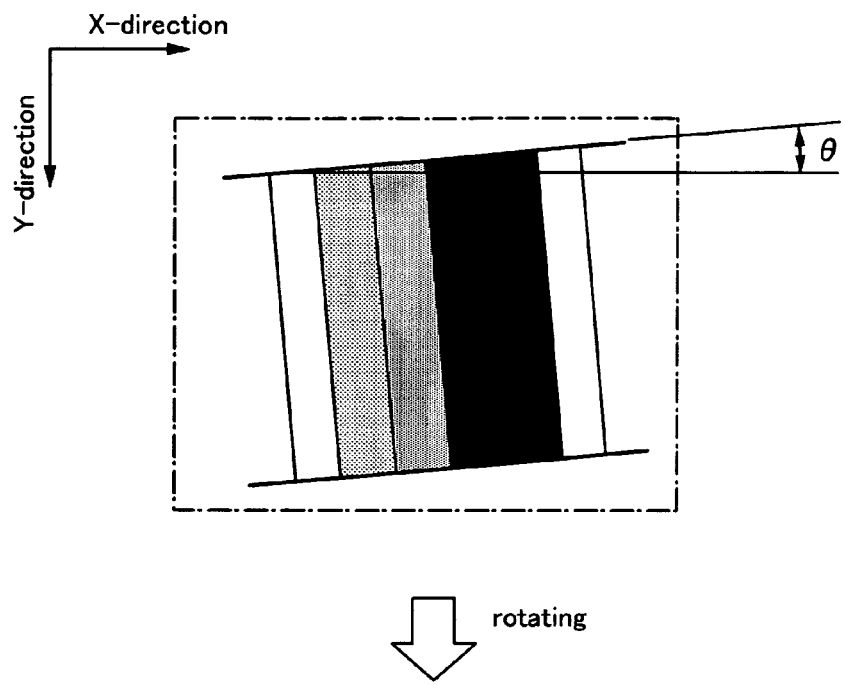
FIG. 29A is an explanatory diagram showing image data on detection of an inclination and FIG. 29B is an explanatory diagram showing the rotated image data.
Figure 29B:
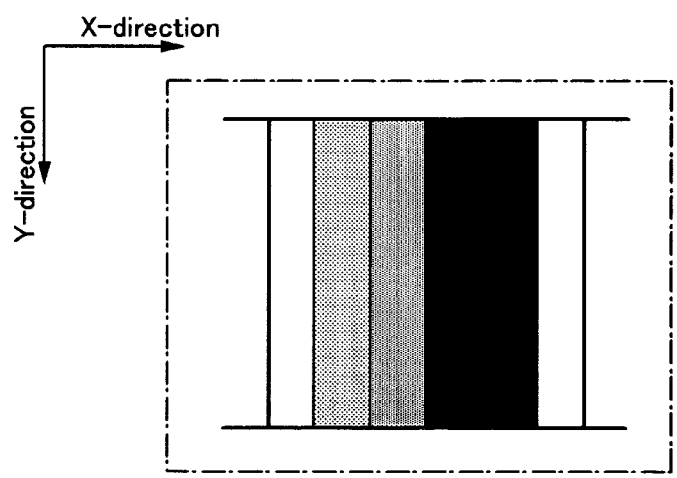

Next, the program for verifying correction effects installed on the inspection computer 110 detects an inclination θ of the verification pattern in the image data (S154) as shown in FIG. 29A, and rotates the image data depending on the inclination θ (S155) as shown in FIG. 29B. Note that these processes for detection of the inclination of the verification pattern and for rotation thereof are achieved in the same way as processed in the above-mentioned S104 (detection of inclinations of correction patterns) and S105 (rotating) respectively.

Figure 30A:
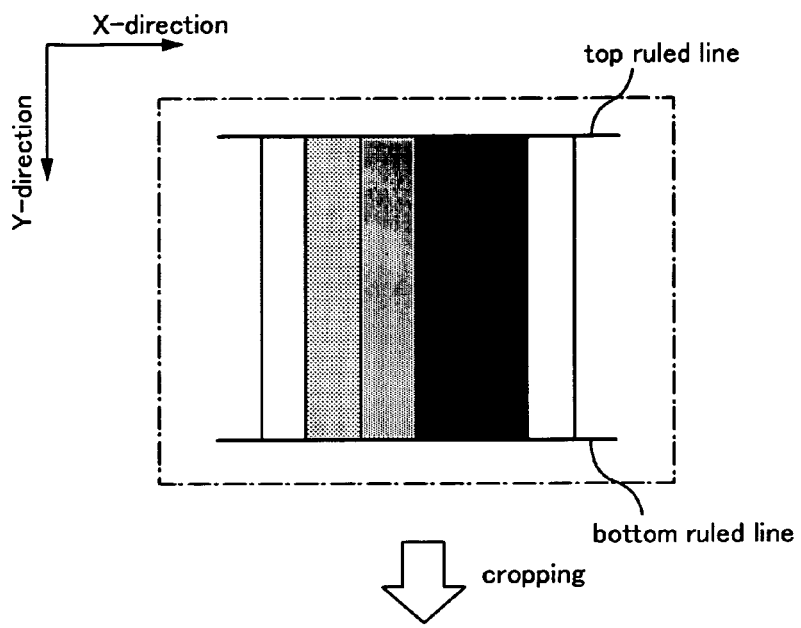
FIG. 30A is an explanatory diagram showing uncropped image data.

Next, the program for verifying correction effects crops the image data in order to eliminate unnecessary pixel data (S156). The unnecessary pixel data is located above the top ruled line and below the bottom ruled line, in Y-direction among image data surrounded by dot dash lines in FIG. 30A. The image data is processed by cropping so that it becomes image data shown by dot dash lines in FIG. 30B. Note that this cropping is also achieved in the same way as processed in the above-mentioned S106 (cropping).

Figure 30B:
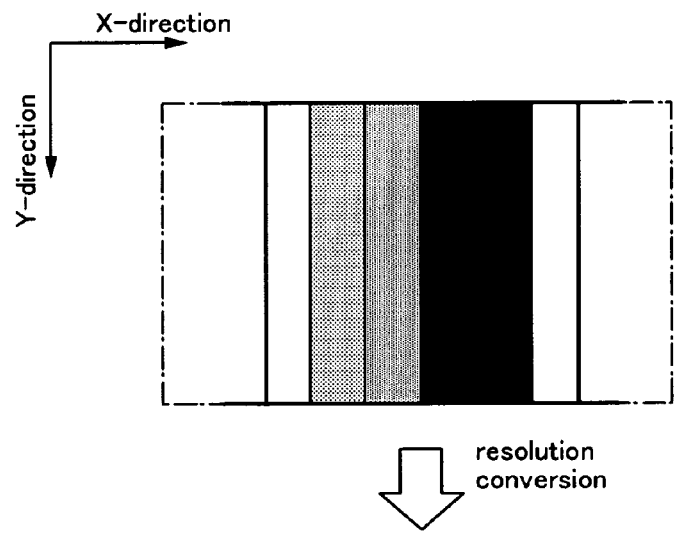
FIG. 30B is an explanatory diagram showing the cropped image data.
Figure 30C:
FIG. 30C is an explanatory diagram showing the image data after resolution conversion.

Next, the program for verifying correction effects converts the resolution of the cropped image data in order to make the number of pixels of that image data in Y-direction equal to the number of dot rows which the verification pattern consists of (S157). This resolution conversion is processed in the same way as the above-mentioned S107 (resolution conversion). As a result thereof, the image data before resolution conversion shown in FIG. 30B is converted such that the number of pixels in Y-direction equals to the number of dot rows which the verification pattern consists of, as shown in FIG. 30C. Accordingly, one row of pixels of the image data in X-direction corresponds to one row region on a one-to-one basis.

Next, the program for verifying correction effects measures densities of the belt-like patterns in each row region respectively (S158), the belt-like patterns corresponding to the four respective nozzle groups. This process for measuring densities is almost the same as the above-mentioned S108. However, since these processes differ somewhat, this section below describes measurement of densities of the row regions, taking of the belt-like patterns of the cyan ink nozzle group among the four nozzle groups as an example.

Figure 31:
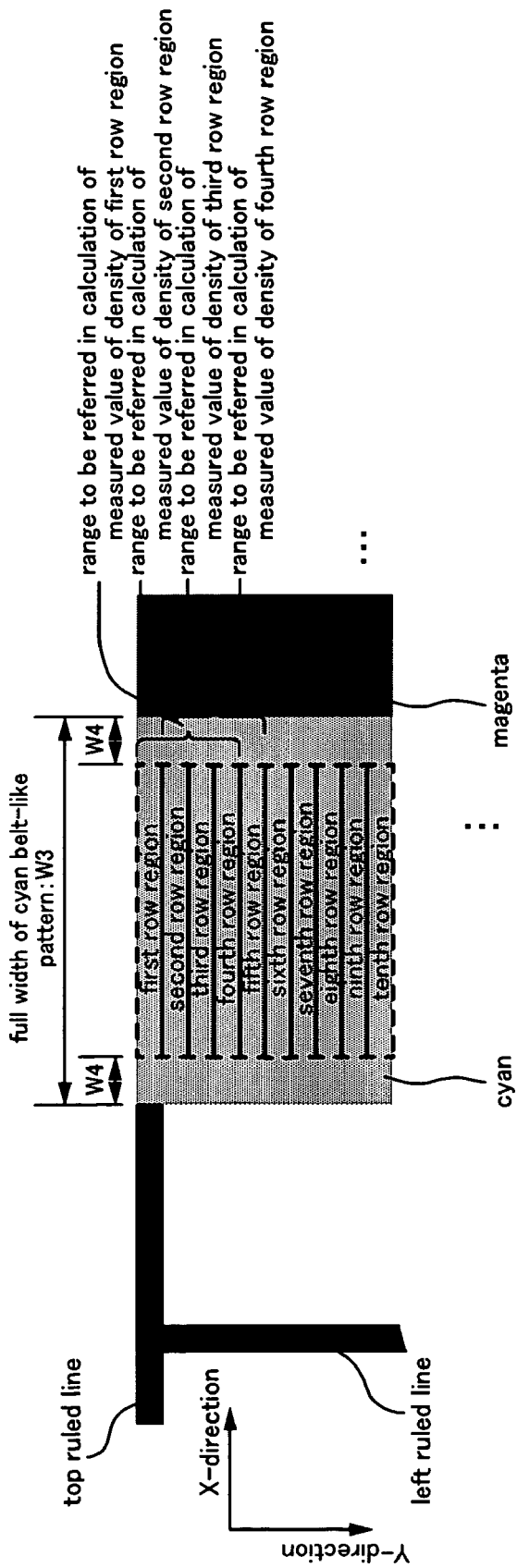
FIG. 31 is an explanatory diagram showing density measurement of each of the first through fourth row regions.

As shown in the magnified view of the verification pattern in FIG. 31, the program extracts, in each row region, pixel data within a range surrounded by dotted line, which excludes two W4 wide ranges, the W4 wide ranges being located at respective horizontal ends of and within the belt-like pattern of cyan. An average of the tone values of the extracted pixel data is obtained for each of the row regions and each of the obtained average values is defined as a measured value of density in each of the row regions. The tasks so far are the same as the above-mentioned S108.

However, in S158, the above-mentioned measured values of densities in the respective row regions are defined as "provisional measured values", and a measured value of density in each of the row regions (serving as a read density) is obtained by smoothing those "provisional measured values" over Y-direction with a method similar to the moving average method. More specifically, for each "focused row region" for which a measured value of density is to be obtained, an average value of several "provisional measured values" is calculated and the average value is defined as the measured value of density for that "focused row region". Note that the number of the "provisional measured values" used for calculating the average value is a predetermined number of row regions which are lined up in Y-direction and include the "focused row region".

Here, it is desirable that this predetermined number is equal to k, that is, the number which determines the nozzle pitch of the head 41. The nozzle pitch k·D in the present embodiment is 4·D, and therefore, this predetermined number is four in the above-mentioned example. For example, as shown in FIG. 31, a measured value of density of a first row region is obtained as an average value of "provisional measured values" of four row regions which include this first row region and are lined up in Y-direction (i.e., four row regions starting from the first row region up to the fourth row region). Also, a measured value of density of a second row region is obtained as an average value of "provisional measured values" of four row regions which include this second row region and are lined up in Y-direction (i.e., four row regions starting from the second row region up to the fifth row region). Also, measured values of densities of a third row region onward in Y-direction are obtained in the same way.

Note that the measured values of densities of row regions are obtained by smoothing in this way in order to reduce negative effects brought about by abnormal values of density and increase accuracy of the measured values.

Figure 32:
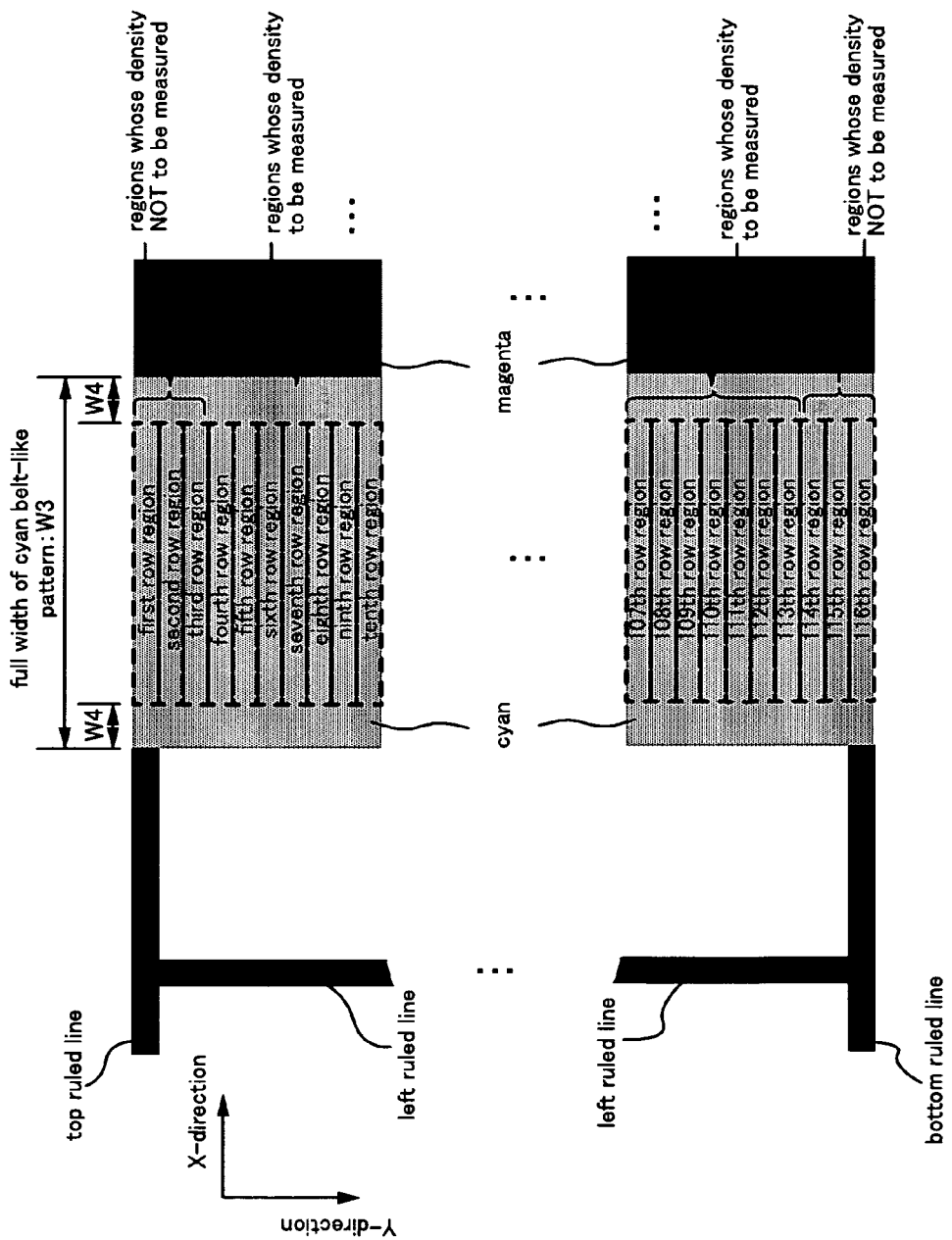
FIG. 32 is an explanatory diagram showing row regions whose densities do not have to be measured.

In addition, for the purpose of increasing accuracy of the measured values, it is also effective not to measure densities of row regions located near end sections of Y-direction whose measured values tend to be affected by the density of the margin and thus take on an abnormal value. For example, as shown in FIG. 32, three row regions located in the front end and in the rear end of a belt-like pattern with respect to Y-direction can be excluded from row regions whose density is to be measured.

Figure 33:
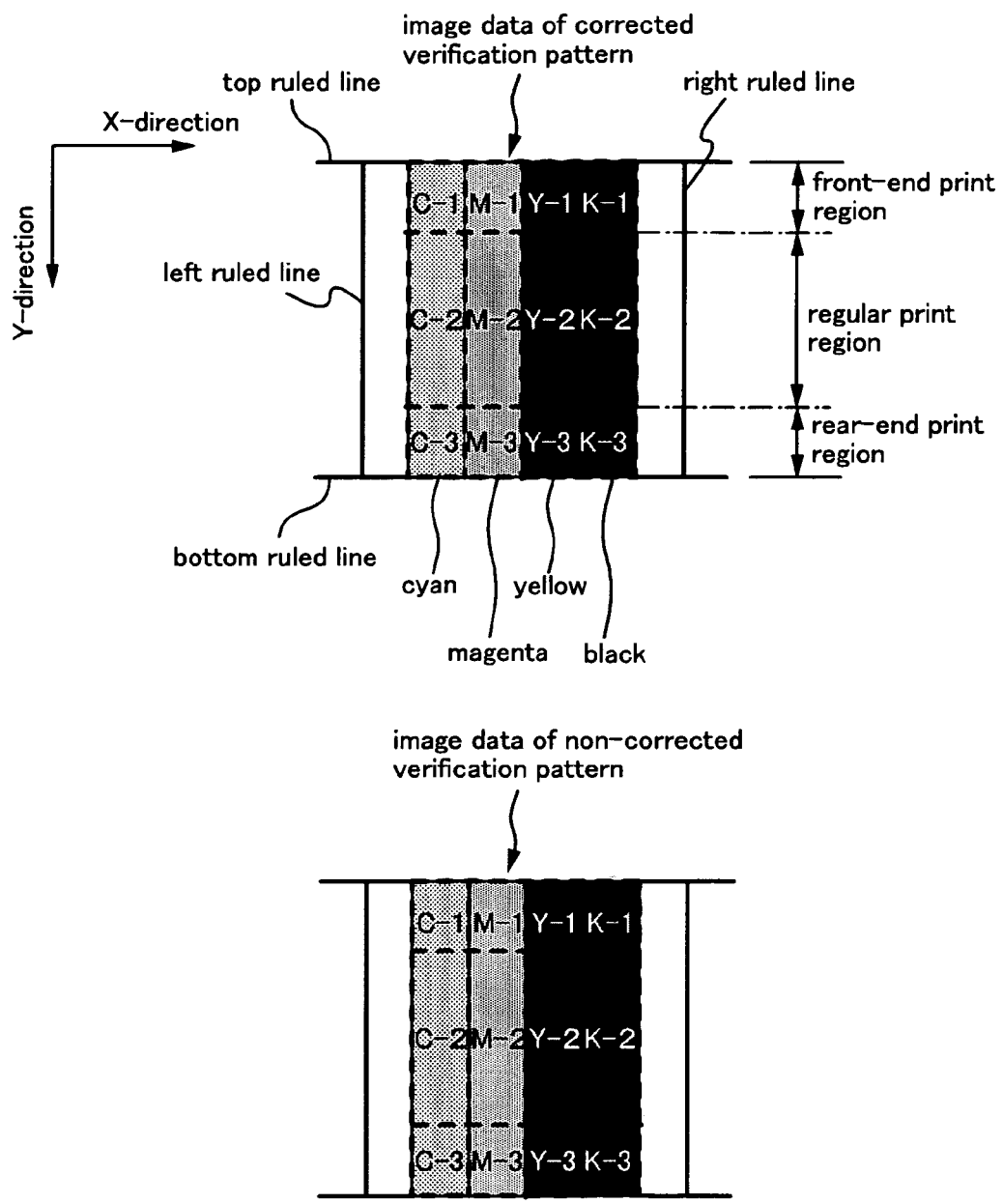
FIG. 33 is an explanatory diagram showing divided regions, which are units for calculating variation in density of each verification pattern.
Figure 34:
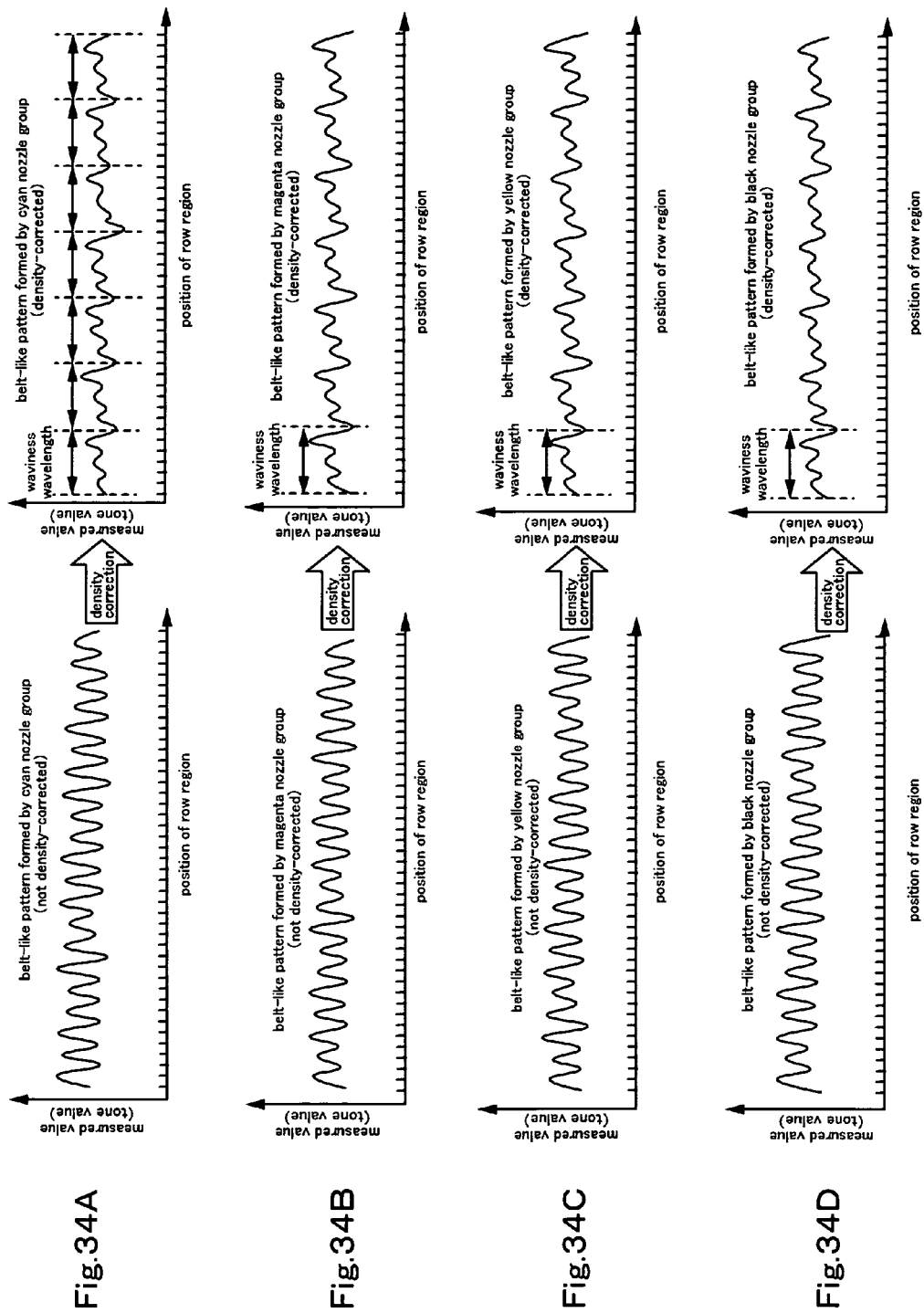
FIGS. 34A through 34D are graphs showing measured values of density for each of the row regions of belt-like patterns in verification patterns formed by a printer 1 which causes unevenness in density.

Next, the program for verifying correction effects calculates variation in density for each of the verification patterns (S159). The variation in density (hereinafter referred to as density-variation) is calculated for each of divided regions, the divided regions being defined as lattice cells into which each verification pattern is divided with respect to both of the movement direction and the carrying direction, as shown surrounded by bold dotted lines in FIG. 33. In the figure, each verification pattern is divided into four divisions in the movement direction corresponding to each belt-like pattern (that is, each nozzle group) and into three divisions in the carrying direction corresponding to each print region. Accordingly, the number of divided regions in each verification pattern is twelve.

Hereinafter, the front-end print region relating to the cyan ink nozzle group is defined as divided region C-1, the regular print region relating to the same is defined as divided region C-2, and the rear-end print region relating to the same is defined as divided region C-3. Also, the front-end print region relating to the magenta ink nozzle group is defined as divided region M-1, the regular print region relating to the same is defined as divided region M-2, and the rear-end print region relating to the same is defined as divided region M-3. Also, the front-end print region relating to the yellow ink nozzle group is defined as divided region Y-1, the regular print region relating to the same is defined as divided region Y-2, and the rear-end print region relating to the same is defined as divided region Y-3. Also, the front-end print region relating to the black ink nozzle group is defined as divided region K-1, the regular print region relating to the same is defined as divided region K-2, and the rear-end print region relating to the same is defined as divided region K-3.

The so-called standard deviation a is used in this example as an index for evaluating density-variation in each divided region. More specifically, density-variation in each divided region is calculated by the following formula when the divided region has n pieces of row regions and a measured value of density of a jth row region included in the divided region is defined as $C_j$.

$$\sigma = \sqrt{\{[(C_1 - C_{ave})^2 + \ldots + (C_n - C_{ave})^2]/n\}}$$

$C_{ave}$ in the preceding formula is $C_{ave} = (C_1 + \ldots + C_n)/n$.

The density-variations σ of the twelve divided regions are obtained for each of the corrected verification pattern and the non-corrected verification pattern. Next, the program for verifying correction effects judges the presence/absence of correction effects (S160).

In this S160, first, the density-variations σ of the corrected verification pattern and the non-corrected verification pattern are compared for each pair of the divided regions corresponding to each other. If, with respect to all twelve divided regions, the density-variations σ of the corrected verification pattern are the same as or smaller than those of the non-corrected verification pattern, the program judges that correction is effective. On the other hand, if there is even one divided region in the corrected verification pattern whose density-variation σ is larger than that of the non-corrected verification pattern, the program judges that correction has no effect.

If the program for verifying correction effects judges that correction is effective, the program displays "correction: effective" on the display device 120 of the inspection computer 110. On the other hand, if the program judges that correction has no effect, the program displays "correction: no effect" on the display device 120. In addition to this display indicating "correction: no effect", it is desirable to display a warning to re-print verification patterns or a warning to re-generate correction values of density. Accordingly, the inspector can re-perform the inspection process of the printer 1 in question from the "process for verifying density correction effects (S150)" or the "process for setting correction values (S100)", and the inspector can send this printer 1 to the investigation process after confirming that the judgment of no effect repeats on the printer 1 in question. As a result thereof, it is possible to reduce the number of printers 1 which, because of an inspector's misoperation in inspections and the like, are misjudged that correction has no effect.

Regarding Problems of "Process for Verifying Density Correction Effects (S150)"

In the above-mentioned "process for verifying density correction effects (S150)", the presence/absence of density correction effects is verified by comparing density-variation of each pair of the divided regions corresponding to each other between the corrected verification pattern and the non-corrected verification pattern which are printed by forming the belt-like patterns for the respective nozzle groups.

However, there are cases in which a printer 1 which is judged that density correction is effective on the above-mentioned verifying process causes unevenness in density when that printer 1 actually forms dots on paper by ejecting ink of each color from a plurality of nozzle groups in order to print a color image on the paper.

More specifically, there are cases in which unevenness in density which becomes conspicuous in an actual image is overlooked even through verification based on the above-mentioned belt-like patterns of the respective nozzle groups (each of the belt-like patterns serving as a comparison pattern). Accordingly, such a troubled printer 1 may be shipped as a printer 1 with which density correction is achievable.

The reason has not been clarified as to why some types of unevenness in density are overlooked even through such a verification based on the belt-like patterns of the respective nozzle groups. Currently, the reason is considered as described below.

FIGS. 34A through 34D, 35A, and 35B are explanatory graphs showing this unevenness in density, and all of the figures show the measured value of density of each of the belt-like patterns in the verification patterns, the verification patterns being formed by a printer 1 which causes this unevenness in density. Note that the horizontal axis indicates the positions of row regions in the belt-like pattern and the vertical axis indicates the measured values of density of each row region.

As is evident from comparisons between the belt-like patterns (not density-corrected) shown in the left graphs of FIGS. 34A through 34D and the belt-like patterns (density-corrected) shown in the right graphs of the same figures, density-variation on row regions is reduced by density correction and unevenness in density on row regions can be said to have been suppressed. However, in the belt-like patterns (density-corrected) shown in the right graphs of the same figures, waviness of density fluctuation exists, although its amplitude is small and its cycle is long enough to cover a plurality of row regions. In other words, density correction may cause the waviness of density fluctuation.

This waviness of density fluctuation having a long cycle occurs on all nozzle groups: cyan ink, magenta ink, yellow ink, and black ink. The waviness, on any nozzle group, occurs just in the form of small waviness in each of the belt-like patterns of the verification patterns. Therefore, there are cases in which this waviness does not cause the reversal of the standard deviations a (which are used for judging of density correction effects in S160) of the divided regions between the non-corrected and corrected verification patterns and the printer 1 is thus judged that density correction is effective.

Figure 35:
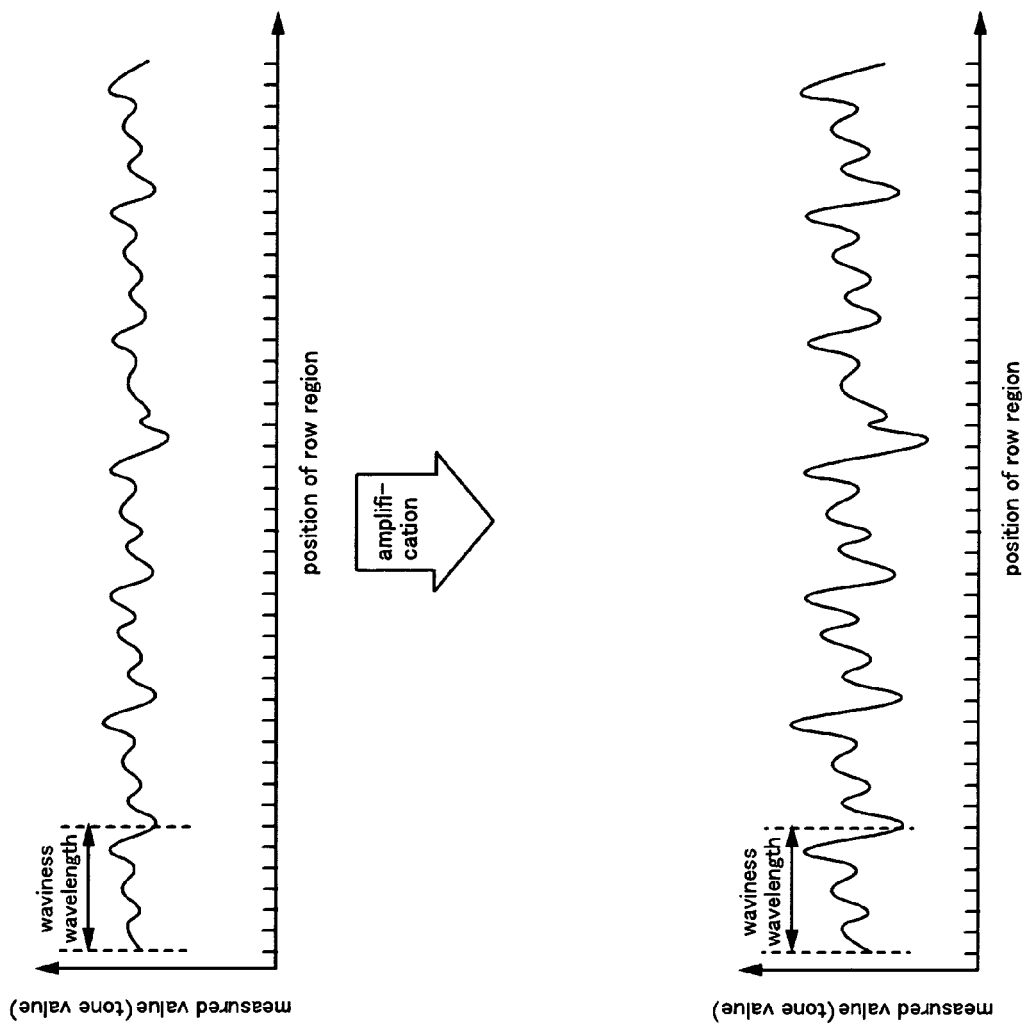
FIGS. 35A and 35B are explanatory graphs showing that, when a color image is printed, wavinesses of density fluctuation of respective nozzle groups overlap and are amplified.

However, the cycle and phase of the waviness are uniform through all nozzle groups: cyan ink, magenta ink, yellow ink, and black ink. Therefore, it is considered that when, in order to print the actual color image, a color image is formed with dots made by different colors of ink ejected from a plurality of the nozzle groups, wavinesses of density fluctuation of these respective nozzle groups overlap and are amplified as shown in FIG. 35B and the wavinesses become conspicuous in the image as visually noticeable unevenness in density.

In the "process for verifying density correction effects (S150)" relating to the present embodiment described below, another belt-like pattern formed by mixing dots of inks ejected from two or more nozzle groups is added to the belt-like patterns included in each of the verification patterns, the belt-like patterns corresponding to the respective nozzle groups (see FIG. 37). This belt-like pattern formed by mixing dots enables to detect the above-mentioned waviness of density fluctuation having a long cycle, the waviness being considered to be caused by density correction. As a result thereof, it becomes possible to judge achievability of density correction of an image more precisely.

Density correction itself is mentioned above as the one of causes of the waviness of density fluctuation having a long cycle. The reasons thereof are that the waviness does not appear in the belt-like patterns whose density is not corrected but appears in the belt-like patterns whose density is corrected, as mentioned above, and that a cycle of the waviness may agree approximately with a cycle of seven row regions or with a cycle of an integer multiple thereof (seven is the number of row regions in one cycle, for which the above-mentioned correction values are used repeatedly).

Figure 36:
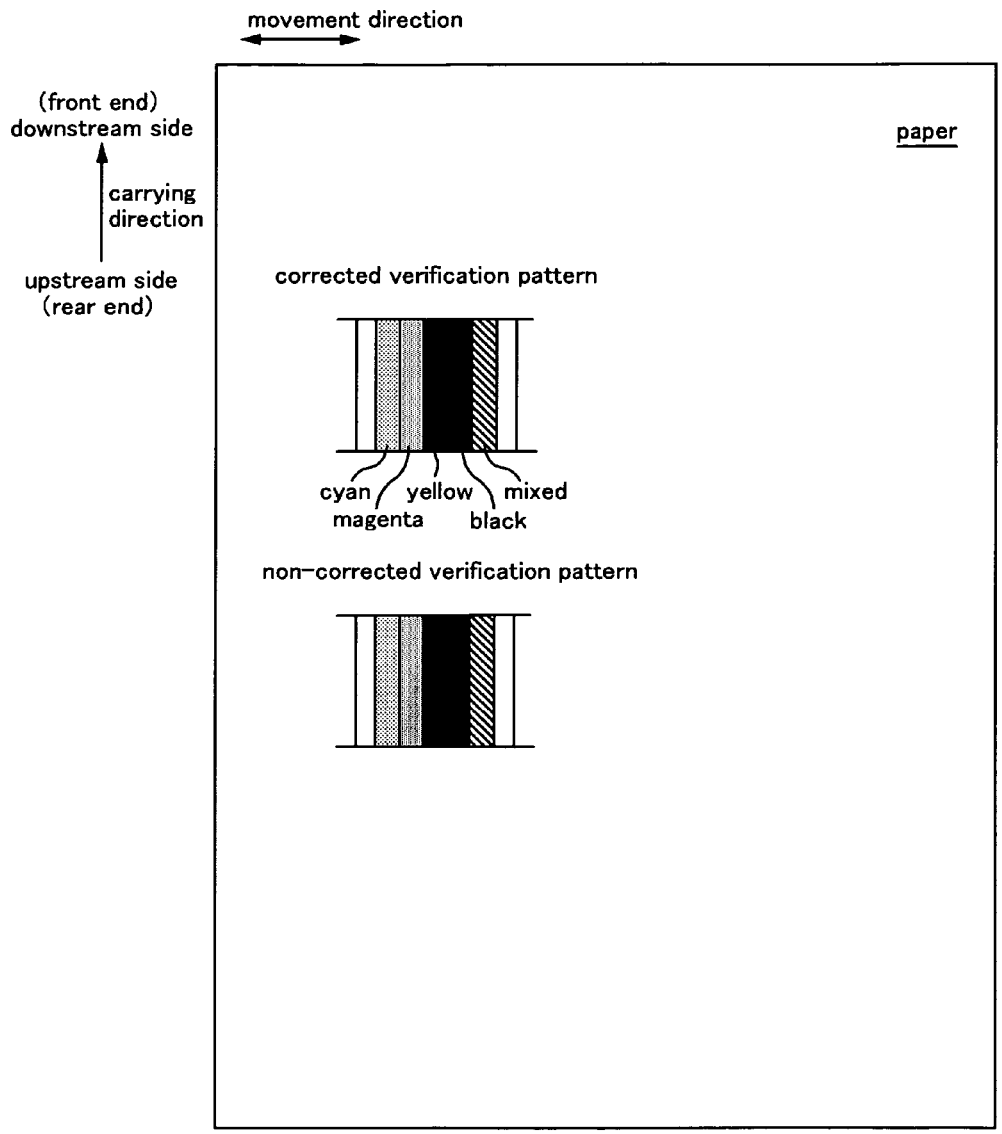
FIG. 36 is an explanatory diagram showing a test pattern for verifying correction effects relating to the present embodiment.

Regarding "Process for Verifying Density Correction Effects (S150)" According to the Present Embodiment FIG. 36 is an explanatory diagram showing the test pattern for verifying correction effects, according to the present embodiment.

In the same way as the above-mentioned test pattern for verifying correction effects of FIG. 26, a test pattern for verifying correction effects according to the present embodiment shown in FIG. 36 also includes a corrected verification pattern and a non-corrected verification pattern.

A main difference from the above-mentioned example of FIG. 26 is that a belt-like pattern formed by mixing dots of inks ejected from two or more nozzle groups (hereinafter referred to as a mixed belt-like pattern) is added to the belt-like patterns included in each of the verification patterns, and the remaining respects are almost same. Accordingly, the section below describes mainly the above-mentioned difference.

In the S152 of FIG. 25, "printing a test pattern for verifying correction effects", the mixed belt-like pattern is formed on the right end of each of the corrected verification pattern and non-corrected verification pattern and is added thereto, as shown in FIG. 36. This mixed belt-like pattern, in the same way as the other belt-like patterns, consists of a divided region Mix-1 in the front-end print region, a divided region Mix-2 in the regular print region, and a divided region Mix-3 in the rear-end print region, as shown in FIG. 37.

A verification pattern to which the mixed belt-like pattern is added is printed based on image data in the same way as the above-mentioned example. However, the mixed belt-like pattern is formed with inks ejected from nozzles of the cyan nozzle group, the magenta nozzle group and the yellow nozzle group respectively. Therefore, in the image data of the verification pattern, tone values of cyan, magenta, and yellow in a portion corresponding to the mixed belt-like pattern are set to the above-mentioned tone value of halftone (=102 (30% CD)) respectively, being uniform through the entire range of the carrying direction.

When the verification pattern is printed, the mixed belt-like pattern is colored light magenta, which is the color of the inspection ink, like the other belt-like patterns. Further, in the mixed belt-like pattern, there are often cases in which inks ejected from the three respective nozzle groups are ejected onto a single pixel, and therefore, two or three dots overlap on many pixels in the mixed belt-like pattern, the three respective nozzle groups being the cyan nozzle group, the magenta nozzle group, and the yellow nozzle group. Accordingly, the color of dots of the mixed belt-like pattern is much darker than the color of dots of the other belt-like patterns. As a result thereof, if the above-mentioned waviness of density fluctuation having a long cycle tends to occur, the amplitude of the waviness is amplified with larger degree than the amplitude in a case of the belt-like patterns corresponding to the nozzle groups. Thus, unevenness in density becomes more conspicuous.

And then, for the mixed belt-like pattern as well as the belt-like patterns corresponding to the nozzle groups, S153 through S159 of FIG. 25 are processed and the density-variations σ are obtained for each divided region, and then the process proceeds to S160 "judgment on effect/no-effect of density correction".

In S160, the density-variations a of the corrected verification pattern and the non-corrected verification pattern are compared for each pair of the divided regions corresponding to each other. If, with respect to all of fifteen divided regions C-1, C-2, C-3, M-1, . . . , and Mix-3 shown in FIG. 37, the density-variations σ of the corrected verification pattern are same as or smaller than those of the non-corrected verification pattern, it is judged that correction is effective. On the other hand, if, with respect to at least one divided region, the density-variation σ of the corrected verification pattern is larger than that of the non-corrected verification pattern, it is judged that correction has no effect.

In this case, if, on the belt-like patterns of the corrected verification pattern, the waviness of density fluctuation having a long cycle is caused by density correction as mentioned above, dots of inks from the three respective nozzle groups—the cyan nozzle group, the magenta nozzle group and the yellow nozzle group—are mixed in the mixed belt-like pattern thereof and the amplitude of the waviness in the pattern is amplified as shown in FIG. 35B. This amplification increases the density-variation standard deviations σ of the divided regions in the mixed belt-like pattern of the corrected verification pattern. As a result thereof, if, with respect to any one of the divided regions Mix-1, Mix-2, and Mix-3, the density-variation a of the mixed belt-like pattern of the corrected verification pattern is larger than that of non-corrected verification pattern, it is judged that density correction has no effect.

Note that, another conceivable method of amplifying the amplitude of the waviness up to the same level as that achieved using the mixed belt-like pattern is to set the tone values of the belt-like patterns corresponding to the respective nozzle groups to 90% CD, which is three time as a high tone value (density) as 30% CD, for example. However, this method is not effective because it cannot amplify the waviness as much as in the case of using the mixed belt-like pattern.

Figure 38:
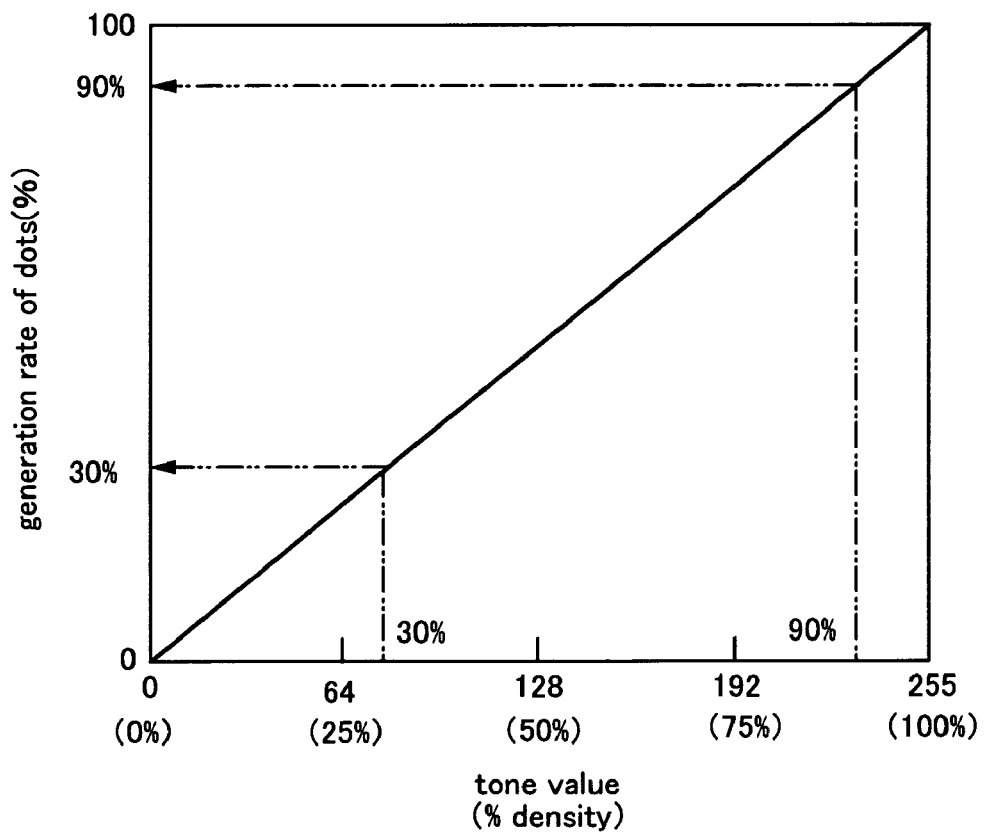
FIG. 38 is a graph showing a table of dot-generation rates.
Figure 39A:
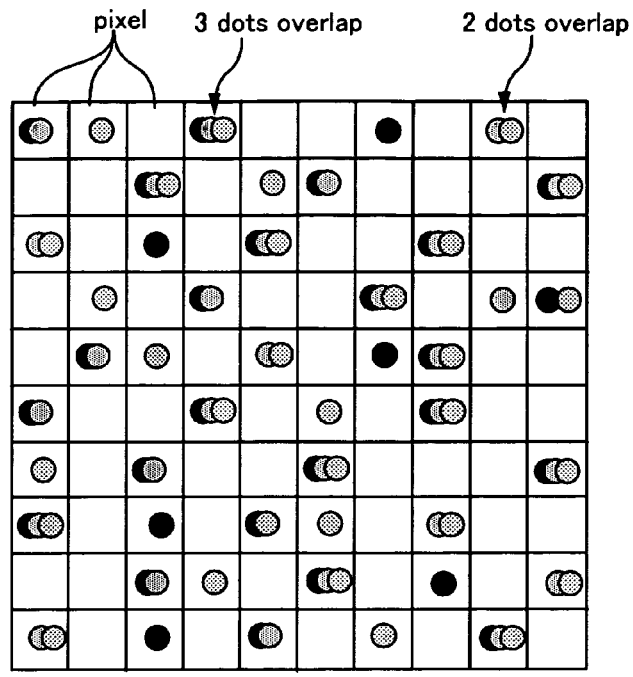
FIGS. 39A and 39B are conceptual drawings showing how dots are formed on a belt-like pattern.
Figure 39B:
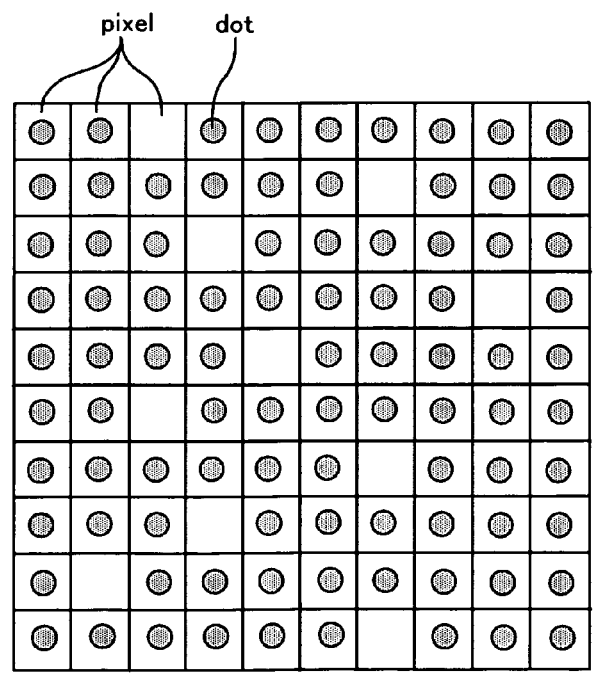

The reason thereof is described with referring to FIGS. 38, 39A and 39B. FIG. 38 is a graph showing a simplest example of a table of the dot-generation rate used in halftoning; the horizontal axis shows tone values (density) and the vertical axis shows the dot-generation rate. FIGS. 39A and 39B are conceptual drawings showing how dots are formed on a belt-like pattern printed based on this dot-generation rate. Note that the dot-generation rate means a rate of pixels in which a dot is formed, among a plurality of pixels included in a certain region. For example, if the dot-generation rate is 30%, in a region consisting of one-hundred pixels, dots are formed on thirty pixels therein and no dot is formed in the remaining seventy pixels.

A case of printing the above-mentioned mixed belt-like pattern is discussed first. In this case, dots are formed at the generation rate of 30% for each nozzle group according to the graph of FIG. 38. More specifically, dots are formed in 30% of the pixels included in each belt-like pattern, this formation being performed for each nozzle group individually and respectively. In this case, two or three dots often overlap on a single pixel according to the tendency of the waviness, as shown in FIG. 39A. In other words, the density of these dots increases according to the tendency of the waviness. As a result thereof, the amplitude of the waviness of density fluctuation is amplified effectively on the mixed belt-like pattern.

Next, this paragraph discusses a case in which the above-mentioned tone values of the belt-like patterns corresponding to the respective nozzle groups are set to 90% CD. In this case, the generation rate of dots is 90% according to the graph of FIG. 38. Therefore, as shown in FIG. 39B, dots are formed in 90% of the pixels included in each belt-like pattern. Thus, the density of the dots does not increase according to the tendency of the waviness, and the belt-like pattern is printed as if most of the pixels are filled with dots. As a result thereof, the amplitude of the waviness is not amplified greatly. Accordingly, in this case, it can not be expected that the waviness will be amplified as much as in the case of using a mixed belt-like pattern.

Note that, in the case in which the generation rate of dots is increased up to 90% as mentioned above, unevenness in density becomes less conspicuous because the amount of background area in which no dot is formed becomes smaller. This is also considered as one of reasons why the amplitude of the waviness is not amplified greatly in the method mentioned above.

Other Embodiments

The above-mentioned embodiment describes mainly the printing system 100 having the printer 1. As a matter of course, the embodiment also includes disclosure of a printing apparatus, method for judging achievability of density correction of an image and the like.

Though the printer 1 and the like as one embodiment are described above, the above-mentioned embodiment is provided for facilitating the understanding of the invention and is not to be interpreted as limiting the invention. As a matter of course, the invention can be altered and improved without departing from the gist thereof and the invention includes equivalents thereof. Especially, embodiments described below are also included in the invention.

Regarding Printer 1

Though a printer 1 is illustrated in the above-mentioned embodiments, the invention is not limited thereto. For example, the same technology as mentioned in the present embodiment can apply to a variety of recorders utilizing inkjet technology: color filter manufacturing equipment, dyeing equipment, micromachining equipment, semiconductor manufacturing equipment, surface treatment equipment, three-dimensional molding machine, a vaporizer, organic EL manufacturing equipment (especially, polymer EL manufacturing equipment), display manufacturing equipment, film formation equipment, and DNA chip manufacturing equipment. In addition, methods used therein and manufacturing methods thereof are also included in applications to which the technology as mentioned in the present embodiment can apply.

Regarding Ink

Since the above-mentioned embodiment is an embodiment of the printer 1, dye ink or pigment ink is ejected from a nozzle. However, ink to be ejected from the nozzle is not limited thereto.

Regarding Nozzles

Though ink is ejected using a piezo element in the above-mentioned embodiment, the method for ejecting ink is not limited thereto. For example, it is also acceptable to use other methods such as using bubbles generated in a nozzle by heat.

Regarding Movement Direction of Head 41

The above-mentioned embodiment does not describe the way (forwards or backwards) in which the head 41 moves in the movement direction during ejecting ink. However, it is acceptable to eject ink only when moving forwards, or only when moving backwards, or when moving both forwards and backwards.

Regarding Ink Color to be Used in Printing

Though the above-mentioned embodiment is described with an example of multi-color printing in which dots are formed by ejecting on paper four colors of ink: cyan (C), magenta (M), yellow (Y), and black (K), the ink color is not limited thereto. For example, in addition to these colors of ink, it is also acceptable to use ink of light cyan (LC), light magenta (LM) and the like.

Regarding Nozzle Group Used for Formation of Mixed Belt-Like Patterns

In the above-mentioned embodiment, the number of the nozzle groups used for formation of the mixed belt-like patterns is described for an example of three groups: the cyan nozzle group, the magenta nozzle group and the yellow nozzle group. However, the invention is not limited thereto. In short, it is only essential that at least two nozzle groups are used. For example, the mixed belt-like pattern can be formed with any two groups selected from among the cyan nozzle group, the magenta nozzle group, the yellow nozzle group and the black nozzle group, or the mixed belt-like pattern can also be formed with four nozzle groups, that is, all nozzle groups.

Regarding Inspection Ink

Though, in the above-mentioned embodiment, the test pattern for setting correction values and the test pattern for verifying correction effects are printed with one type of inspection ink (light magenta) for the purpose of simplifying tasks in the inspection process, the invention is not limited thereto.

For example, it is also acceptable to print belt-like patterns of the test pattern using ink of colors corresponding to the respective nozzle groups. More specifically, a belt-like pattern of a cyan nozzle group can be printed with cyan ink, a belt-like pattern of a magenta nozzle group can be printed with magenta ink, a belt-like pattern of a yellow nozzle group can be printed with yellow ink, and a belt-like pattern of a black nozzle group can be printed with black ink.

Regarding Who Performs "Process for Setting Correction Values" and "Process for Verifying Density Correction Effects"

In the above-mentioned embodiment, the "process for setting correction values (S100)" and the "process for verifying density correction effects (S150)" shown in FIG. 10A are performed by an inspector in an inspection process at a plant. However, these processes can be performed under instructions by a user who has purchased a printer 1. In such cases, as a matter of course, the printer 1 is accompanied by a CD-ROM, etc. containing programs such as a printer driver for causing the printer 1 to print a test pattern, a scanner driver for controlling a scanner, a program for setting correction values, and a program for verifying correction effects, such that the user can install the programs into a computer 110.

Further, in cases where the above-mentioned processes are performed under instructions by the user, ink cartridges which are attached to the carriage 31 are not an inspection ink cartridge 35 but ink cartridges 33 (K), 33 (C), 33 (M), and 33 (Y) whose respective colors correspond to nozzle groups. Thus, as a matter of course, belt-like patterns of test patterns are printed with ink of colors corresponding to the respective nozzle groups as mentioned above, and a mixed belt-like pattern becomes gray since dots of cyan, magenta, and yellow are mixed.

Regarding Number of Divided Regions for which Density-Variations are Obtained

Figure 37:
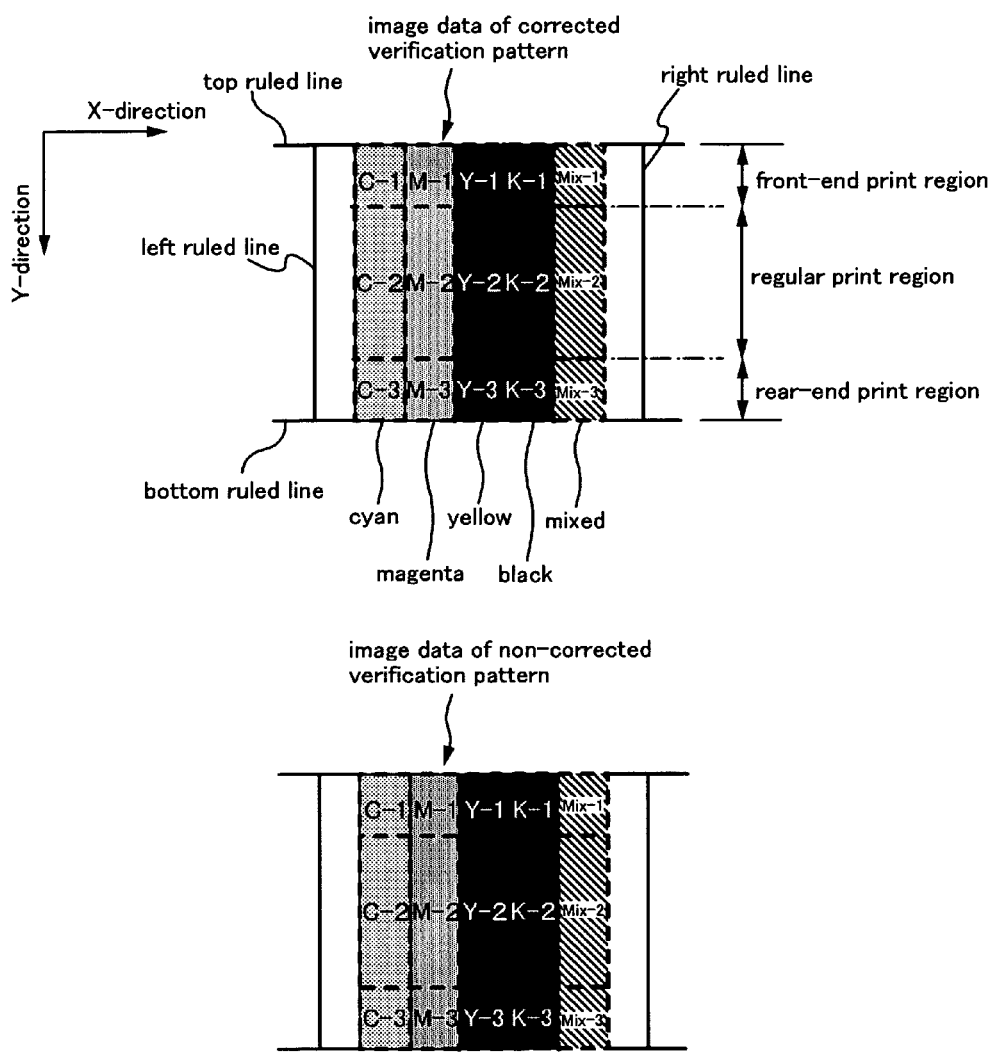
FIG. 37 is an explanatory diagram showing verification patterns relating to the present embodiment.

In the above-mentioned embodiment, each of the verification patterns is divided, for each belt-like pattern and each print region, into fifteen divided regions as shown in FIG. 37. However, the invention is not limited thereto. For example, it is possible that each of the verification patterns is not divided for each print region and it is divided for each belt-like pattern into five divided regions in the movement direction.

Regarding Size of Dot

Figure 40:
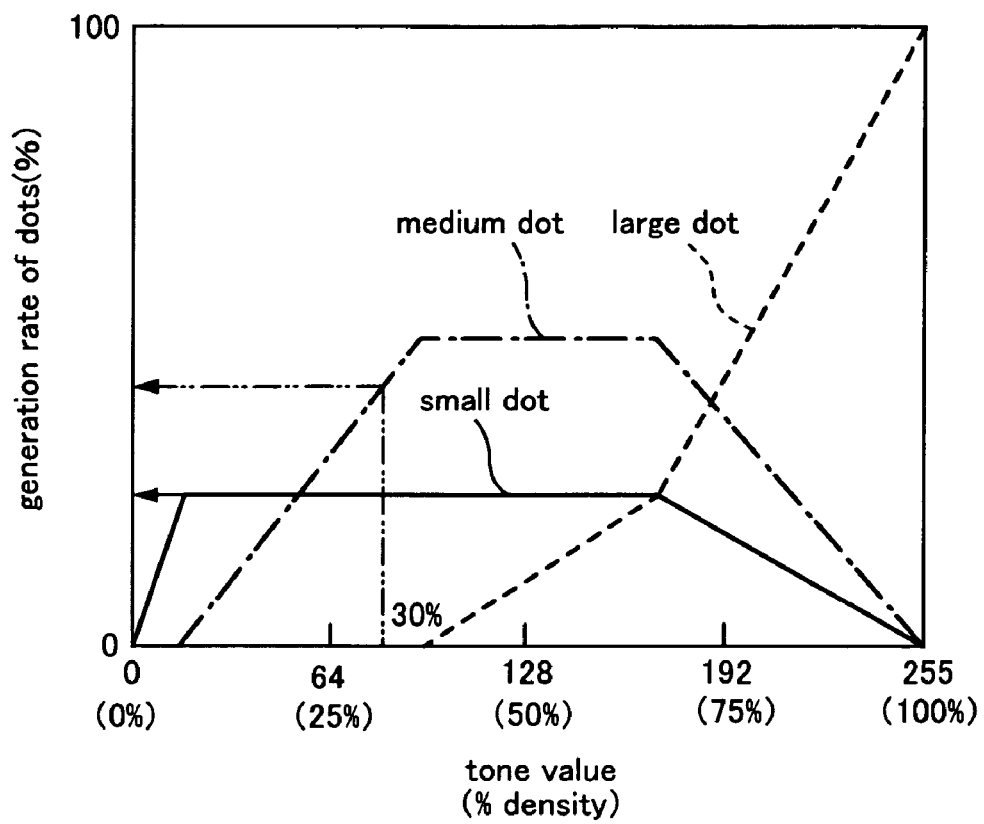
FIG. 40 is a graph showing a table of dot-generation rates.

Though the above-mentioned embodiment does not describe the size of a dot, it is possible to determine generation rates of a large dot, a medium dot, and a small dot depending on tone values of image data, as shown in the table of dot-generation rates of FIG. 40. In the figure, within a range in which a tone value (density) is low, either of a small dot and a medium dot is formed at a dot-generation rate which corresponds to that tone value, and within a range in which a tone value (density) is high, any of a small dot, a medium dot, and a large dot is formed at a dot-generation rate which corresponds to that tone value.

Such a table of dot-generation rates enables to amplify more greatly the above-mentioned waviness of density fluctuation in the mixed belt-like pattern of the present embodiment. The reason thereof is as follows: The mixed belt-like pattern consists of small dots or medium dots based on the table of dot-generation rates of FIG. 40. This makes it difficult for the dots to fill in the pixels solidly, and therefore, an appropriate amount of background raw paper appears in some areas. As a result, unevenness in density becomes more conspicuous.

What is claimed is:

1. A method for judging achievability of density correction of an image, the density correction being performed by a printing apparatus during printing of the image, the printing apparatus including a plurality of nozzle groups each consisting of a plurality of nozzles that are lined up in a predetermined direction, the method comprising:

printing on a medium a comparison pattern whose density is not corrected and a comparison pattern whose density is corrected, by causing at least two nozzle groups among a plurality of the nozzle groups to eject ink and forming dots in a mixed manner with the ink ejected from the at least two nozzle groups;

reading the density of each of the comparison patterns; and judging, based on the read density, achievability of density correction of an image.

2. A method for judging achievability of density correction of an image according to claim 1, wherein:

the nozzle groups are provided for respective colors of inks that are ejected during printing of the image.

3. A method for judging achievability of density correction of an image according to claim 2, wherein:

a same type of ink is ejected from the nozzles of the at least two nozzle groups during printing of the comparison patterns.

4. A method for judging achievability of density correction of an image according to claim 3, wherein:

the colors of inks ejected during printing of the image are cyan, magenta, yellow and black; and the same type of ink is ink that has a same hue as any one of the cyan ink, the magenta ink, the yellow ink and the black ink and that is lighter in color tone than that ink.

5. A method for judging achievability of density correction of an image according to claim 2, wherein:

the colors of inks ejected during printing of the image are cyan, magenta, yellow and black; and the at least two nozzle groups used for formation of the comparison patterns are a cyan ink nozzle group, a magenta ink nozzle group and a yellow ink nozzle group.

6. A method for judging achievability of density correction of an image according to claim 1, wherein:

each of the comparison patterns is printed by performing dot row formation of forming dot rows along a direction intersecting the predetermined direction in respective row regions that are lined up in the predetermined direction, the dot row formation being performed by repeating alternately a dot formation operation in which dots are formed on the medium by ejecting ink from a plurality of the nozzles moving in the intersecting direction and a carrying operation in which the medium is carried in the predetermined direction; and the read density is generated for each of the row regions.

7. A method for judging achievability of density correction of an image according to claim 6, wherein:

each of the comparison patterns is printed based on image data;

the image data has tone value data of density, the tone value data being for forming the dot rows in respective row regions of each of the comparison patterns; and the tone value data is uniform throughout all of the row regions included in each of the comparison patterns.

8. A method for judging achievability of density correction of an image according to claim 7, wherein:

variation in density is obtained for each of the comparison pattern whose density is not corrected and the comparison pattern whose density is corrected, based on the read density of the row regions; and achievability of density correction of an image is judged based on the variation in density.

9. A method for judging achievability of density correction of an image according to claim 8, wherein:

each of the comparison patterns is divided into divided regions that are larger than the row region;

the variation in density is obtained for each of the divided regions; and achievability of density correction of an image is judged based on a result of comparison in which the variation in density of each of the divided regions in the comparison pattern whose density is not corrected is compared with the variation in density of each of the corresponding divided regions in the comparison pattern whose density is corrected.

10. A method for judging achievability of density correction of an image according to claim 9, wherein:

when printing each of the comparison patterns on the medium, in addition to printing of the comparison patterns with the ink ejected from the nozzles of the at least two nozzle groups using predetermined tone value data, printing of a pair of a comparison pattern whose density is not corrected and a comparison pattern whose density is corrected is performed for each nozzle group, the pair of comparison patterns for each nozzle group being formed with dots of ink ejected only from a single corresponding nozzle group using predetermined tone value data; and when judging the achievability of density correction of an image, it is judged that the density correction of an image is achievable if the variation in density of all of the divided regions in all of the comparison patterns whose density is corrected is equal to or smaller than the variation in density of all of the corresponding divided regions in all of the corresponding comparison patterns whose density is not corrected.

11. A method for judging achievability of density correction of an image according to claim 1, wherein:

when judging the achievability of density correction of an image, if it is judged that the density correction is not achievable, either one of a warning prompting to re-print the comparison patterns and a warning prompting to re-generate a correction value of the density is given.

12. A method for judging achievability of density correction of an image according to claim 1, wherein:

a correction pattern is printed by performing dot row formation of forming dot rows along a direction intersecting the predetermined direction in respective row regions that are lined up in the predetermined direction, the dot row formation being performed by repeating alternately a dot formation operation in which dots are formed on a medium by ejecting ink from a plurality of the nozzles moving in the intersecting direction and a carrying operation in which the medium is carried in the predetermined direction;

density of each of the row regions is read from the correction pattern;

a correction value is obtained for each of the row regions based on the read density; and if it is judged that the density correction is achievable, density correction is performed for each of the row regions based on the correction value during printing of an image.

13. A method for judging achievability of density correction of an image, the density correction being performed by a printing apparatus during printing of the image, the printing apparatus including a plurality of nozzle groups each consisting of a plurality of nozzles that are lined up in a predetermined direction, the method comprising:

printing on a medium a comparison pattern whose density is not corrected and a comparison pattern whose density is corrected, by causing at least two nozzle groups among a plurality of the nozzle groups to eject ink and forming dots in a mixed manner with the ink ejected from the at least two nozzle groups;

reading the density of each of the comparison patterns; and judging, based on the read density, achievability of density correction of an image; wherein:

the nozzle groups are provided for respective colors of inks that are ejected during printing of the image;

a same type of ink is ejected from the nozzles of the at least two nozzle groups during printing of the comparison patterns;

the colors of inks ejected during printing of the image are cyan, magenta, yellow and black, and the same type of ink is ink that has a same hue as any one of the cyan ink, the magenta ink, the yellow ink and the black ink and that is lighter in color tone than that ink;

the at least two nozzle groups used for formation of the comparison patterns are a cyan ink nozzle group, a magenta ink nozzle group and a yellow ink nozzle group;

each of the comparison patterns is printed by performing dot row formation of forming dot rows along a direction intersecting the predetermined direction in respective row regions that are lined up in the predetermined direction, the dot row formation being performed by repeating alternately a dot formation operation in which dots are formed on the medium by ejecting ink from a plurality of the nozzles moving in the intersecting direction and a carrying operation in which the medium is carried in the predetermined direction;

the read density is generated for each of the row regions;

each of the comparison patterns is printed based on image data;

the image data has tone value data of density, the tone value data being for forming the dot rows in respective row regions of each of the comparison patterns;

the tone value data is uniform throughout all of the row regions included in each of the comparison patterns;

variation in density is obtained for each of the comparison pattern whose density is not corrected and the comparison pattern whose density is corrected, based on the read density of the row regions and achievability of density correction of an image is judged based on the variation in density;

each of the comparison patterns is divided into divided regions that are larger than the row region, the variation in density is obtained for each of the divided region, and achievability of density correction of an image is judged based on a result of comparison in which the variation in density of each of the divided regions in the comparison pattern whose density is not corrected is compared with the variation in density of each of the corresponding divided regions in the comparison pattern whose density is corrected;

when printing each of the comparison patterns on the medium, in addition to printing of the comparison patterns with the ink ejected from the nozzles of the at least two nozzle groups using predetermined tone value data, printing of a pair of a comparison pattern whose density is not corrected and a comparison pattern whose density is corrected is performed for each nozzle group, the pair of comparison patterns for each nozzle group being formed with dots of ink ejected only from a single corresponding nozzle group using predetermined tone value data;

when judging the achievability of density correction of an image, it is judged that the density correction of an image is achievable if the variation in density of all of the divided regions in all of the comparison patterns whose density is corrected is equal to or smaller than the variation in density of all of the corresponding divided regions in all of the corresponding comparison patterns whose density is not corrected;

when judging the achievability of density correction of an image, if it is judged that the density correction is not achievable, either one of a warning prompting to re-print the comparison patterns and a warning prompting to re-generate a correction value of the density is given; and a correction pattern is printed by performing dot row formation of forming dot rows along a direction intersecting the predetermined direction in respective row regions that are lined up in the predetermined direction, the dot row formation being performed by repeating alternately a dot formation operation in which dots are formed on a medium by ejecting ink from a plurality of the nozzles moving in the intersecting direction and a carrying operation in which the medium is carried in the predetermined direction, density of each of the row regions is read from the correction pattern, a correction value is obtained for each of the row regions based on the read density, and if it is judged that the density correction is achievable, density correction is performed for each of the row regions based on the correction value during printing of an image.

14. A printing apparatus, comprising:

a plurality of nozzle groups each consisting of a plurality of nozzles that are lined up in a predetermined direction;

the printing apparatus performing density correction of an image during printing of the image;

the printing apparatus printing on a medium a comparison pattern whose density is not corrected and a comparison pattern whose density is corrected, by causing at least two nozzle groups among a plurality of the nozzle groups to eject ink and forming dots in a mixed manner with the ink ejected from the at least two nozzle groups.

* * * * *